(12) United States Patent
Robinson et al.

(10) Patent No.: US 8,707,185 B2
(45) Date of Patent: Apr. 22, 2014

(54) DYNAMIC INFORMATION MANAGEMENT SYSTEM AND METHOD FOR CONTENT DELIVERY AND SHARING IN CONTENT-, METADATA- AND VIEWER-BASED, LIVE SOCIAL NETWORKING AMONG USERS CONCURRENTLY ENGAGED IN THE SAME AND/OR SIMILAR CONTENT

(75) Inventors: Jack Robinson, Vacaville, CA (US);
Peter Muller, Woodside, CA (US);
Timothy Noke, Santa Clara, CA (US);
Teng Lew Lim, Mountain View, CA (US); Wallace Glausi, Menlo Park, CA (US); Larry Fullerton, New Hope, AL (US); Dusan Hamar, Bratislava (SK)

(73) Assignee: ADDnCLICK, Inc., Vacaville, CA (US)

( * ) Notice: Subject to any disclaimer, the term of this patent is extended or adjusted under 35 U.S.C. 154(b) by 1258 days.

(21) Appl. No.: 12/079,730

(22) Filed: Mar. 27, 2008

(65) Prior Publication Data

US 2009/0249244 A1     Oct. 1, 2009

Related U.S. Application Data

(63) Continuation-in-part of application No. 09/686,206, filed on Oct. 10, 2000, now abandoned, and a continuation-in-part of application No. 11/477,162, filed on Jun. 28, 2006, now abandoned, and a continuation-in-part of application No. 11/982,707, filed on Nov. 2, 2007, now Pat. No. 8,117,281, and a continuation-in-part of application No. 12/004,392, filed on Dec. 19, 2007, now Pat. No. 8,234,218, and a continuation-in-part of application No. 12/004,622, filed on Dec. 20, 2007, now Pat. No. 8,316,450.

(60) Provisional application No. 60/921,623, filed on Apr. 2, 2007.

(51) Int. Cl.
*G06F 3/00* (2006.01)

(52) U.S. Cl.
USPC ........... 715/751; 715/758; 715/738; 715/781; 705/319

(58) Field of Classification Search
USPC ................... 715/738, 781, 751, 758; 705/319
See application file for complete search history.

(56) References Cited

U.S. PATENT DOCUMENTS 5,742,670 A * 4/1998 Bennett .................... 379/142.04
6,073,119 A * 6/2000 Bornemisza-Wahr et al. . 705/42

(Continued)

OTHER PUBLICATIONS

International Preliminary Report on Patentability for Int'l Patent App. No. PCT/US2009/001013; dated Sep. 28, 2010 (7 pages).

(Continued)

*Primary Examiner* — Patrick Riegler
(74) *Attorney, Agent, or Firm* — Ater Wynne LLP

(57) ABSTRACT

Disclosed are tools, methods, and systems for establishing generally live, Content-based social networks, and for concurrently sharing Content and Content-relevant information within a social network. A Service registers Viewers and/or n-Users, and provides tools that enable a Viewer to identify n-Users concurrently viewing the same or similar Content, or having an interest in the same or similar Content. A Viewer can initiate or join a Content-based social network, and can share their Content with others, or view others' Content, and interact with n-Users via any of several methods. Service tools also enable a Viewer to define and selectively block or alter objectionable material so that it is no longer perceivable in its objectionable form. The described tools, methods, and systems also enable numerous innovative approaches to generate revenue for a Service, for providers of product and/or services, for Content providers, and others.

25 Claims, 27 Drawing Sheets

(56) References Cited

U.S. PATENT DOCUMENTS

| | | | |
|---|---|---|---|
| 6,442,590 B1 * | 8/2002 | Inala et al. | 709/204 |
| 6,564,246 B1 * | 5/2003 | Varma et al. | 709/205 |
| 6,651,086 B1 * | 11/2003 | Manber et al. | 709/205 |
| 6,681,247 B1 * | 1/2004 | Payton | 709/217 |
| 6,708,172 B1 * | 3/2004 | Wong et al. | 1/1 |
| 6,879,994 B1 * | 4/2005 | Matsliach et al. | 709/204 |
| 7,058,892 B1 * | 6/2006 | MacNaughton et al. | 715/738 |
| 7,451,181 B2 * | 11/2008 | Sasaki et al. | 709/204 |
| 7,529,796 B2 * | 5/2009 | Riddle | 709/204 |
| 8,060,463 B1 * | 11/2011 | Spiegel | 707/609 |
| 2002/0016788 A1 * | 2/2002 | Burridge | 707/10 |
| 2006/0080702 A1 | 4/2006 | Diez et al. | |
| 2006/0089978 A1 * | 4/2006 | Lee et al. | 709/219 |
| 2006/0174277 A1 * | 8/2006 | Sezan et al. | 725/46 |
| 2006/0218225 A1 | 9/2006 | Hee Voon et al. | |
| 2006/0271997 A1 * | 11/2006 | Jacoby et al. | 725/135 |
| 2007/0136313 A1 * | 6/2007 | Dutta | 707/10 |
| 2007/0157107 A1 * | 7/2007 | Bishop | 715/771 |
| 2007/0192352 A1 | 8/2007 | Levy | |
| 2007/0192461 A1 * | 8/2007 | Reich et al. | 709/223 |
| 2007/0239828 A1 * | 10/2007 | Patton et al. | 709/204 |
| 2007/0255831 A1 | 11/2007 | Hayashi et al. | |
| 2007/0288563 A1 * | 12/2007 | Karkanias | 709/204 |
| 2008/0059986 A1 * | 3/2008 | Kalinowski et al. | 725/1 |
| 2008/0163379 A1 * | 7/2008 | Robinson et al. | 726/27 |
| 2008/0222295 A1 * | 9/2008 | Robinson et al. | 709/227 |
| 2008/0229215 A1 * | 9/2008 | Baron et al. | 715/751 |
| 2008/0301304 A1 | 12/2008 | Chitsaz et al. | |
| 2009/0012964 A1 * | 1/2009 | Ahn | 707/10 |
| 2009/0063178 A1 * | 3/2009 | Pousti et al. | 705/1 |
| 2009/0083383 A1 * | 3/2009 | Piper et al. | 709/206 |
| 2009/0158163 A1 * | 6/2009 | Stephens et al. | 715/738 |
| 2009/0158176 A1 * | 6/2009 | Kalaboukis et al. | 715/758 |
| 2009/0165140 A1 * | 6/2009 | Robinson et al. | 726/26 |
| 2009/0187624 A1 * | 7/2009 | Brownholtz et al. | 709/204 |

OTHER PUBLICATIONS

International Search Report for Int'l Appl. No. PCT/US08/12403; ISA/US; Feb. 4, 2009; 8 pages.
Parthasarathy, Pramila; Non-Final Office Action dated Dec. 27, 2010 from U.S. Appl. No. 12/004,622 (20 pages).

\* cited by examiner

Fig. 17

DYNAMIC INFORMATION MANAGEMENT SYSTEM AND METHOD FOR CONTENT DELIVERY AND SHARING IN CONTENT-, METADATA- AND VIEWER-BASED, LIVE SOCIAL NETWORKING AMONG USERS CONCURRENTLY ENGAGED IN THE SAME AND/OR SIMILAR CONTENT

RELATED APPLICATIONS

The present application is a Continuation-in-Part of and claims the benefit of priority to non-provisional U.S. patent application Ser. No. 09/686,206 filed 10 Oct. 2000 now abandoned; and the present application is further a Continuation-in-Part of and claims the benefit of priority to non-provisional U.S. patent application Ser. No. 11/477,162 filed 28 Jun. 2006 now abandoned; and the present application is further a Continuation-in-Part of and claims the benefit of priority to non-provisional U.S. patent application Ser. No. 11/982,707 filed on 2 Nov. 2007 now U.S. Pat. No. 8,117,281; and the present application is further a Continuation-in-Part of and claims the benefit of priority to non-provisional U.S. patent application Ser. No. 12/004,392 filed on 19 Dec. 2007 now U.S. Pat. No. 8,234,218; and the present application further is a Continuation-in-Part of and claims the benefit of priority to non-provisional U.S. patent application Ser. No. 12/004,622-filed on 20 Dec. 2007 now U.S. Pat. No. 8,316,450; and the present application further claims the benefit of priority to co-pending U.S. Provisional Patent Application Ser. No. 60/921,623 filed on 2 Apr. 2007, the disclosures of each of which are incorporated herein in their entirety by this reference. The disclosures of each of U.S. patent application Ser. No. 09/745,257 filed 20 Dec. 2000, of U.S. patent application Ser. No. 09/749,091 filed 26 Dec. 2000, and of U.S. Provisional Patent Application Ser. No. 60/856,404 filed Nov. 2, 2006 are also incorporated herein in their entirety by this reference.

FIELD OF THE INVENTION

This invention relates generally to the field of electronically conveyable information. More particularly, it concerns enhancing information acquisition processes through live content sharing and content-centric social networking, as well as the tools, methods, and systems for enabling the same.

BACKGROUND OF THE INVENTION

The internet provides users with access to a stunning quantity and variety of information. However, the internet lacks an efficient organizing framework to enable users to quickly and logically gather information about specific topics or content specifically of interest to the User.

Numerous available internet search engines enable keyword searches for information, but these suffer from infirmities common to nearly all of them. Most frequently, users must repeatedly refine their searches to locate relevant information, and the information returned from a search is typically voluminous, overly broad, under-inclusive, out-of-date, or irrelevant. As a consequence, users can expend a tremendous amount of time and energy attempting to find highly relevant information regarding specific topics of interest.

Alternatively, special interest groups and discussion groups exist on the internet, where users can post messages and/or images, interactively chat, and ask questions or provide information about topics. However, such content posting is typically static and passive, rather than dynamic and interactive, involving a User uploading an image and waiting for other users to download, view, and post responses to the Content. A posting User is frequently dependent upon search engines to lead other users to the posted Content; a slow and uncertain process. Additionally, the User must expend time and energy to find such special interest and discussion groups, and can ultimately partake in only one or a small number of such groups concurrently. These limitations reduce a User's ability to rapidly gather information and view Content that other Users find relevant to a topic.

In another situation, a User may wish to gather information about products, such as by viewing them, comparing them, discussing their relative benefits and deficiencies with product users, experts, and vendors, and then purchase a selected product on-line. This sequence of activities typically involves visiting numerous websites (e.g., Consumer Reports) for product reviews, vendor websites for product options, product User-group websites for ratings, and other resources. As described above, this process can consume a great deal of time, and to some extent, stifles and frustrates users, transactions, and the pace of e-commerce growth generally.

Yet, over a decade into the internet revolution, no consolidated solution has yet emerged to solve these inefficiencies. Further, the amount of information available by the internet continues to increase at a breakneck pace, compounding the existing inefficiencies and frustrations for those searching for Content-specific information.

BRIEF DESCRIPTION OF THE DRAWINGS

FIG. 15-17 depict using a Shared Window to access Content and identify Content-relevant n-Users according to an embodiment of the invention.

DETAILED DESCRIPTION OF THE PREFERRED EMBODIMENTS

Figure 1:
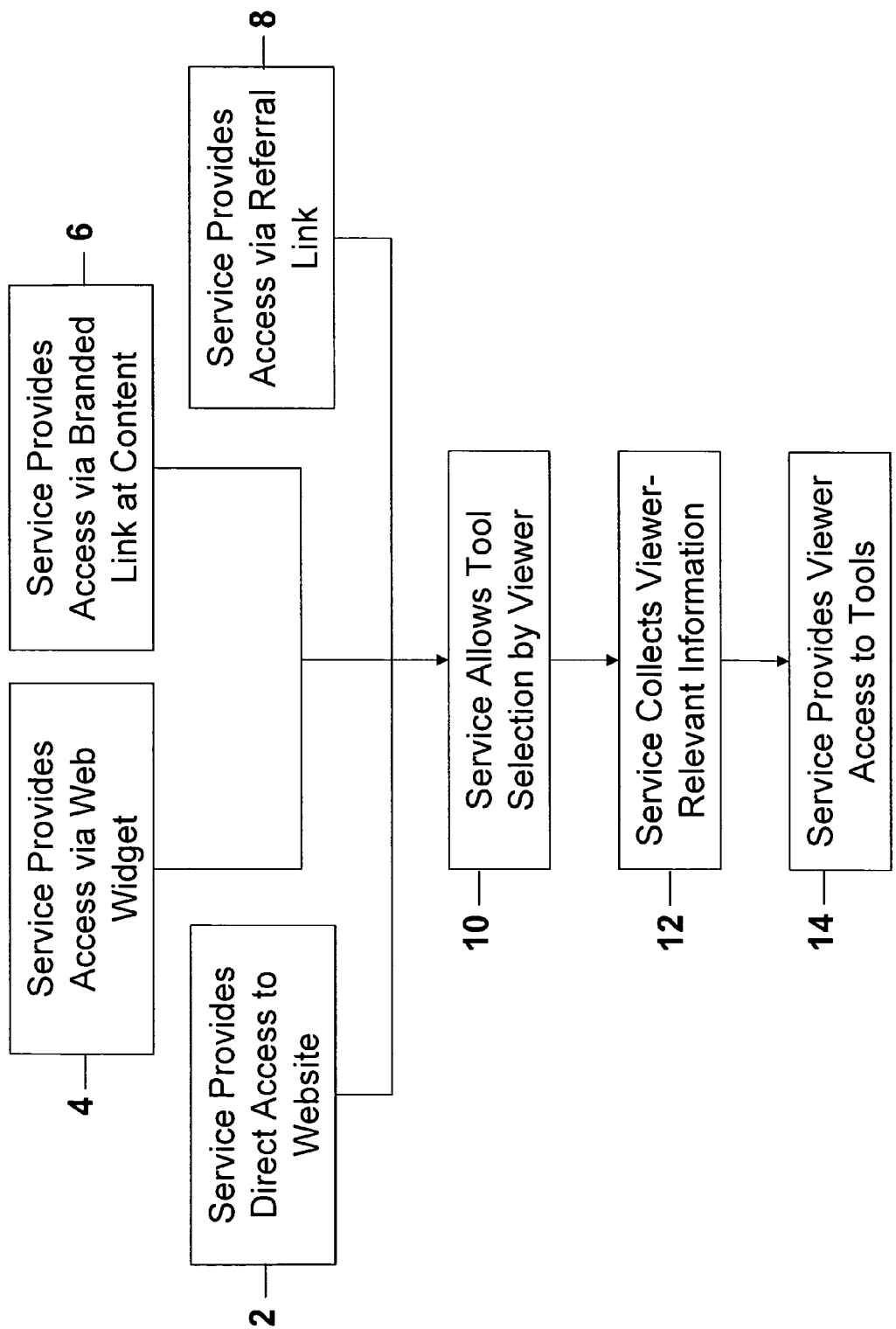
FIG. 1 depicts methods to access Service tools and services according to embodiments of the invention.

The invention in accordance with a preferred embodiment involves tools, systems, and methods for promoting information sharing and social networking through a Content-centric community of users. Users of an electronic communications medium gain mutual awareness and are linked together through their shared interest and/or participation in the same and/or similar Content or subject matter. Such sameness and/or similarity is determined by an analysis of Content engaged in by the users, of metadata associated with the Content, of a user-specified action relating to the Content, and/or of a context associated with Content. Once aware of their shared interests, users can then interact (e.g., live and concurrently) through an electronic medium using text, voice, videoconferencing, image sharing, and other methods. Through such content-based interaction, users can rapidly acquire information, knowledge, and additional valuable resources that can be shared among each other or among specific users. All the while, tools and capabilities largely shield a User from undesired exposure to objectionable material.

For purposes of clarity, general definitions are provided for some of the terms used throughout this description. These definitions are not intended to limit the scope of each term, but only to provide an initial understanding so that the reader can readily recognize and understand the terms when used herein. Those having ordinary skill in the art will recognize from the overall specification that each term has a more expansive scope according to alternate embodiments than is contained in these brief summary definitions.

"Content" includes any viewable, readable, audible or otherwise human- and/or machine-perceivable presentation that may be perceived through the use of an internet-connected (or connectable) electronic device. This includes images, whether static (e.g., still photographs, artwork, etc.) or non-static (e.g., video, animation, speech, instrument-generated representations of human thought, etc.), whether original (e.g., user-created) or not (e.g., obtained by User from another source), whether electronically transmittable to a Viewer (e.g., via internet) or transferrable to a Viewer on an electronic storage medium (e.g., a digital video disc (DVD), etc.), and/or interactive Content, such as n-dimensional Virtual Environments and n-dimensional Virtual Worlds.

Examples of Content also include webpages, websites, advertisements, search engine results, results from software program queries, video, video games, still images, any motion content, including video conference calls, live video feeds, instrument-generated representations of human thoughts, speech, blogs, podcasts, vlogs, and other voice and/or text exchanges between Viewers and n-Users or others. Content is considered such herein, and is considered within the scope of the embodiments, anytime the Content is presented to a Viewer in an n-dimensional form, wherein "n" is equal to 2 or more (e.g., 2-dimensional, 3-dimensional, etc.). Therefore, all forms of Content that can be presented in Virtual Environments and/or Virtual Worlds, as described in the related applications listed above, can be analyzed to determine similarity for linking Viewers with n-Users and/or others in a live social network, such as to enable concurrent Content sharing.

Nor should Content be considered limited to those types specifically listed herein, but can encompass all presently available and/or foreseeable forms of electronic media and/or content that is or can be visually displayed, audibly produced, represented in a tangible medium (e.g., printed, embossed, impressed, punched) or otherwise affected by an electronic device so as to be perceivable by a Viewer. Content including an associated marker and/or data packet may be referred to as "Marked Content", and can exist as a separate content layer overlying, corresponding to, and dynamically responsive to a layer of viewable content.

A "User" is generally a singular or collective entity (e.g., individual, company, organization, governmental body, etc.) that provides Content that may be accessed and/or viewed by a Viewer or others. A User is generally human, but may include electronic systems or devices designed to perform all or some subset of the operations that a User performs as described herein. For example, a User can be a camera or video monitor coupled with pattern and/or image recognition software for tracking, monitoring, cataloguing, archiving, and/or reporting Content. Generally, a User so described is indicated as a "User" herein to distinguish from a 'user' in the more general sense, although such distinctions are not absolute herein.

An 'n-User' is one or more entities also generally registered with the Service, with whom a Viewer can interact in embodiments of the invention. In some situations, a User or an n-User will be and/or have some or all the attributes of a Viewer, a User, a Service, a Promoter, a Host, and/or a third party. An n-User is typically human, but may also be a device or system configured to perform one or more actions relative to Content and enabling use of Service tools and/or capabilities. An n-User can also be and/or represent a collective entity, such as a system of multiple nodes, an organization (e.g., a corporation, partnership, union, collective, etc.), etc. An n-User may alternatively be referred to as a 'remote user' herein.

A "Viewer" achieves access to Content, typically but not exclusively provided by a User, a Host, a Promoter, an n-User, a Service, or others, and perceives the Content. A Viewer is generally human, but may include electronic systems or devices designed to perform all or some subset of the operations that a Viewer performs as described herein. For example, a Viewer can be a camera or video monitor coupled with pattern and/or image recognition software for tracking, monitoring, cataloguing, archiving, and/or reporting Content. A Viewer can also be and/or represent a collective entity, such as a system of multiple nodes, an organization (e.g., a corporation, partnership, union, collective, etc.), etc. A Viewer may perceive Content other than visually, but may access the Content nonetheless and be considered a Viewer. Therefore, identification as a Viewer is not limited by whether Content is partially or entirely visually viewable, or rather may convey information primarily, partially, or entirely via other sensory perceptions (e.g., auditory, tactile, etc.). Generally, a Viewer so described is indicated as a "Viewer" to distinguish from a 'viewer' in the more general sense, although such distinctions are not absolute herein. In some situations, a Viewer will also have some or all the attributes of a User, an n-User and/or a Host. Occasionally, a Viewer may occasionally be referred to as 'a user' herein, but will generally be distinguishable as a Viewer based upon the nature of interaction relative to Content performed by the Viewer/user entity.

A "Service" (e.g., ADDnCLICK™) provides tools and/or capabilities to a User enabling the User to discover and to be linked to others (e.g., live and concurrently) having the same or shared interest in Content or a topic, and have a shared, interactive experience with others. (ADDnCLICK is a trademark owned by ADDnCLICK, Inc., assignee of the present patent. All rights are reserved world-wide.) Such linking is accomplished by the Service performing an analysis of the metadata of Content in which Users are engaged, for example, to determine the sameness and/or similarity of the Content. When a Host or other third party is able to perform activities according to embodiments of the invention, perhaps using tools, capabilities, or authority provided by the Service, the Host or third party so acting may also be considered 'the Service' with regard to those actions.

A "Host" is an internet-accessible repository for Content (e.g., website) at or through which Viewers can access Content provided by Users, by the Host, or by third parties. Examples of Hosts could include GOOGLE™ Images, YOUTUBE™, CNN.COM™, or virtually any other at which viewable Content may be made available to a Viewer. The number of Hosts is virtually innumerable, and increasing nearly every day.

A "Social Network" is a social structure comprising nodes which are generally individuals or organizations, but can include automated equipment in embodiments. Social networking can refer to a category of Internet applications that help connect friends, business partners, or other individuals together using a variety of tools, as well as interactions which take place utilizing such tools, and/or the participants in the interactions. Generally herein, a Social Network is an interactive social network construct, environment, session, etc., enabled at least in part by the invented tools, methods, and/or systems.

"Metadata" is information about data and/or other information. Metadata are typically structured, encoded data that describe characteristics of information-bearing entities to aid in identifying, locating, discovering, assessing, and managing the described entities. For example, metadata of Content can include data indicating a title, subject matter, file size, author, owner, source, context, location, or other data about the Content. Herein, Content can be considered an 'information-bearing entity' in and/or associated with which metadata may be present. Metadata are typically assigned to Content by human intervention, or by a machine in response to a programmed function.

A "device" (e.g., 'electronic device', 'internet connectable device', etc.) as described herein, can include any electronic device configured to execute code or otherwise respond to executed code, and to provide visual, audible, tactile (e.g., Braille dots, etc.), or machine-readable output. A device may be capable of providing executable instructions to or otherwise capable of acting upon another device that is capable to provide such user-perceivable output. A device is typically configured to receive instructions provided in some form by a User, Viewer, or other entity, either human or machine, and to either partially or fully execute those instructions, or to convey those instructions partially or fully to another device, user, system, service, or other entity for execution thereby. Numerous devices described herein are also configured to couple either directly or indirectly with a network data transmission/receiving means (e.g., wire, signal, port, receiver, transmitter, etc.) and to transmit data, receive data, or both, via such means. Various embodiments of devices are further and more specifically described below, but the scope of the invention is not limited by or to the described embodiments.

A User and/or a Viewer device will typically include some type of software generated 'desktop' comprising all or some portion of the viewable display of the device. A desktop may be functionally enabled by software resident on the device (e.g., MICROSOFT WINDOWS™ desktop, MAC™ OSX desktop, or others), or on a peripheral connected device. Alternatively, it may be a web desktop (a.k.a. 'webtop' or 'virtual desktop') enabled at least in part by a remotely located software source acting over the internet and perhaps interacting with browser software (e.g., recognized by such trade names as MICROSOFT INTERNET EXPLORER™, APPLE SAFARI™, MOZILLA FIREFOX™, NETSCAPE NAVIGATOR™, or others) on a device. In general, a 'desktop' is a graphical user interface (GUI) presented on a display device integrated with and/or operatively coupled with an electronic device (e.g., a computer, a video game system, etc.), and at least in part produced by execution of device-executable code residing either on a storage means integrated with and/or operatively coupled with the electronic device, or accessed and/or operated across a portion of a data-transmission network (e.g., a 'webtop' accessible via the internet, etc.).

Numerous references to 'the internet' occur throughout this description. While such references frequently refer to the World Wide Web, as has become broadly understood and used by the general public, the embodiments are not so limited. Embodiments of the invention function and provide benefits equally or substantially as well when implemented on or with various limited access and/or entirely proprietary networks, or other systems of electronically interconnected devices. In general, each reference to an 'internet' or 'network' herein refers to a data transfer network including two or more devices and interconnecting data transfer (e.g., transmission) means configured to convey a data-bearing signal from at least one device to at least another.

Examples of networks according to alternative embodiments and/or applications could include ARPANET, proprietary intranet systems, heavily censored national networks (e.g., as in China), and others. Reference to 'the internet' herein indicates an electronically-interconnected system of devices and Viewers, whether expansive or quite limited in size, and is not limited to the World Wide Web commonly used by the general public, (e.g., WWW, WWW2, Arpanet). Therefore, references to 'the internet' herein are to be construed to include any network with which or within which a Service can be interconnected, or into or from which Content is published, downloaded, uploaded, or otherwise conveyed between a Viewer and others. Likewise, reference to a 'website' or a 'webpage' herein is not limited to websites and/or webpages accessible through the World Wide Web, but may also include virtually any displayable Content organized for viewing and accessible via an internet as described above.

Although much of the Content referred to throughout is described as Content transmittable via the internet, Content-based technologies have and continue to rapidly converge. For example, Content conveyed via television signals can be received by and displayed on various devices (e.g., computers), or can be conveyed over telephone networks via fiber optic systems, just to name a few examples. Therefore, references to Content and systems throughout this description are not limited to Content conveyed primarily or wholly through internet or computer readable media, but may also include Content conveyed at least in part via systems typically associated with other purposes (e.g., broadcast, communications, entertainment, data transfer, navigation). Therefore, virtually any system by which Content can be conveyed between a Viewer and others, and to, through, or with which a Service has either a persistent or occasional connection, is also contemplated within embodiments of the invention.

Use of the term 'may' (e.g., 'may include', 'may be', 'may have') within this description generally indicates that the described operation, structure, or other innovative element is present in one or more embodiments of the invention, but is not necessarily present in all embodiments. Therefore, the term 'may' is not indefinite herein, but indicates a condition relevant to at least a subset of the possible embodiments according to the applicants' contemplation of the invention.

As one with ordinary skill in the art will recognize, 'sameness' of Content represents a condition at one end of a spectrum including 'similarity' of Content, as distinguished from dissimilarity of Content at an opposite end of the spectrum. Therefore, the phrase 'similarity of Content' and similar terms, when used herein, collectively represents 'sameness' and 'similarity', indicating that two examples of Content each include one or more discernable characteristics that are the same, or that closely resemble one another, such as context, metadata, subject matter, and/or other characteristics. Such discernable characteristics can also conveniently be referred to as 'reference characteristics'.

Additionally, Markers, Objects, hotspots, and/or visual representations of code (e.g., icons, etc.), as described in the related provisional and/or non-provisional patent applications listed above, are also considered 'discernable characteristics' used in one or more embodiments to determine similarity of Content for linking Viewers and n-Users in live, social networks, as described herein. Thus, in all embodiments which refer to linking Viewers and n-Users based on an analysis of the similarity of Content, these characteristics (Markers, Objects, etc.), although not expressly mentioned, are also contemplated as within the scope of the embodiment(s).

Unless otherwise indicated herein, embodiments described as involving or enabling linking a Viewer with n-Users (e.g., in a social network, etc.) refer to a live link, where the Viewer and at least one n-User interact with each other (and/or other n-Users) in real-time across a data transmission network. As one having ordinary skill in the art would recognize, such 'live' interactions may be subject to signal transmission latency due to limitations of the hardware, software, and/or signal transmission means in a data transmission network (e.g., the Internet). Despite these limitations, whether substantial or approximately nil, the interactions may still be considered 'live'. Likewise, any reference to 'concurrent' viewing of Content is subject to similar latency, but is still considered 'concurrent' as described herein. Likewise, reference to a Service, 'n-User', server and/or other entity that is "remote" generally means remote relative to a Viewer, wherein data conveyed from the Viewer to the other entity must traverse at least a portion of a data transfer network. Therefore, a 'remote' entity may be geographically distant from the Viewer, but may also be geographically quite close relative to the Viewer (e.g., within the same room, etc.), and yet still be considered 'remote' according to an embodiment.

The tools and capabilities described herein are typically enabled by, embodied in, and/or influenced by device-executable code, executed at least in part by a Viewer and/or n-User's internet-linked or linkable device. In at least one embodiment, a portion of such code is executed by a device (e.g., server) located remotely relative to a Viewer and/or n-User, but with a result of such execution being perceivable at the Viewer's and/or n-User's device. In embodiments, such remote execution can be initiated, controlled, and/or terminated, in whole or in part, by the Viewer and/or n-User, such as through a 'webtop' arrangement described above. Likewise, interactions in a system within the scope of the described embodiments, to the extent they may be considered extrinsic to the 'tools and capabilities' referred to above, may generally also be enabled by, embodied in, and/or influenced by device executable code.

References to 'software' and 'device-executable code' herein are used more or less interchangeably, and unless otherwise indicated, generally carry their plain meaning as would be understood to those having ordinary skill in the art (e.g., instructions configured to be executable by or on a hardware device, and to make a hardware device perform work toward a useful result).

Throughout this description, embodiments are described wherein a Viewer has described capabilities, or takes described actions, relative to tools and/or capabilities available from a Service. It should be understood that, according to alternative embodiments, rather than a Viewer, such actions and/or capabilities may be present in or exercised by an entity other than a 'Viewer', and that the embodiments are not so limited in scope. Likewise, reference hereinafter to operations performed by and/or interactions with a 'Service' may rather, in embodiments, be performed by and/or interacted with a third party provider authorized by a Service to act in place of the Service for certain specified ways, whether as an agent, contractor, or by some other relationship.

The terms and definitions provided herein are further supplemented by those presented in the related applications listed above, as incorporated in their entirety herein. Where any conflict, actual or apparent, is interpreted to exist between the definitions presented herein and those presented in the related applications, such conflict shall be resolved to provide the broadest reasonable scope of embodiments described, enabled and/or claimed herein, and/or understood by one having ordinary skill in the art from the description, figures, and claims as presented herein. Additional terms appear throughout this description, whose meaning will be apparent based on their usage in context and by reference to the figures. Where a term may have multiple meanings, such as one or more plain meanings and/or a special meaning provided herein, the correct meaning will generally be discernable in Context, or with reference to the figures and/or claims as presented herein.

Embodiments of the invention presuppose that a Viewer possesses or has access to an internet-connected or connectable electronic device. Alternatively, a Viewer may have or have access to a device of an otherwise self-contained network of electronically interactive devices, wherein at least one of the devices in the network is internet-connected or connectable. Therefore, an exemplary internet connected or connectable device can be either directly connected or connectable with the internet, or indirectly connected or connectable with the internet. Reference to a 'device' herein indicates any device as described above, unless otherwise indicated.

Accessing Tools and Services for Content-Based Interaction

By acquiring access to tools and capabilities provided by a Service, a Viewer will obtain at least some of the numerous capabilities and benefits available according to embodiments of the invention. To this end, FIG. 1 depicts a number of operations. Although the operations are depicted in series, some individual operations may be omitted, transposed, repeated, or may occur in parallel in alternative embodiments.

As shown at 2, a Service can provide Viewer access to a Service website directly, such as by using internet browser software. Alternatively, other software may be used that is capable of accessing and displaying Content present at an internet location designated by a Universal Resource Locator (URL), hosted or otherwise provided by a Service, Host, Promoter, or other third-party. In such situations, a Viewer is typically able to navigate directly to a Service website rather than first accessing another website, service, or exchange.

Of course, due to the nature of the internet as a highly interconnected system of devices, 'directly accessing' a Service does not suggest that such access includes only the Viewer's device and a device controlled by the Service. The vast majority of internet activity almost necessarily passes through numerous interconnected devices (e.g., servers, nodes) before a Viewer is connected with a target website or Service. Therefore, 'directly accessing' indicates that the Viewer specifically targets a connection request toward the Service controlled website, such as by designating the URL of a Service controlled website and initiating an internet navigation operation to that URL.

A Viewer may also designate a Service URL as the location of their 'Home Page', to which their internet software (e.g., browser) automatically and relatively immediately navigates upon startup. Alternatively, a Viewer can establish an icon or other representation on a device desktop, or designate a device button or other control, so that selection and/or activation of the icon, button or other control will cause the device to 'navigate' to (i.e., access) a Service web page, menu (e.g., graphic and/or audio), operator, or other access portal. These embodiments also may constitute 'directly accessing' a Service, although the embodiments are not so limited.

Figure 2:
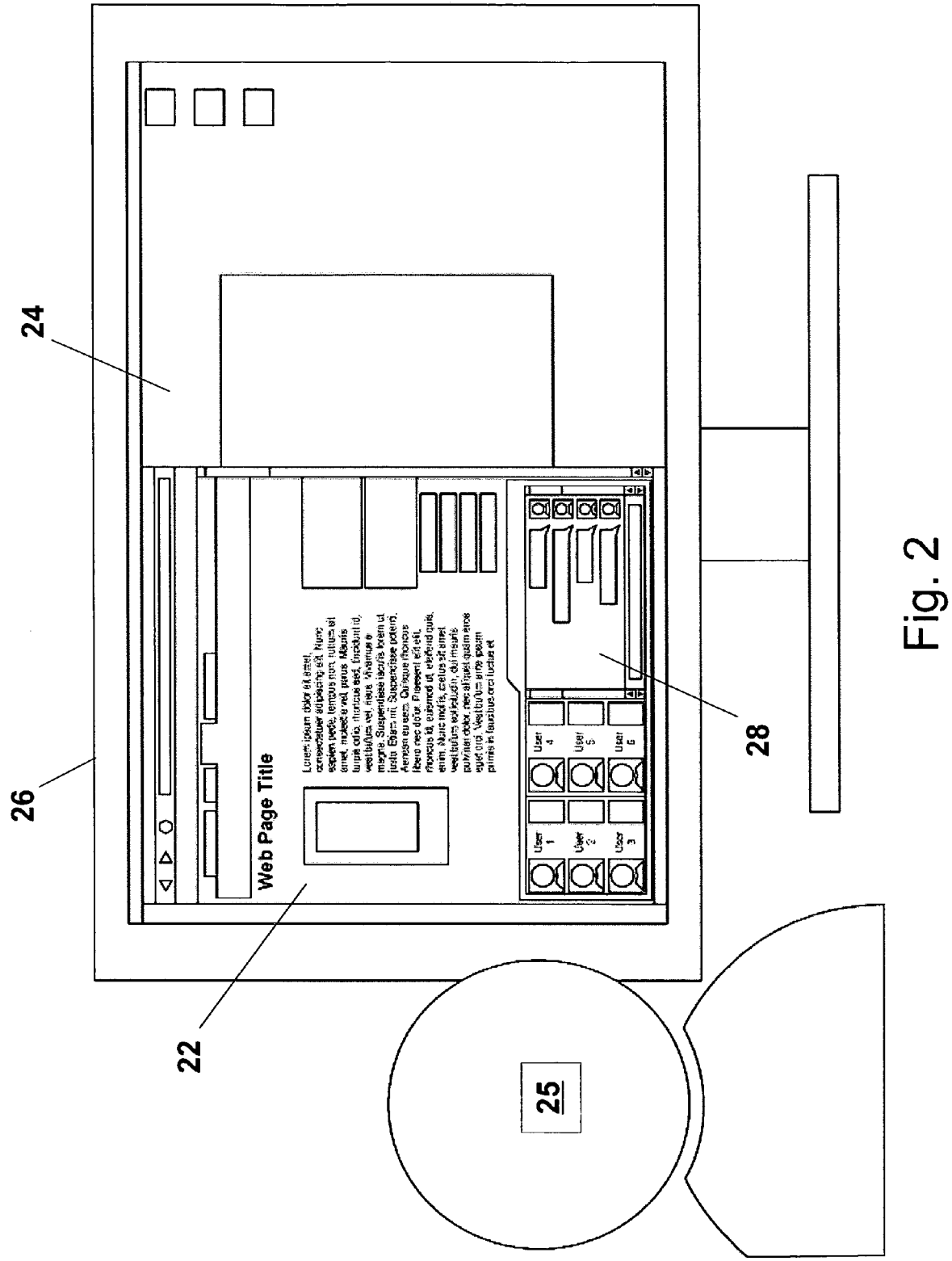
FIG. 2 depicts a Web Widget associated with Content according to an embodiment of the invention.

Alternatively, a Service can provide Viewers with access to the Service through a 'Web Widget' placed in, on, or otherwise relative to and proximate to a webpage, as shown at 4 in FIG. 1. A Web Widget, according to embodiments, typically comprises device-executable code, which, when executed on a computing device, causes presentation to a Viewer, by a device, of a graphical user interface (GUI) and one or more specific, embedded functional capabilities. FIG. 2, for example, depicts a Viewer 25 viewing a Host webpage 22 on the 'desktop' 24 of their internet connected device 26. Associated with the host webpage, and graphically positioned within, adjacent to, or otherwise relative to the Host Content, is a Web Widget 28, according to an embodiment of the invention.

Figure 3:
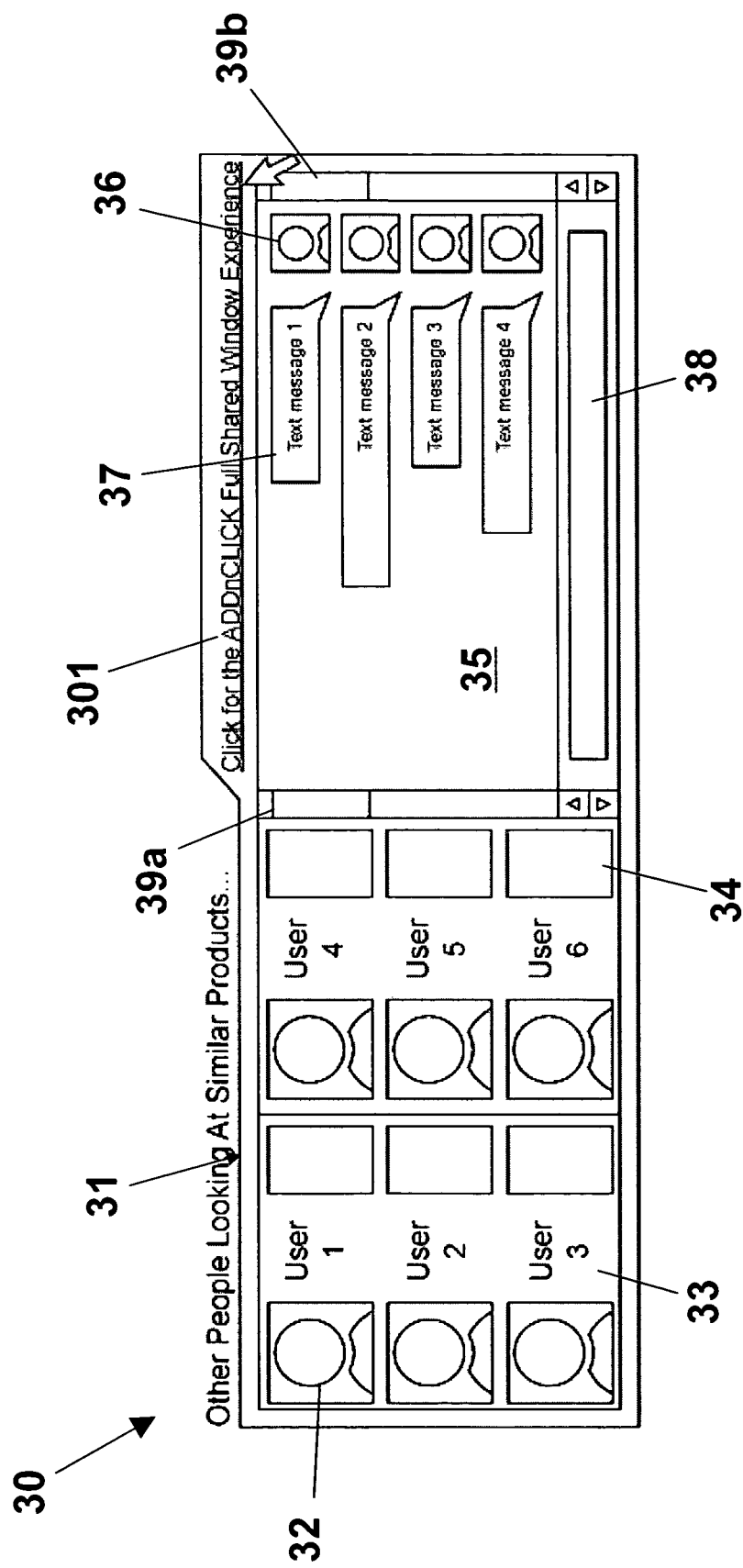
FIG. 3 depicts numerous features of a Web Widget according to an embodiment of the invention.

FIG. 3 provides a more detailed view of the components of a Web Widget according to an exemplary, although not exclusive, embodiment. A Web Widget 30, can include one or more functionally related but distinct portions. For example, Web Widget 30 includes an n-User identification section 31, and an n-User interaction section 35. Within the n-User identification section 31, a graphical representation 32 and a textual identification 33 are provided for each n-User who is available for interacting, such as in a Social Network. A graphical representation 32 may be a photograph, an avatar, an icon, or some other graphical representation 32 that may be selected by the Viewer, the n-User, a third party, a computer program, or by another method, to represent the n-User. A textual identification 33 can be an n-User's name or some derivative thereof, a pseudonym, or some other identification including alphanumeric characters and/or symbols. The textual identification 33 may be selected by any of the same methods by which the graphical representation 32 may be selected, although the graphical representation 32 and the textual identification 33 need not be selected by the same method.

A graphic item 34 can also be displayed relative to each n-User. An n-User, a Viewer, or another can designate and associate a graphic item 34 with an n-User in the n-User identification section 31. The graphic item 34 can represent Content being viewed by the n-User, or is otherwise relevant to the Viewer and/or the n-User. In alternate embodiments, a Web Widget 30 may omit a graphical representation 32 of an n-User, or omit a textual identification 33, or may omit both, and such omission may be controllable by the Viewer. A Viewer may also select whether to display or to not display the graphic items 34, for example to prevent an n-User from displaying objectionable material.

As shown in FIG. 3, the n-User identification section 31 can be a single pane, or can be subdivided into multiple panes to increase the number of n-User's representations concurrently viewable. A pane can be a delineated portion of a window, however delineated (e.g., by lined borders, color differentiation, or other methods), and can be a transparency, landscape, scene, room, object, or any type of area in which information can be placed. A pane can also be displayed, depicted, and/or perceived in an n-dimensional GUI.

For example, USER 1, USER 2, and USER 3 are presented in one pane of the n-User identification section 31 depicted in FIG. 3, while USER 4, USER 5, and USER 6 are presented in a second pane. For reasons of spatial economy, it may also be possible via a Viewer selectable option, to increase or decrease the size of the n-User graphical representation(s) and/or textual identification(s) so that more of them are concurrently viewable within the provided space.

It may be desirable, in an embodiment, for the Web Widget 30 to occupy a limited portion of the Viewer's device desktop 24. For this reason, when a large number of n-Users are identified, not all n-Users' graphical representations 32 and textual identifications 33 may be viewable concurrently in the n-User identification section 31. Therefore, in situations when the number of n-Users exceeds the available space of a viewable portion of the n-User identification section 31, the Web Widget 30 may automatically provide a scroll bar 39a. The graphical and textual identifications of a subset of the total n-Users identified will reside in a portion of the n-User identification section 31 that exists out of view of a Viewer. The scroll bar 39a, however, allows a Viewer to scroll throughout an extended listing of n-Users, so that those n-User identifications residing out of view can be brought into view by the Viewer. Therefore, nearly any number of n-Users can be accommodated in an n-User identification section 31.

An n-User interaction section 35 of a Web Widget 30 may also include a graphical representation 36 of an n-User that is or has interacted with the Viewer, such as by sending a text message 37. The graphical representation 36 may be the same image or form of image as presented in the n-User identification section, or it may be different. In embodiments, a graphical representation 36 of the n-User may be omitted altogether from the n-User interaction section, either as configured by the Web Widget provider, or as an option designated by the Viewer. A text message 37 from an n-User may be stylistically presented, such as by using speech 'balloons' shown at 37, or in some other manner. The presentation mode (e.g., font type, color, text size, etc.) of a text message 37 may be Viewer customizable, or alternatively may be predetermined by the Web Widget provider (e.g., a Service, a Host, a User), and configured in a fully or relatively unalterable, default format. In other embodiments, a message from an n-User may also be provided to the Viewer in another Viewer-perceivable form, such as auditory, tactile (e.g., Braille, etc.), visual (e.g., for messages conveyed via sign language for the hearing impaired, etc.), machine-readable, or another as known in the art.

Adjacent to the n-User interaction section 35, or positioned somewhere else within the Web Widget 30 boundary, a text entry space 38 can be provided for the Viewer to compose messages for interaction with n-Users. The text entry space 38 may receive direct text entry from a keyboard, but the embodiments are not so limited. Alternatively, a Viewer may utilize alternative methods and/or devices, as are known in the art, for entering text into the text entry space 38. These alternative methods could include touching a handheld stylus, the User's finger, or some other pointing device to an array of displayed characters directly on a touch-sensitive display screen or other device. Likewise, other methods and/or devices can be used such as eye-gaze tracking systems, sip-and-puff control devices, joystick control devices, voice-recognition control systems, thought-driven control systems, and others adapted for use by Viewers having affected physical capabilities. Although message entry by the Viewer is not limited to textual messages, but may in embodiments include voice-capture means including a sound transducer (e.g., microphone, etc.), a sound recording device and/or media, etc. (e.g., for an auditory message, for voice-to-text conversion, etc.), a video capture means (e.g., for sign language messages), and/or other methods as are known in the art.

Throughout this description, these and/or any other data entry methods, devices, or systems, existing or reasonably anticipated by those having ordinary skill in the art, can be used by a Viewer to accomplish data entry and/or selection of GUI represented commands according to alternative embodiments of the invention. Therefore, to avoid prolix and repetition, such capabilities, devices, or systems will not be separately indicated in the description of each embodiment and/or instance, but should be recognized as within the scope of the invented embodiments.

The text entry space 38 will generally also include a method for sending the text entered therein to specific n-Users, to a subset of n-Users, or to all n-Users. In a common embodiment, the Viewer may simply tap an 'Enter' or similarly labeled key on their keyboard. Alternatively, the Web Widget 30 can include a graphical representation of a button which, when selected by the Viewer, sends the text message to one or more n-Users. The Viewer may select the n-User recipient(s) for a message directly, such as by clicking on their graphical representation(s) with a mouse or other selection device, or by selecting their name(s) from a drop down list that appears when sending a message. Alternatively, a Viewer may be able to select their message and drag it to the graphical and/or textual representation of an n-User to send the message. The Viewer's messages may also appear in the n-User interaction section 35 to help the Viewer keep track of the content and context of interactions, and this could be an optional setting that the Viewer can select or not, as preferred by the Viewer.

As with the n-User identification section 31, the n-User graphical representations 36 and/or text messages 37 of an extended exchange of messages with n-Users may not fit within a limited viewable space of the n-User interaction section 35. Therefore, a scroll bar 39b may likewise be provided for this section, to allow the Viewer to scroll throughout an extended listing of n-User messages.

One of the key benefits of a Web Widget 30 described herein, is that it provides a means to link the Viewer with one or more n-Users based at least in part on the sameness and/or similarity between their respective Content-relative actions, enabling live (e.g. concurrent), multi-party interaction. The Viewer can interact with n-Users, and n-Users can interact with other n-Users, so that each is both a participant in and a spectator to a continuously developing community dialogue. Unlike such forums as YOUTUBE™, FACEBOOK™, MYSPACE™, etc., the Content viewed by either a Viewer or n-User, which provides the basis for linking, does not have to be uploaded to the Service (e.g., for example, as a video is uploaded to YOUTUBE™) before it can be shared with others, or can be used to establish a link. Rather, a Content that a Viewer and/or n-User views, whether from a website, a data storage medium (e.g., DVD, hard drive, etc.), or otherwise, can be analyzed by a content analysis means as described herein, with the results of such analysis being utilized by the described tools to link a Viewer with others in a live social network. Likewise, that same Content can be shared with and concurrently viewed by others without those others having to search for and download the Content from a central service.

Therefore, one having ordinary skill in the art will understand from the description therein that underlying the graphic form of a Web Widget 30 are a multitude of functional capabilities, enabled by software encoded tools or otherwise, providing for the interactive capabilities of the Web Widget 30. Examples of these tools include e-mail, internet and/or text messaging, voice messaging, n-User recognition, and others. Such tools can be resident at a Viewer's device, or resident at a Service and running (e.g., accessed, selected, executed, etc.) remotely via a persistent connection between the Viewer's device and a Service, for example. These tools and/or capabilities are, in embodiments, also considered part of the Web Widget 30.

Also included within the boundary of a Web Widget 30 may be a linking device (e.g., button, hypertext, etc.) providing access to other tools and/or services provided by the Service for use by Viewers. FIG. 3 depicts an embodiment of a link 301 to the "ADDnCLICK Full Shared Window Experience" (described in more detail below). A Viewer can, by selecting a provided link, gain access to tools and capabilities enabling a much richer, broader, Content-based, interactive experience with individual n-Users or communities of n-Users. A Web Widget 30 can be placed in, on, or otherwise relative to any webpage, website, or other visual interface (e.g., GUI) of an internet connected or connectable device. Therefore, a Viewer can experience the benefits conveyed by a Web Widget 30 using such devices, including obtaining extended tools and capabilities such as Shared Windows and others.

As described with regard to the link 301 in FIG. 3, and shown at 6 in FIG. 1, another approach by which a Service can provide Viewers with access to Service tools and/or capabilities is via a Service-branded link placed in, on, or otherwise associated relative to Content, other than in a Web Widget 30. A Service-branded link can be associated with any website on the internet, and/or with nearly any type of visual Content that can be displayed using an internet connected or connectable device.

Figure 4:
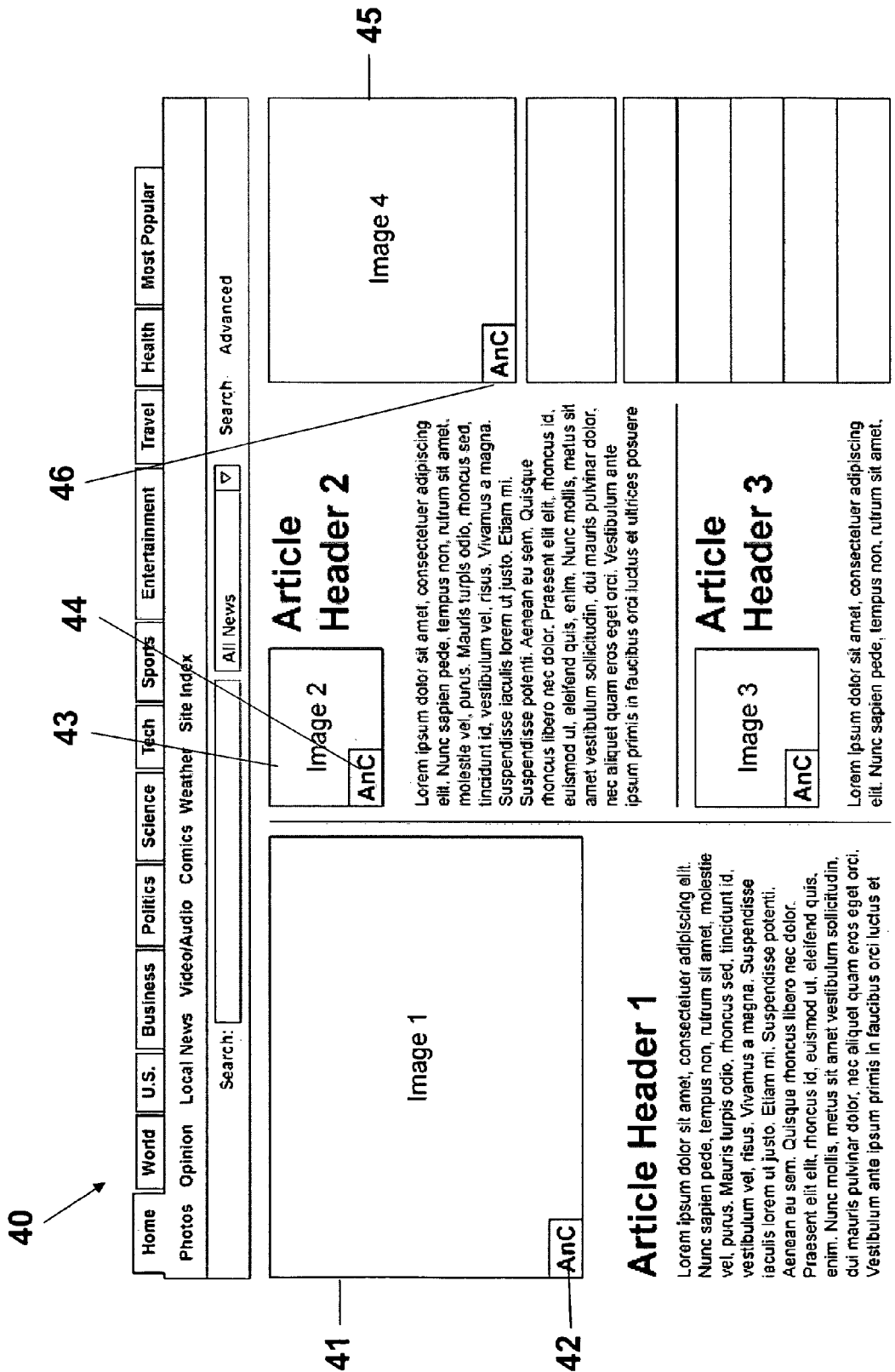
FIG. 4 depicts Service-branded links associated with Content according to embodiments of the invention.

FIG. 4 depicts an embodiment of a web page 40 dedicated to delivery of news-related Content. A graphic image 41 (e.g., photograph, etc.) displayed in one portion of the webpage serves the dual purposes of delivering visual Content to Viewers regarding a news story of interest, and also serves as a clickable link (e.g., hyperlink) to the news story itself and/or to additional multimedia Content, for example. Located at a lower corner of the photograph 41 is a Service-branded link 42. The link 42, when selected by a Viewer, causes the User's device to connect with a Service server. The Viewer's device then displays a Service webpage in either the window previously displaying the news webpage, or in a separate window opened by the browser. The link 42 could alternatively be placed anywhere else within the border of the photograph or adjacent to it. Similarly, image 43 also includes an associated Service-branded link 44, although the image 43 itself is not also an active hyperlink to additional Content. Images including Service-branded links are not limited to photographs, but may include nearly an type of graphic image that can be presented as some portion of a viewable display of an internet connected or connectable device.

Visual Content 45 is a still image taken from and representing the presence of, or a link to, a full motion video. A User can choose to play the video either as located in the web page, or in a separate window that opens when the Viewer selects the Content 45. A Service-branded link 46 is associated with the Content 45, and is visible and selectable by the Viewer whether the Content 45 remains as simply an unselected still image or is played in full motion. When the video plays in full motion, the Service-branded link will appear to hover over a portion of the video image in some embodiments. Further, when a window or image including a Service-branded link is increased or decreased in size, such as by enlarging or shrinking the window containing an image, the Service-branded link will either remain the same size, or change size corresponding to the change in size of the image and/or window, according to alternative embodiments or alternative selections w/in an embodiment.

Images comprising portions of web pages, for example, frequently include embedded hyperlinks that navigate a browser to additional Content when selected, or that enlarge when selected to provide a more detailed view of the image. Numerous other controls may be embedded into an image, or be activated by selecting an image (e.g., clicking on the image using a computer mouse peripheral). Associating a Service-branded link with the Content, such as shown by links 42, 44, and 46 in FIG. 4, generally does not interfere with or otherwise alter the way an image responds when selected. The primary tangible impact is that selecting any portion of the image within the boundaries of the Service-branded link will navigate the Viewer to a Service server, rather than activating whatever other function(s) or effect(s) would otherwise be initiated by selecting another portion of the image. As with the previously described Service-branded links 42 and 44, link 46 will also generally cause the User's browser software to connect with a Service server.

As shown at 8 of FIG. 1, a Service can also provide Viewer access to a Service through the use of a referral link. A referral link constitutes any link to a Service provided to the Viewer by a third party, such as by including a URL for a Service within an e-mail message, generally for the purpose of encouraging Viewers to utilize the Service. A referral link could be part of an advertisement placed with a search engine (e.g., GOOGLE™ search-relevant advertising) or can be obtained as the result of a search using the search engine. A Host that sells products, such as AMAZON.COM™, in a section that provides product reviews or recommends other products potentially of interest to a purchaser, could also include a referral link to a Service. Therefore, a Viewer could access Service tools and/or capabilities, and interact with others to gain information, and join or form a social network or community relative to products and/or Content. Alternatively, a referral link can be provided in a menu selection within a video game or within digital media (e.g., a DVD movie), or otherwise associated with viewable Content. A referral link is provided within the attention and/or range of access of a Viewer when viewing or when navigating to and/or from Content, in a manner allowing the Viewer to select the link and connect with a Service server.

Figure 5:
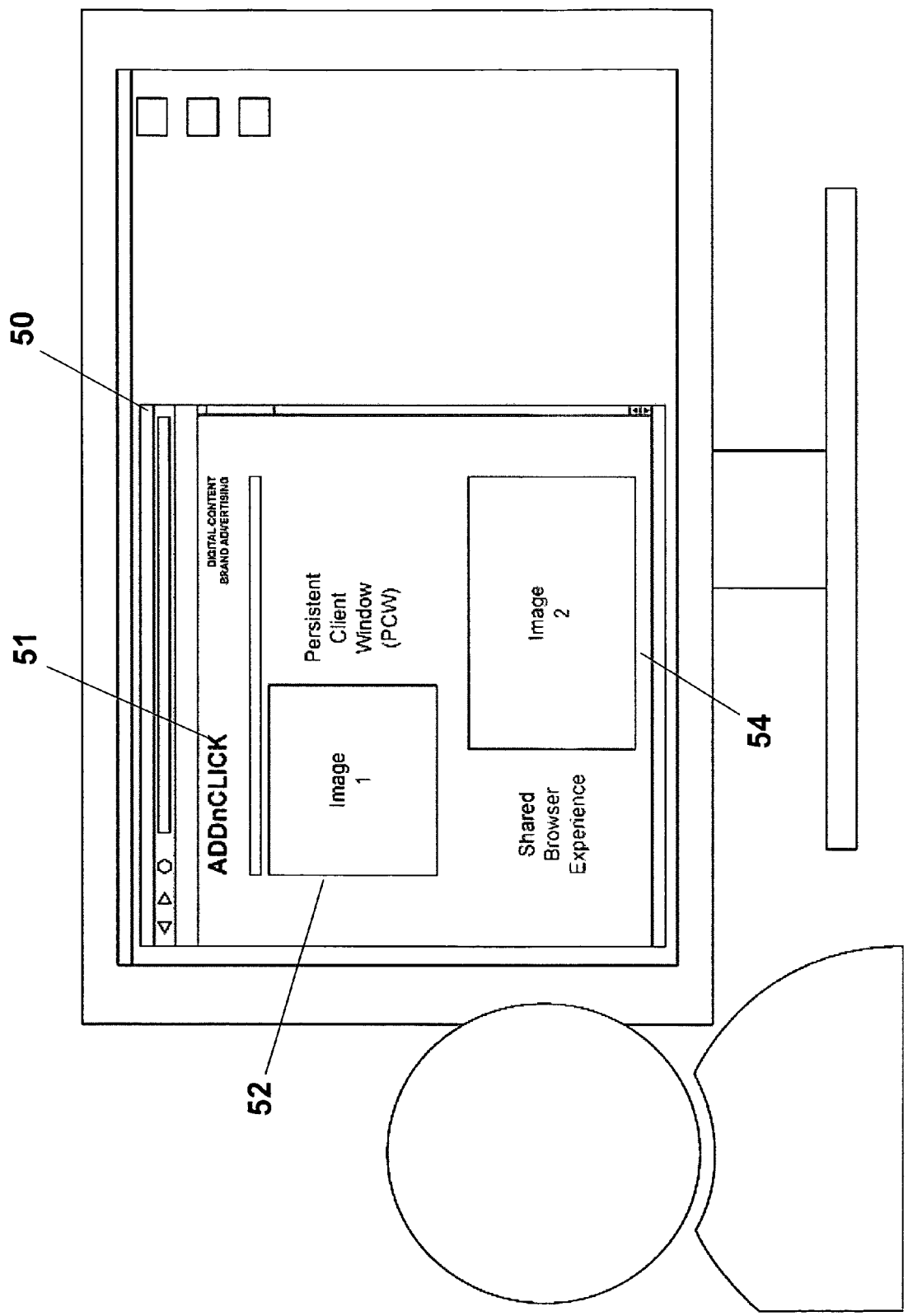
FIG. 5 depicts Service tools at a Service web page according to an embodiment of the invention.

In general, accessing, navigating to, or connecting with a Service server by one of the above described embodiments will constitute accessing, navigating to, or connecting with a web page from which, either directly or indirectly, the Viewer can obtain a license to, and/or download for use, Service software tools and/or capabilities. As shown in an embodiment depicted in FIG. 5, an internet browser window 50 displays for the Viewer a Service web page 51, (e.g., ADDn-CLICK™). In the depicted embodiment, two software tools and/or capabilities available for downloading are also presented to the Viewer; a 'Persistent Client Window' 52 (PCW, or when used for the delivery of channels of content, is also known as a Unified Media Center (UMC)) and a 'Shared Window Experience' 54 (or 'Shared Browser Experience'). Of course, a Service can also provide other software tools or capabilities to Viewers, or present them to Viewers in ways other than the graphic images and text labels depicted in FIG. 5. FIG. 5 simply depicts one embodiment for illustrative and descriptive purposes. Likewise, rather than accessing a Service server, a Viewer may instead access a Host or third party server, or even a node within a relatively self-contained network, and gain access to Service-provided tools and capabilities. In still other embodiments, Service-provided tools and capabilities can be accessed from computer readable media readable by a Viewer's device.

A Service webpage or other source may also, according to embodiments, provide information about the use, features, capabilities, history, characteristics, compatibility, or other information regarding each of the available tools, including instructions for how to select and access (e.g., download, run directly from a Service server) a tool. The Service, therefore, allows tool selection by Viewers, as shown at 10 in FIG. 1. For example, to download the Persistent Client Window in an embodiment, the Viewer can simply select the Persistent Client Window graphic image or text label by clicking on it with a computer mouse. Whichever is the provided or preferred method according to a particular Service and/or Viewer, the Viewer will, in an embodiment, select a tool and/or capability for access.

Figure 6:
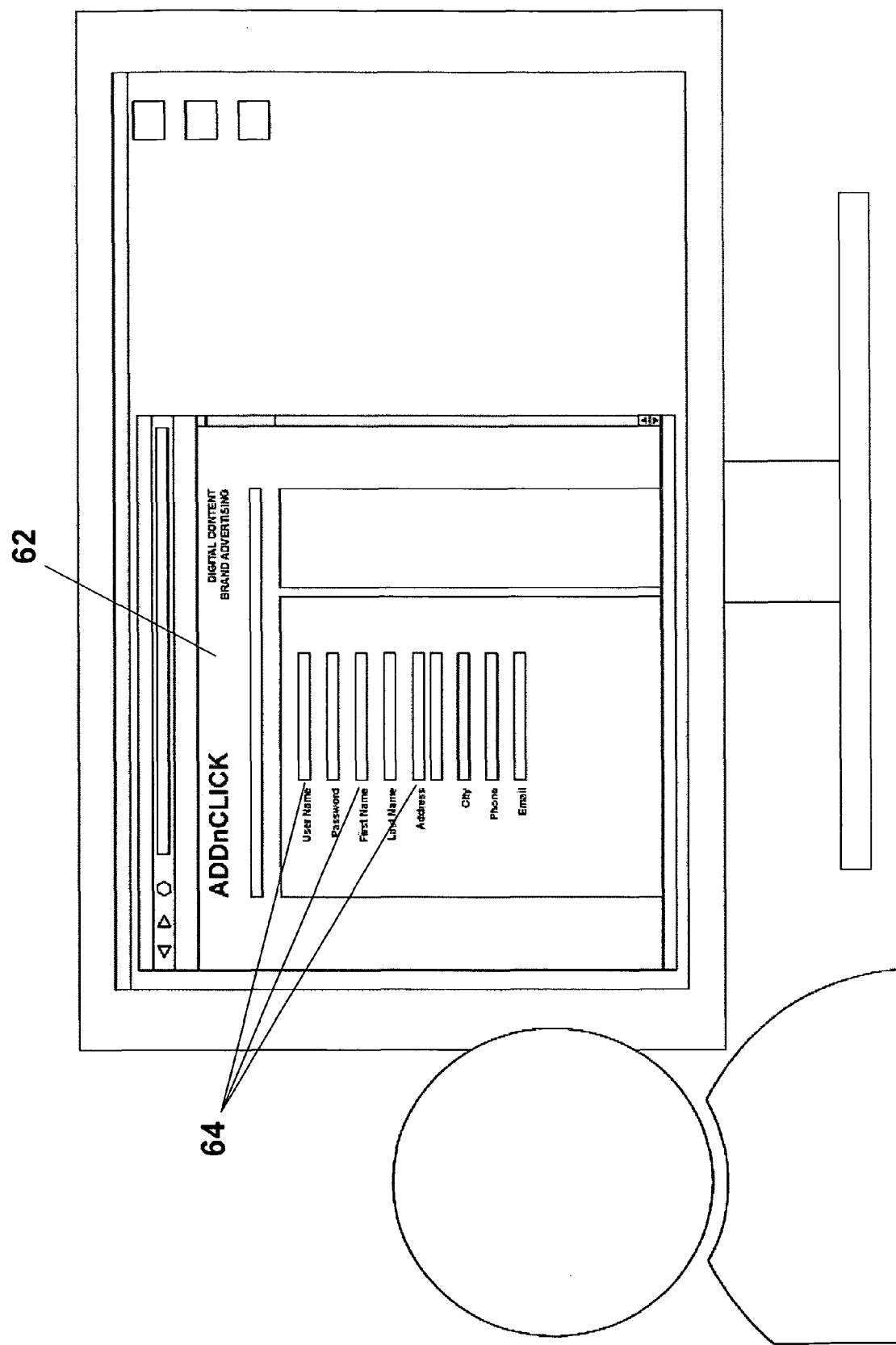
FIG. 6 depicts a Viewer-relevant information entry form according to an embodiment of the invention.

Frequently, but not always, before providing a Viewer with a license to use tools, or providing access to the tools and/or capabilities themselves, a Service will first collect basic information about the Viewer. Such information, at a minimum, enables a Service to identify the Viewer during subsequent interactions. Additionally, collecting Viewer-relevant information, and the ability to identify Viewers and their various Service-related activities, enables numerous revenue generation activities according to embodiments of the invention, and aids a Service in establishing communities of Viewers and n-Users. Therefore, as shown in an embodiment in FIG. 6, after a Viewer selects a tool and/or capability, a Service will frequently (but not always) request the Viewer to provide Viewer-relevant information.

The request may include providing a form 62 with one or more data-entry fields 64 into which the Viewer can directly type or otherwise enter information (e.g., metadata descriptions of the Content, viewer/subscriber information, etc.). Each data entry field 64 will generally have an associated label to ensure the Viewer enters the proper information into the proper field. Consistent data entry is beneficial. It allows a Service to automate construction, organization, and search of databases of Viewer information, enabling and facilitating numerous other automated operations. Data entry fields 64 can also be configured with defined limits on the type, arrangement, number, or form of characters that can be entered and/or submitted via the form, to promote submission of accurate and useful data to a Service.

Alternatively, numerous other methods may be used for collecting Viewer-relevant information according to alternative embodiments. The Service may be able to harvest Viewer-relevant information directly from the Viewer's computer, or from a third party (e.g., a Host) to whom the Viewer has provided relevant information. In such situations, the Viewer may provide express consent to the Service for collecting data, or consent may be implied or express according to a pre-existing agreement between the Viewer and a third party. According to other embodiments, the Service may initiate an interactive inquiry dialogue with the Viewer wherein the Service asks questions of the Viewer, and the nature of each subsequent question depends at least in part upon the answers provided by the Viewer to at least one earlier question. For example, the Service may ask the Viewer, "Is the tool to be used by a commercial corporation?". If the Viewer answers in the affirmative, the Service may then ask, "What is the primary service and/or product of the corporation?". However, if the Viewer answers in the negative, the Service may ask, "Is the tool to be used in a private household?". Therefore, a Viewer' answer to at least one question affects the nature of at least one subsequently (e.g., later) question. By using this approach, a Service may be able to recognize specific or general needs of the Viewer, and provide an appropriate type of licensing and/or access to Viewers (as from a plurality of available licensing and/or access variants according to embodiments) based upon their responses.

Once the Service (or a third party provider) has successfully collected from a Viewer at least a minimum amount of Viewer-relevant information specified by the Service (in embodiments where a Service so requires) at 12 in FIG. 1, the Service will then, at 14, provide the Viewer with access to tools and/or capabilities. Providing access may include providing an authorization code, license, receipt, confirmation number, or other indication that the Viewer is authorized to receive and/or use the Service tools, services and/or capabilities (hereinafter, collectively 'tools'). For example, although a Viewer may have obtained Service-provided software tools from another Viewer, the Viewer may be prevented from using the tools by special security provisions build into the tools. The security provisions may operate based on the Viewer's identity (determined, for example, by biometric identification tools), based on a unique device identifier (so that the tools only run on a licensed device), or based on a network node identifier (e.g., an IP address), although the embodiments are not so limited. Alternatively, security provisions can include any of a vast number of other associations with which access permission may be affirmatively conditioned.

A Service may require the entry of an authorization code by a Viewer at the time of, and as a condition of, downloading the tools from the Service or a third-party provider, or as described above, may require a code at a later time to install and/or activate the tools after downloading or otherwise delivering the tools to a compatible device.

Figure 7:
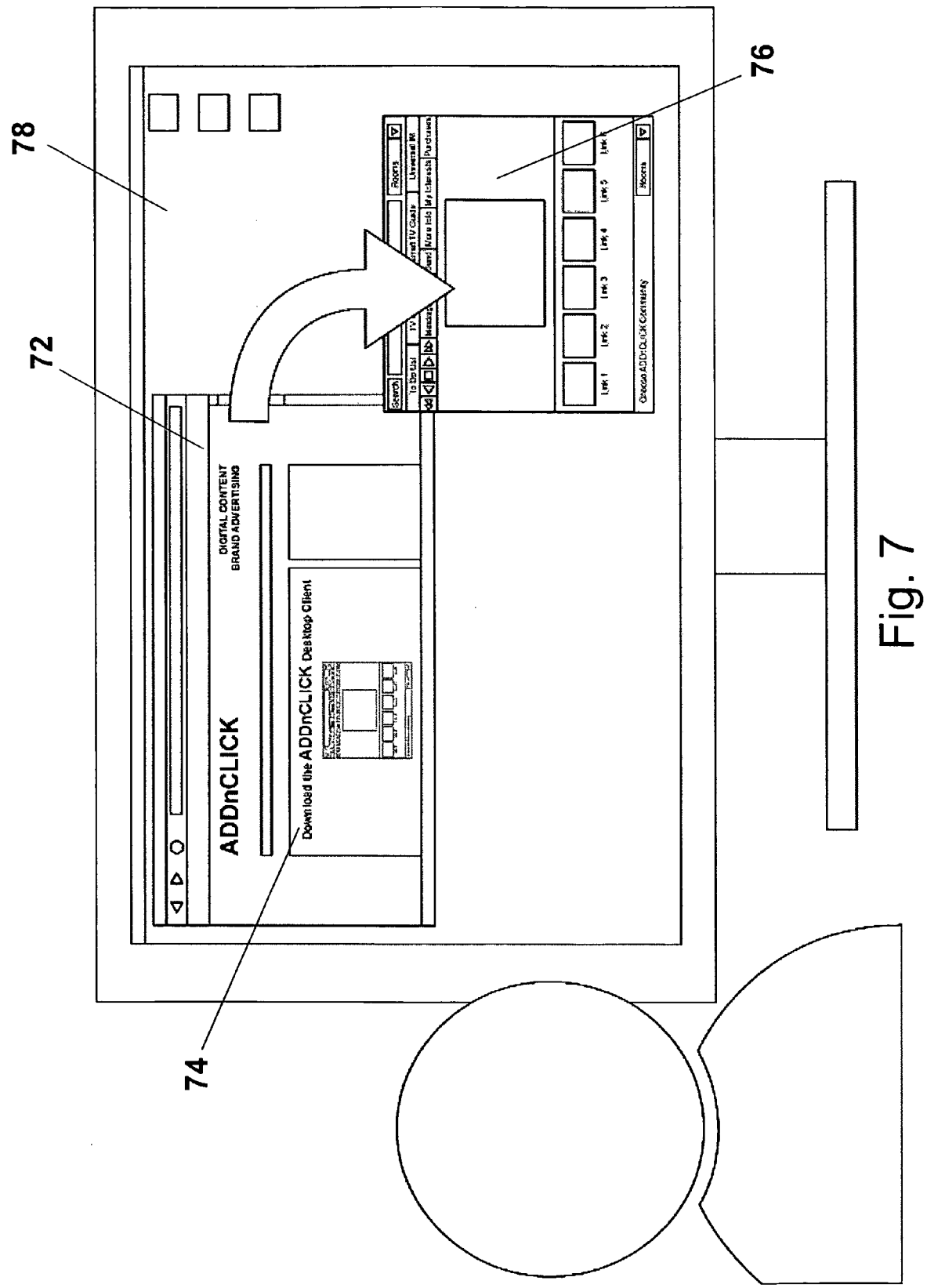
FIG. 7 depicts accessing a Persistent Client Window according to an embodiment of the invention.
Figure 12:
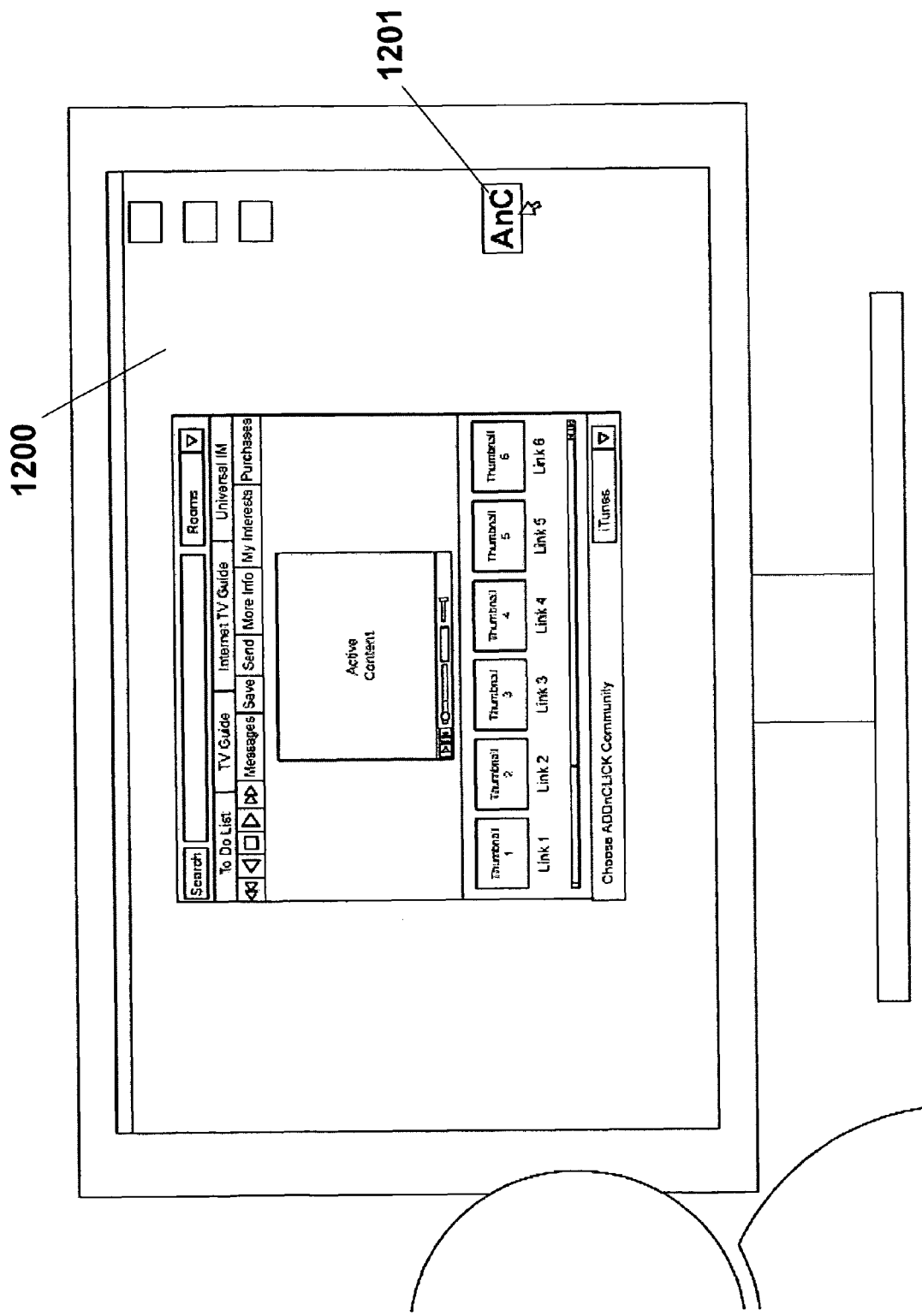
FIG. 12 depicts an icon on a device display, for activating a Service-provided tool according to an embodiment of the invention.

In an embodiment depicted in FIG. 7, a Viewer selects a link 74 at a Service web page 72 to access a Service-provided 'Persistent Client Window' 76. The Persistent Client Window 76 then becomes available to the Viewer on the Viewer's device desktop 78. At the same time, and in the same operation, a Service-linking icon may also be delivered onto the Viewer's device desktop (see 1201 in FIG. 12). As presented to the Viewer, all or at least a subset of the Persistent Client Window's functional options are available for selection by the Viewer, according to their pre-configured modes of operation. Alternatively, the Viewer can choose to access, and the Service could grant access to not only the Persistent Client Window, but also any or all of the other Service tools that are available to the Viewer, based on the license and/or access level granted to the Viewer by the Service. In embodiments, this could include the full suite of services and/or capabilities available from the Service.

Persistent Client Window

In a sense, a Persistent Client Window can be considered a 'Unified Media Center' desktop or webtop widget. As such, a Persistent Client Window is a scaleable presence that may, and generally will once accessed, remain open on the Viewer's device desktop or webtop while the device (e.g., power and operating system) remains active. A Persistent Client Window, like other 'windows' commonly used in graphical user interfaces (GUI), can be repositioned on a desktop or webtop, increased or decreased in size (or made to disappear), superimposed by or over other windows, or otherwise arranged relative to the desktop or webtop for the Viewer's convenience. Further, in embodiments, there can be more than one Unified Media Center or other such Persistent Client Window on the desktop or webtop, and a Viewer can have more than one Persistent Client Window open and active concurrently.

A Persistent Client Window generally may or may not be an operating system-dependent or platform/device-dependent software application. Therefore, it is generally not an application which functions, for example, only with MS Windows or only with APPLE MAC™ operating systems, although it may be according to some embodiments. Nor does it function only on, for example, personal computers. Rather, a Persistent Client Window is, in embodiments, a combined suite including a GUI and numerous GUI-influenced and/or influencing capabilities, as well as the software code underlying, influencing, and responding to a Viewer (or other's) interaction with the GUI. Various capabilities of the Persistent Client Window are selectable and/or activated by selection means (e.g., icons, hyperlinks, 'buttons', etc.) presented to a Viewer in the GUI.

A Persistent Client Window can be used on computers, video game systems, handheld electronic devices having displays, mobile telephones, entertainment systems (e.g., digital video disc systems, video cassette systems, digital video recording systems), and virtually any other electronic systems and/or devices including or coupled with a display on which a Persistent Client Window can be displayed to a Viewer. Nor is a Persistent Client Window limited to use on or with consumer systems, but can likewise or similarly be used in conjunction with commercial, industrial, analytical, educational, military, and/or other systems.

Indeed, mixed uses by various user groups or communities of Persistent Client Windows, such as those described above and others, are contemplated as being within the spirit and scope of the invention. For example, but not to limit the invention in any way, a user group or community might develop based upon a particular source of goods or services, wherein at least part of the focus of the shared-interests of the users invited into and sharing a Persistent Client Window is commercial. Say a user who prefers CRAFTSMAN™ tools or KENMORE™ appliances is meta-discovered by another user, and the two or more build a SEARS™-based community. Now, others who also enjoy what Sears has to offer might join the SEARS™ community and share content and other benefits. SEARS™ itself might build an e-commerce presence around and within such a community as part of the shared experience, (e.g., SEARS™ might join the community as another user). Ultimately, then, a community can enjoy in a Persistent Client Window the full SEARS™ experience including the commercial part of that experience.

Thus, the GUI and capabilities enabled by a Persistent Client Window provide benefits to a wide variety of Viewers, and the embodiments described herein should be understood as illustrative of only a subset of the potential, conceived capabilities and applications of a Persistent Client Window.

In addition to providing a convenient and intuitive GUI for the Viewer, a Persistent Client Window also includes numerous background functions. These functions operate at least in part based upon the Viewer's interaction with the Persistent Client Window GUI, and/or other Viewer activities using the device. A Persistent Client Window GUI is described in more detail below.

Persistent Client Window tools, access, or other capabilities can be run directly from, or obtained by directly downloading them from, a Service server, a host service, or from another third party provider. Persistent Client Window tools can also be preloaded on a device prior to purchasing the device, or may be obtained from a provider on a device (e.g., computer) readable medium (e.g., optical, magnetic, or solid state data storage media). A Viewer or n-User for example, can also, according to alternative embodiments, obtain Persistent Client Window tools that are packaged with and/or embedded within other software tools, delivered as a device capability upgrade via either a wired or wireless network connection, or otherwise provided or obtained so as to be operational on or through the use of a Viewer's device.

Figure 8:
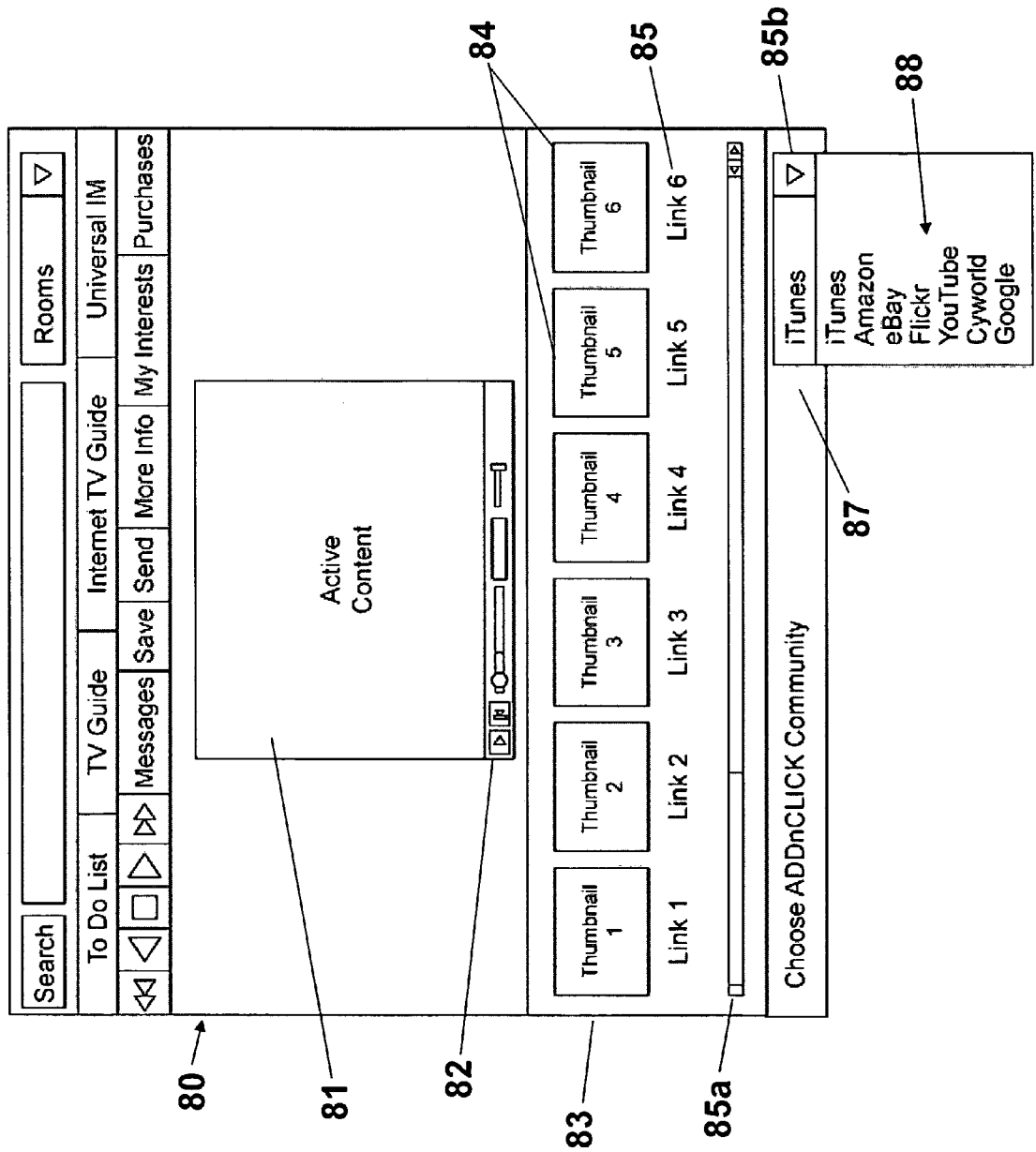
FIGS. 8-11 depict features and tools of a Persistent Client Window according to embodiments of the invention.

Referring first to an embodiment depicted in FIG. 8, the GUI of a Persistent Client Window 80 includes numerous elements—some which are preconfigured by the Service, and others which, although preconfigured in some respects, may be altered by the Viewer in other important respects. The elements listed and described herein, however, are for illustrative purposes only, and are not intended as an exclusive list of all visual and/or functional elements that are or may be present as part of a Persistent Client Window.

As shown according to the embodiment in FIG. 8, a Persistent Client Window 80 includes an integral Content display 81 where static (e.g., still photographs), active (e.g., full-motion video), or other Content images are displayable. The integral Content display, where beneficial and/or necessary, also includes controls 82 to facilitate, for example, video playback, slide show navigation, video game playing, image manipulation, and/or other actions taken with respect to Content viewable via the integral Content display 81. Such controls may also include status indicators which provide the Viewer with information related to the status of the viewable Content. For example, a status indicated can display how long a video has been playing, or a Viewer's score in a video game, the number of slides in a slide show and the slide number being viewed, or other relevant and typically, but not exclusively, variable parameters.

An integral Content display 81 can be increased or decreased in size relative to or dependent upon the size of the Persistent Client Window 80. If the former, the integral Content display 81 can be caused to occupy a larger portion of the area within the Persistent Client Window 80, or to occupy a smaller portion, as compared to some 'default' size. If the latter, the integral Content display 81 changes in size relative to and consonant with changes in the size of the Persistent Client Window 80. Alternatively, the size of the Persistent Client Window 80 and/or the integral Content display 81 may automatically adjust in response to another action with regard to the device. For example, and according to one embodiment, a Viewer may provide, by a Viewer selectable option, for the Persistent Client Window 80 to shrink in size (e.g., minimize) on the desktop when another software program is activated for use. Thereafter, and until such setting is again changed by the Viewer, the Persistent Client Window 80 and integral Content display 81 may automatically shrink or disappear when the other software program opens on the desktop.

The Content viewed in the integral Content display 81 will frequently be related to a particular 'Community' a Viewer has selected from a Community selection portion 83 of the Persistent Client Window 80. As shown in FIG. 8, a Community selection portion 83 of the Persistent Client Window 80 can, in embodiments, display graphic representations 84 (e.g. icons) and/or textual labels 85 of numerous 'Communities' of n-Users related to topics selected by the Viewer and/or otherwise. For example, the internet website and presence YOUTUBE™ can serve as a Content-basis for a Service-centered Community of n-Users, of which the Viewer can be a part. A Viewer, therefore, may choose, as in the embodiment depicted in FIG. 8, to place a graphic representation and/or textual label representing a YOUTUBE™-based Community, or another Community, into the Community selection portion 83 of the Viewer's Persistent Client Window 80.

A Viewer can choose to connect to a Content-based Community by any of several operations. According to one embodiment, a Viewer can simply place a mouse cursor over the graphic representation or textual label of, for example, the YOUTUBE™-based Community, and click, double-click, or otherwise affect selection thereof. In an alternative embodiment, the Persistent Client Window 80 includes a 'drop-down' selection menu 87 listing all or some portion of the total Communities designated and/or otherwise available to a Viewer. The Viewer then selects, for example, YOUTUBE™ 88 from the list of available Communities, by using a mouse, or arrow keys on a keyboard, or some other method. By whichever method the Viewer chooses to use, the selected Community becomes active within the Persistent Client Window 80, and the integral Content display 81 will display Content relevant to the selected Community (e.g., YOUTUBE™).

Alternatively, the Content viewable within the integral Content display 81 may change dependent upon what Content is currently, or has been recently, viewed by the Viewer in another window on the device desktop or on another interconnected device. For example, the Viewer may, in an embodiment, connect to the NATIONAL GEOGRAPHIC™ website using an internet browser software program (e.g., MS INTERNET EXPLORER™, APPLE SAFARI™, MOZILLA FIREFOX™, NETSCAPE NAVIGATOR™, etc.). The Service tools functionally underlying the Persistent Client Window 80 will detect the Content displayed by the Viewer's browser software, and may likewise display the Content or related Content in the integral Content display 81 of the Persistent Client Window 80. Alternatively, the Viewer can view Content using another device that is connected by wire, or wirelessly, with the device upon which the Persistent Client Window and other Service software resides. Thus, when the Viewer views Content on the other device, for example a video game (e.g., Doom), the Service software will detect the Content displayed by the other device, and may display the same or related Content at the integral Content display 81 of the Persistent Client Window 80.

A Viewer may occasionally place more Community representations into the Community selection portion 83 of the Persistent Client Window 80, or on the drop-down menu 87 than can be concurrently displayed within the available visible space. Therefore, both the selection portion 83 and the menu 87 can, in embodiments, include a scroll bar 85*a*, scroll arrows 85*b*, or some other similarly functioning feature to allow a Viewer to move selectable Community representations 84/88 into and out of visible range.

While the Persistent Client Window 80 provides a Viewer with a convenient and intuitive GUI for selecting and connecting to Communities, and viewing, to some extent, Content related to Communities, the GUI of the Persistent Client Window is only a small part of the overall functionality and value provided to the Viewer (and others) by Service tools. A Service, through the use by Viewers of its tools, monitors the Content viewed by the Viewer, and links the Viewer to live social networks based at least in part on the Content (e.g., linking users to other users who are concurrently engaged in the same or similar content on a network-connected or connectable device), and/or at least in part on the Communities selected by a Viewer. In a broad embodiment, a Service can link a Viewer into a live social network with other Service-registered n-Users relative to any Content, any internet-based application, and/or any Content-based Community (e.g., internet web site), wherein those n-Users are engaged in Content having the same or similar metadata, subject matter, context, or other characteristics as the Content engaged in by the Viewer. A large variety of powerful features, functions, and capabilities underlie and supplement the Persistent Client Window, and the Persistent Client Window may be understood in large part, according to some embodiments of the invention, as a control panel for the broader capabilities of a Service and its tools. Therefore, a description of many of the features, functions and capabilities ('content-based social networking controls') of the Persistent Client Window will serve to illustrate some of the numerous embodiments of the invention.

Figure 9:
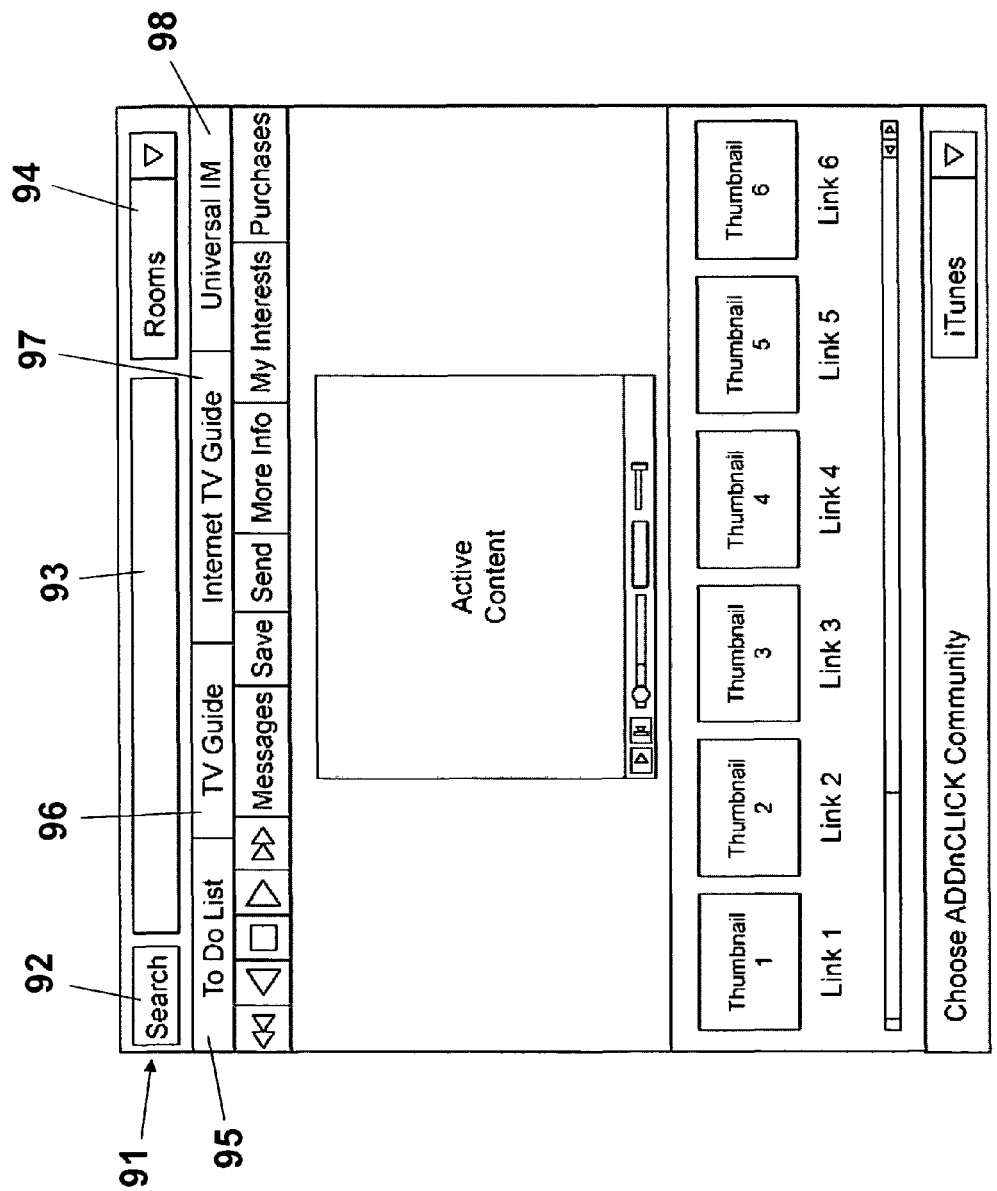

With reference to an embodiment depicted in FIG. 9, a Persistent Client Window 80 includes features, tools, and functions for conducting searches for Content, Communities, or other information or items. For example, a search bar 91 in FIG. 9 includes a text entry field 93 for a Viewer to type or otherwise enter one or more keywords to guide a search for information, Content, Communities, n-Users, or web presences (collectively 'Materials') related to the keyword(s). Alternatively, a Viewer can use a natural language inquiry, for example, "I'm interested in landscape photography", and Service tools will be able to interpret and process the natural language inquiry to direct a search. In still another embodiment, the Viewer can specify search keywords or natural language questions by audible speech, interpreted by a speech recognition system. After entering text into the text entry field 93, the Viewer can initiate a search by either selecting the 'Search' 'button' 92, by pressing the 'Enter' key on a connected keyboard, or by appropriately activating a generally analogous command entry device, control, or feature.

Figure 10:
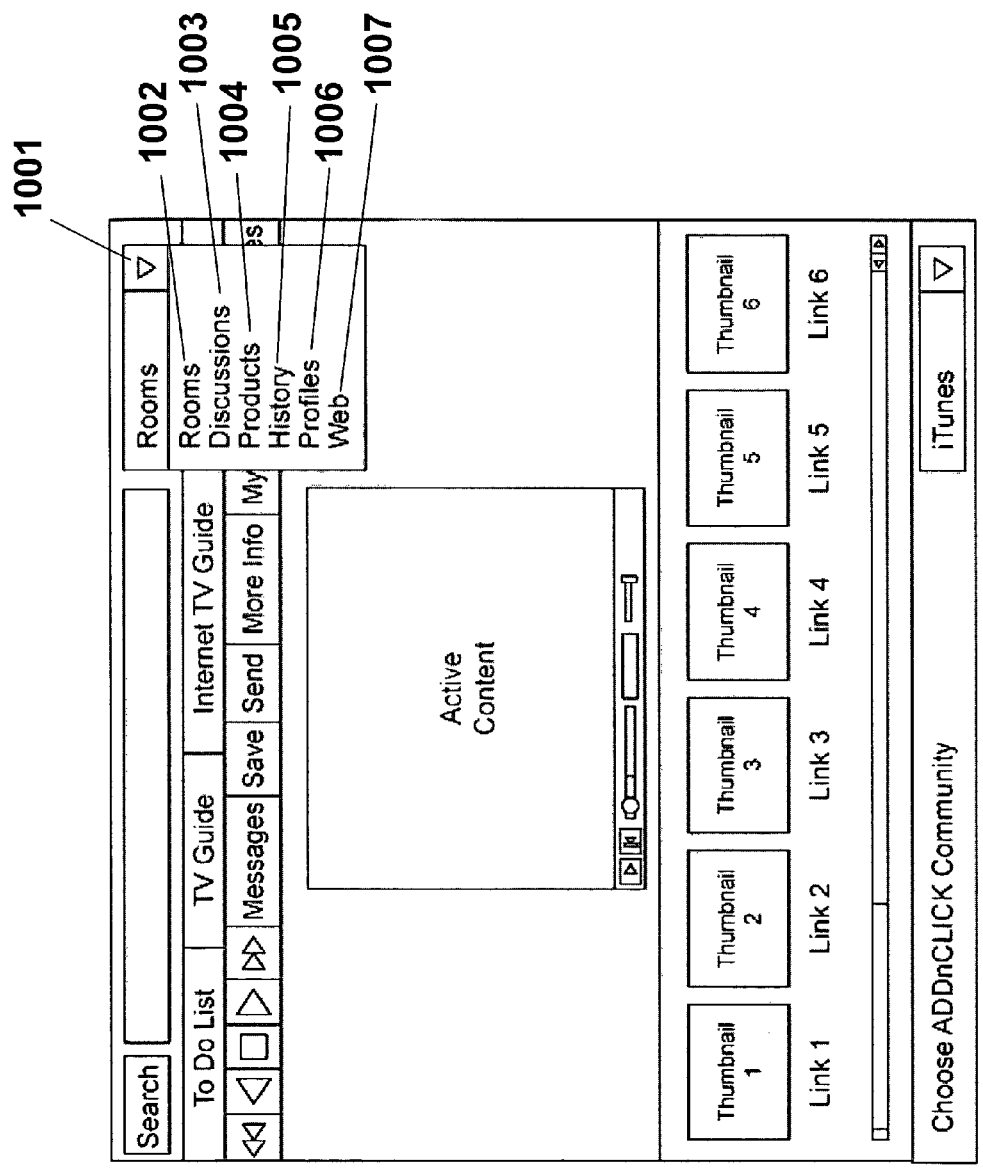

Alternatively, or additionally, a search bar 91 of a Persistent Client Window 80 will have a drop-down menu 94 listing numerous options for conducting searches for materials. As shown according to the embodiment in FIG. 10, selecting a menu control 1001 causes a drop-down menu to open and display numerous search options 1002-1007, although other embodiments can include fewer, more, or different search options. For example, a Viewer can search for relevant Rooms 1002 within a Community. Communities (e.g., YOU-TUBE™, MYSPACE™) can have Rooms established either by the Host, or by n-Users when the Host has provided the capability for n-Users to establish rooms. A Room can be Content-based, event-based (e.g., Smith family reunion), or based on a specific or general category of Users (e.g., ABC University alumni), although the embodiments are not so limited. Or, for instance, a Viewer could enter specific Metadata terms in the search to be connected to other users who are engaged in the same or similar content, or Content having the same or similar Metadata as entered by the Viewer.

By specifying a Room search and a keyword, the Persistent Client Window 80 will generally only search for and return results indicating Rooms within a Community having relevance to the keyword. For example, searching in the YOU-TUBE™ Community for Rooms relevant to the keyword "Smith" could return a result including a Room for members of the Smith family relative to a family reunion. Likewise, the numerous other search options in a drop-down list function similarly.

Discussions 1003 can also be specified in a search. Many Host sites sponsor discussion groups, which are typically but not exclusively topic-focused. For example, WWW.CRAIGSLIST.ORG includes discussions, also referred to as 'discussion groups', on such topics as films, gardening, jokes, pets, and wine, as just a few examples. Discussions could include moderated internet discussions, discussions conducted by text or by voice, or discussions as part of a virtual classroom, as just a few examples among many embodiments.

A Viewer can also search for Products 1004 relevant to a specified keyword, whether the products are offered for sale (e.g., commercial seller, private seller, on-line auction), for trade, for free, or even 'Products wanted'. A Product search could locate relevant products from nearly anywhere products are advertised or otherwise depicted on an internet-linked network, device (e.g., server), webpage, or other 'location' searchable by an internet-linked search utility. A product located via a Product search can then be purchased, in embodiments, as described below.

A History search 1005 could locate rooms, discussions, products, profiles or other such materials that the Viewer has visited, searched for, and/or located by a search in the past. A Profile search 1006 can be used to search for one or more n-Users based on information in a profile established by or relative to each n-User. A profile could be a Service profile established based at least in part upon registration information, or could be a profile established for another purpose, such as a social networking profile (e.g., MYSPACE™), a job applicant profile (e.g., MONSTER.COM™), or a student profile (e.g., UNIVERSITY OF PHOENIX™), just to list a few of the many searchable profile types.

Additionally, a Viewer can specify a Web search 1007 from a drop-down menu. Web search engines such as GOOGLE™, YAHOO™, or others could pay for placement in the Persistent Client Window. Specifying a search in the Persistent Client Window activates a search by a contractually associated, commercial search engine for example, although contractual association is not required in all embodiments. Generally, any search that a Viewer initiates according to the embodiments listed above will include a search within Communities connected to or by a Service, each of which may be considered 'Service Communities' (e.g., ADDnCLICK™ communities).

Another capability available in a Persistent Client Window, as shown with regard to the embodiment in FIG. 9, includes a 'To Do List' 95. A To Do List 95 could provide a means for a Viewer to list and/or organize tasks that the Viewer considers important. Alternatively, a Viewer may be able to allow/authorize Hosts, n-Users, a Service, or others to place tasks on the Viewer's Persistent Client Window To Do List 95, such as to inform the Viewer of the nature of a task, a required completion deadline for a task, interdependencies between tasks, or other useful information. A To Do List 95 could be used for listing tasks relevant only to use of a Service, as an all-in-one task list, or for some other scope or categories of tasks that a Viewer may wish to designate.

A television or other such "audio or audio-video content" listing can be provided in a Persistent Client Window, analogous to and herein called a television guide ('TV Guide') command button ('tool') 96. A Viewer can use the TV Guide 96 to search for television Content, whether broadcast through the airwaves locally or at a distance, via satellite or by electrical or fiber optic cable systems, and whether open access or available only by subscription. A TV Guide can also provide programming information about television programs broadcast within a limited-access distribution (e.g., military, corporate, educational, governmental, or other), such as training videos, meetings, legal proceedings, sporting events, movies, or other such Content. The TV Guide tool 96 could link to a commercial broadcast guide service (e.g., TV GUIDE.COM™), which could pay a Service for placement within the Persistent Client Window.

It is not necessary that a device be able to receive and translate transmitted television signals, and display television Content to a Viewer. The TV Guide (the listing of all available content channels which may include titles or names of their specific content) may, in embodiments, be simply an information tool regarding the time, duration, title, content type, and other such information relative to television broadcasting. However, in some embodiments, a Viewer can search a TV Guide 95 for interesting television Content, and then select the Content for viewing and thereby access the Content. In such embodiments, it will generally be necessary for the Viewer's device to have, or be connected with and provide instructions to another device which has the capability to, receive, record and/or display television Content. Similarly, a Persistent Client Window could include an Internet TV Guide 97 to provide a Viewer with information on Content broadcast via the internet.

An embodiment of a Persistent Client Window is also configured to include a Universal Instant Message (IM) 98 capability, enabling a Viewer to know when friends or other n-Users are online and available for exchanging messages and/or sharing Content. Using a Universal IM, a Viewer can send and received instant messages, whether text, graphics, audio, or mixed-media messages. Conversely, a Universal IM 98 can allow n-Users and/or others to know when the Viewer is on-line and available. A Viewer will generally be able to modify settings to control the functions of a Universal IM 98, such as for enhanced privacy and/or security, to scan incoming messages for malware (e.g., Trojan horse code, viruses, spyware, adware, keystroke recorders, and others). Similarly, a Viewer could configure a Universal IM 98 to enable communication from and/or with commercial parties as well as private parties, enabling a merchant-initiated dialogue regarding a product that is or will soon be placed on sale, and in which the Viewer has indicated an interest. The examples provided herein are merely illustrative, and in no way limit the numerous types of interactions possible and contemplated with regard to a Persistent Client Window with IM capabilities, according to embodiments of the invention.

Figure 11:
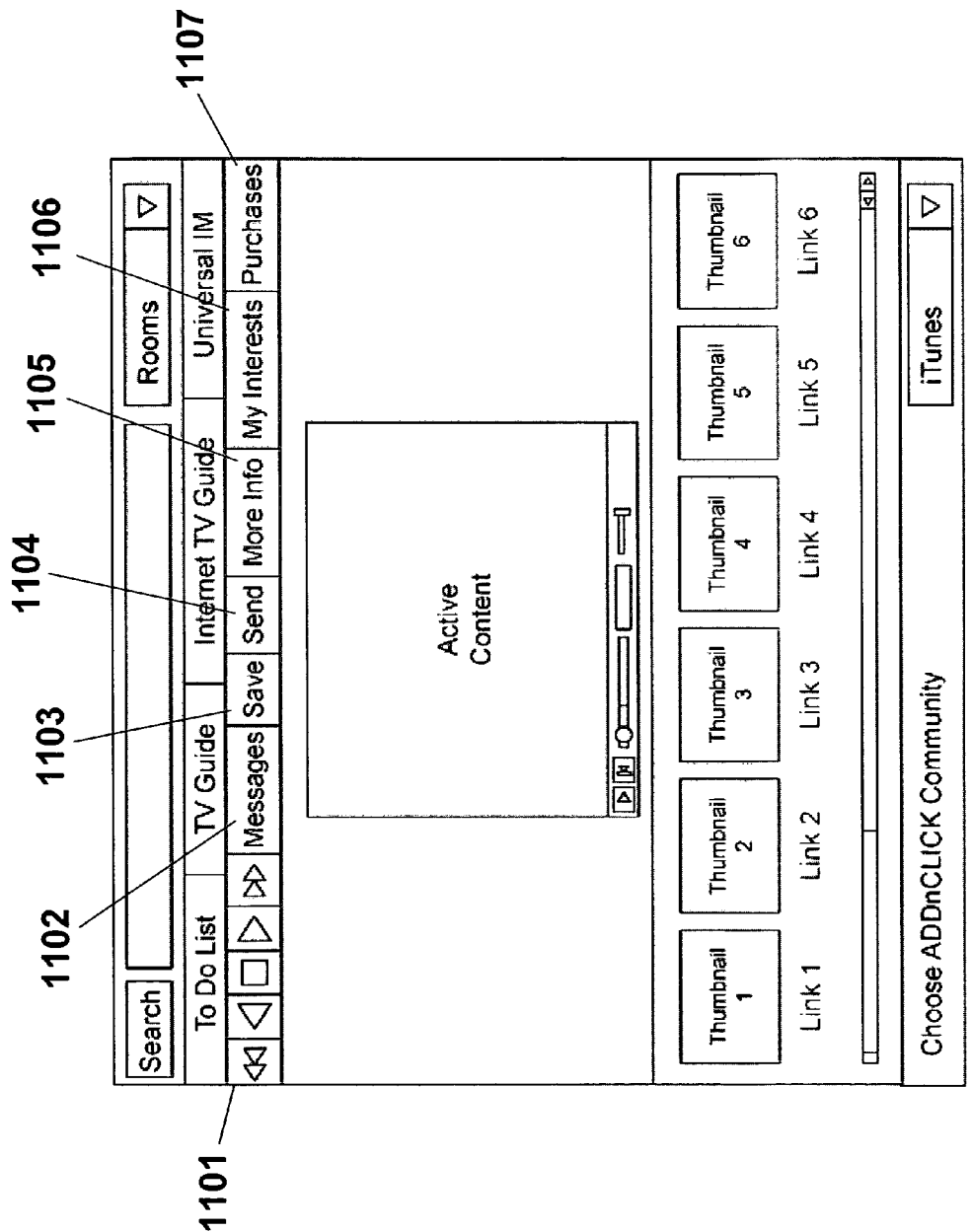

FIG. 11 depicts a number of further tools and their associated functions present in embodiments of the invention. At 1101, one or more control devices are provided to enable substantial control over, for example, playback of video Content. Such controls can complement and/or supersede controls embedded in Content (e.g., a triangular 'play' button frequently provided with YOUTUBE™ and other video Content), or provide control not otherwise provided with Content or by a Content Host. Further, the displayed control options depicted at 1101 or the functions thereof may change, relative to the type of Content being displayed (or played, or otherwise presented) to the Viewer by the Persistent Client Window. In an embodiment, the Viewer is able to modify, for example, the location, type, appearance, or function of control options provided in a set of controls 1101, modify their location within the GUI of the Persistent Client Window, or alter the order of the provided Controls to suit the convenience of the Viewer.

A message sending and/or receiving capability is also provided in embodiments, as shown at 1102. Unlike the Universal IM, which typically, but not necessarily, operates similarly to a real-time internet chat utility, a messaging utility operates more similarly to an e-mail utility for sending and receiving e-mail messages. Messages can be sent to, and received from other Service 'members' (e.g., n-Users), although the embodiments are not so limited. In an embodiment, a Viewer can exchange messages with Service non-members, and with other e-mail utilities (e.g., MS OUTLOOK™). A Viewer can, in embodiments, attach files (e.g., Content) to messages, or view Content received in messages from others using the integral Content display 81 of the Persistent Client Window. Activating a 'Messages' 1102 type utility in a Persistent Client Window will provide the Viewer with numerous options, enabling any of a number of actions according to alternate embodiments, including but not limited to actions and capabilities normally associated with e-mail messaging applications. Alternatively, a Viewer can configure a 'Messages' tool, when selected, to activate a third-party message sending application selected by the Viewer, either resident on their device (e.g., MS Outlook, etc.) or accessible via the internet (e.g., YAHOO™ Mail, etc.).

A Viewer will, in embodiments, also have the capability to 'Save' Content for future retrieval, or bookmark Content for future access, as shown at 1103. Content saved by a Viewer may be saved on the device, on another device connected to the device, or at a Service server, although the embodiments are not so limited. Alternatively, by 'book-marking' Content, the Persistent Client Window can retain a navigational pathway in memory to access the Content simply and directly at a future time. Therefore, although the Content may not be copied to a directly or peripherally (e.g., Service server) Viewer-controlled location, the Persistent Client Window can later access the same Content where it continues to reside at a remote location (e.g., a Host server), or where it has been moved but a location indicator remains to point the way, and display the Content to the Viewer. Activating a 'Save' 1103 utility in a Persistent Client Window will provide the Viewer with numerous options, enabling, any of a number of actions according to alternate embodiments.

At 1104, a Viewer is able to 'Send' Content to n-Users and/or others directly, rather than composing an e-mail message in a messaging system and attaching the Content as a separate file. Sending, as at 1104, can be provided instead of a Message 1102 utility, or can be provided to supplement a Message 1102 utility, wherein the features of the Send 1104 and Message 1102 utilities are substantially complementary, with little or no functional overlap. Generally, a Persistent Client Window will recognize the currently displayed Content as that to be sent using the Send 1104 utility, and will query the Viewer as to the intended recipient(s) of the Content. In alternate embodiments, a Viewer will be able to schedule the sending of Content, designate Content other than the currently displayed Content to be sent, and/or send multiple items of Content concurrently, although the embodiments are not so limited. Activating a 'Send' 1104 type utility in a Persistent Client Window will provide the Viewer with numerous options, enabling any of a number of actions according to alternate embodiments.

Occasionally, Content will include more information than just the viewable information. Such additional information can be related to the Content itself, or to other related topics or Content. Alternatively, Content may include links to additional information, wherein the information itself is located at, for example, a remote server. Therefore, if a Viewer wishes to ascertain whether or not Content has additional information included, and/or wishes to access that information, the Viewer can use a "More Info" utility provided with the Persistent Client Window, as in the embodiment shown at 1105. Therefore, hidden supplementary information related to the Content or otherwise associated with the Content becomes available to the Viewer.

In embodiments where the additional information provides a link to remote information, the Viewer can choose either to Save/Bookmark 1103 the link, to navigate to the location of the remote information, to Send 1104 the information to an n-User or other, or take numerous other actions according to alternative embodiments. Where the information is additional viewable (whether visual, audible, or otherwise) Content, the Viewer can choose to view the additional Content rather than the original Content (with which the additional Content was associated). Activating a 'More Information' 1105 type utility in a Persistent Client Window will provide the Viewer with numerous options, enabling any of a number of actions according to alternate embodiments.

To a large extent, a Persistent Client Window can function as a means for a Viewer to locate and access Content within the Viewer's area(s) of interest. Therefore, in embodiments, a Persistent Client Window includes a utility (e.g., 'My Interests'), 1106, enabling a Viewer to define and/or select the types of Content (e.g., advertisements, e-commerce items, games, videos, music) that the Viewer wants delivered by and/or through the Persistent Client Window. Activating a 'My Interests' 1106 type utility in a Persistent Client Window will provide the Viewer with numerous options to enable any of a number of actions according to alternate embodiments.

For example, options can be selected by checkboxes, 'radio' buttons, or otherwise from a menu of lists, identifiers, or Viewer created templates. A Viewer can select topics, categories, or other Content-distinguishing identifiers from one or more lists, can create their own lists and or identifiers, or obtain lists and/or identifiers from n-Users, the Service, Hosts, Content promoters, or others. Conversely, a Viewer can select lists and/or identifiers describing Content that the Viewer does not want delivered by or through the Persistent Client Window, providing a Content filtering capability. A Viewer can, in embodiments, create templates, each template including a plurality of desirable and/or undesirable Content identifiers, lists, or even other templates, and can save templates for repeated use.

The ability to obtain lists and/or identifiers provides Viewers with a method to improve the efficiency of a Persistent Client Window at delivering and/or excluding Content. As Viewers and n-Users gain experience with the relative efficiencies and/or failures of specific Content identifiers to gather and/or exclude Content, it is possible that informal standards may evolve among Content creators and Viewers with regard to Content-identifying metadata placed in Content, and the identifiers which most efficiently segregate content based on those metadata.

A Persistent Client Window also possesses tremendous capabilities and potential as an e-commerce generating tool, linking product promoters (e.g., retail and/or private sellers, service providers) with interested Viewers/consumers. Enabling commercial interactions through Content delivery, a Persistent Client Window can include a utility for making Purchases, as shown at 1107. For example, a Viewer can search for a product using the Search utility 92, by specifying Products 1004 in the drop-down box 94, and/or identifying the type of product using the text entry field 93. The Persistent Client Window then locates and displays search-relevant Content (e.g., products available for purchase) to the Viewer at the integral graphic display 81. If the Viewer wishes to purchase a displayed product, the Viewer can select 'Purchase' 1107, and the Persistent Client Window will initiate a purchase transaction, and may use metadata associated with the Content to affect the purchasing transaction.

Alternatively, selecting the 'Purchase' 1107 option can cause the Viewer's Persistent Client Window, internet browser application, or similar internet-navigation capable software on a device to navigate to an e-commerce website where the Viewer can initiate a purchase.

In overall appearance, a Persistent Client Window can be n-dimensional (wherein 'n' is equal to or greater than 2), and can be displayed on any selected area or object presented at a Viewer/n-User's display device. Where a displayed object possesses an apparent visual depth (e.g., n-dimensionality where 'n' is greater than 2), a Persistent Client Window can be presented in such a way as to convey the appearance of being 'wrapped' around (e.g., conforming with an apparent contour of) a portion of the object. A Persistent Client Window can also be presented separately from any other displayed objects, and yet present an appearance of n-dimensionality (where 'n' is greater than 2), whether presented at a desktop or webtop, or presented within an n-dimensional environment or world.

As indicated above, the various described features, options, and/or capabilities do not comprise an exhaustive or complete list. In alternative embodiments, a Persistent Client Window will include fewer or more capabilities than those described herein, or will include at least one different feature, option, and/or capability from those describe herein. Therefore, the described embodiments are not to be construed as limiting either the types or number of conceived and intended embodiments of the invention.

Shared Window Experience

Two important concepts will be apparent throughout the following description, both of which related to each other, to a Persistent Client Window, and to an entire range of services, tools, and capabilities provided by a Service. One of these concepts, called a 'Shared Window', entails a GUI that enables a Viewer to interact with and realize the benefits of a broad array of interactive services, tools, and capabilities (hereinafter, collectively 'tools'), both Service-provided and/or those provided by others. The other concept, called a 'Shared Window Experience', include a substantial number of capabilities and activities enabled by a 'Shared Window' in association with a broad array of other tools. The description that follows sets out numerous details regarding each of these concepts, include their inter-relationships and/or interoperability with other services, tools, and capabilities. However, the descriptions provided herein only include a small subset of the conceived and intended embodiments, and is therefore not intended to limit the scope of the invention.

In a general sense, a Service enhances each Viewer's internet experience by enabling a shared social network, typically but not exclusively including Content-based interaction. For example, when a Viewer engages in viewing, reading, or listening to Content on the internet or via a Persistent Client Window, Service-provided tools will analyze coded Content-relevant information/characteristics (e.g., metadata, form, structural elements and/or sequence, context, inserted and/or overlaid objects, etc.) that are embedded into, associated with, or otherwise derivable from the Content. For example, when, according to an embodiment, a Viewer conducts a search for Content relating to the keywords (metadata) "APPLE" and "mobile phone", Service-provided tools will monitor the search results and determine the nature of the Content metadata related with the search results.

Service-provided tools will search the Service database to identify n-users who are concurrently on-line and are also concurrently engaged in Content that has the same or similar discernable characteristics as the Content viewed and/or being searched by the Viewer. Once the Service-provided tools identify at least a single match, the tools will open a separate 'Shared Window', viewable by the Viewer and the identified n-User(s) on each of their respective devices. The Shared Window is so called because, in embodiments, it provides a focal, interactive GUI that each Viewer and/or n-User will have and share on his and/or her device display, and which is based at least in part on commonly experienced Content related at least in part by metadata. The Shared Window connects diverse and/or geographically dispersed Viewers and n-Users together into a relatively live (subject to data transfer latency relative to equipment, network and/or other limitations) Shared Window Experience by which they can communicate (e.g., via text messages, voice, video), share information, compare and contrast personal knowledge and experiences, share files, share websites, share additional Content, and engage in other interactive activities. In a sense, a Shared Window Experience establishes a new method and/or means for social networking to enrich the internet experience of its various Viewers and/or n-Users.

The Shared Window tools (e.g., software application, access) can be obtained by any of the methods described above relative to a Persistent Client Window, and can be obtained concurrently with or separately from a Persistent Client Window. Once available on or through a Viewer's device, elements of Shared Window tools may become visible to a Viewer at a display of the device. For example, with reference to an embodiment shown in FIG. 12, an icon 1201 is provided on a Viewer's computer desktop 1200 which can be selected by the Viewer to activate a Shared Window and its related tools. On the other hand, numerous Shared Window tools and activities will not be visible at a Viewer's device display, and will reside and operate 'in the background'. In still other cases, some Shared Window tools will be visible when operating, but remain invisible to a Viewer when not operating, and/or the converse situation could also be true in embodiments.

Figure 13:
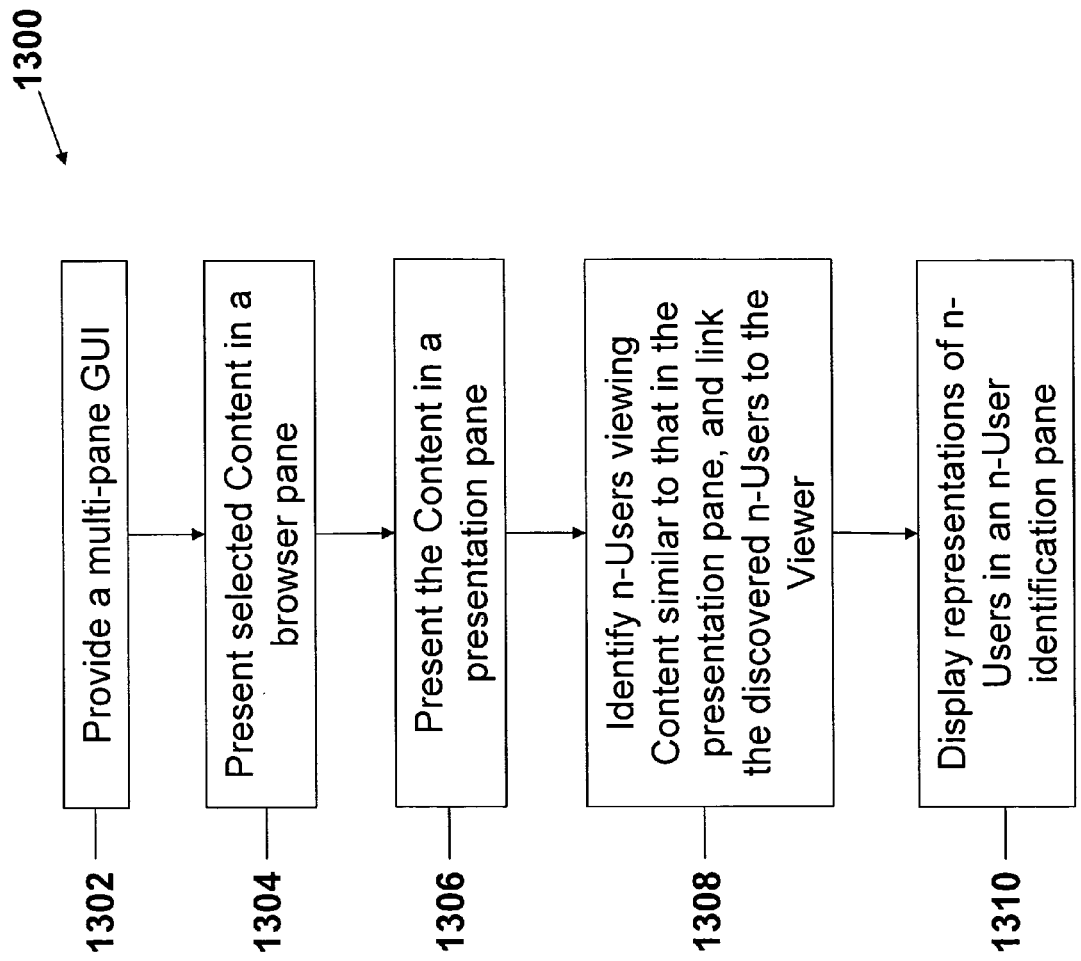
FIG. 13 depicts a method for enabling a Shared Window Experience according to an embodiment of the invention.

FIG. 13 depicts a method for providing a Shared Window Experience according to an embodiment 1300 of the invention. At 1302, a Service provides a multi-pane GUI (e.g., Shared Window) that can be opened and viewed on a display of, or a display connected with, a Viewer's or n-User's device. As described, a Shared Window can be opened by a Viewer by selecting an icon or other visual representation on the Viewer's screen. Alternatively, a Shared Window can open upon the commencement of or completion of, or concurrent with, another operation involving Service tools, such as upon the return of the results of a Content search using a Persistent Client Window. In still another embodiment, a Shared Window can open as directed by the Service or an n-User other than the Viewer, if the Viewer has provided such permission to the Service or an n-User. Such permission can be one of the numerous preferences or settings available to a Viewer to modify their Shared Window Experience according to their preferences and/or needs.

Figure 14:
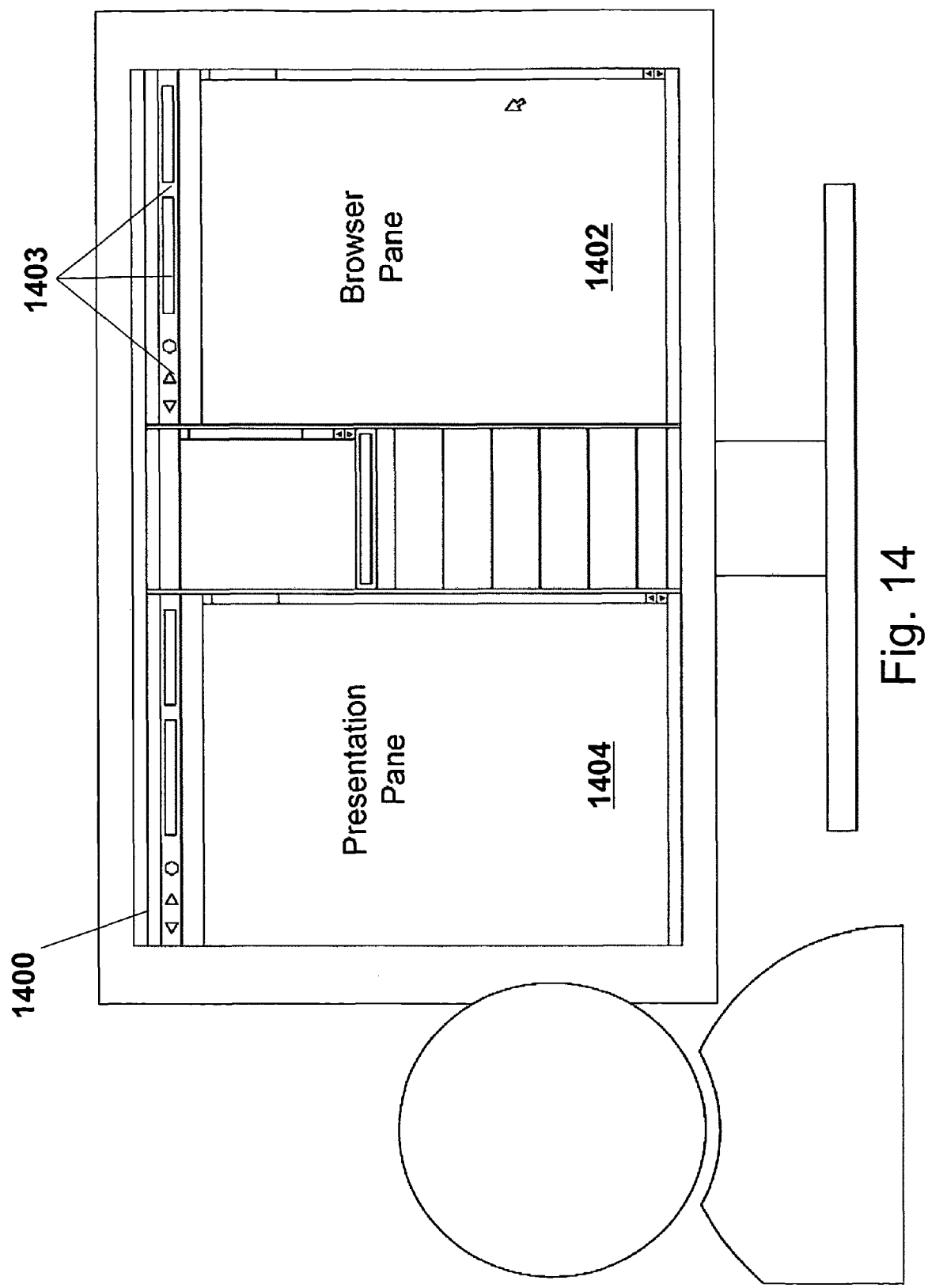
FIG. 14 depicts a Shared Window according to an embodiment of the invention.

The multi-pane GUI of a Shared Window can include a virtually unlimited variety of configurations, according to alternative embodiments, to serve numerous purposes, and provide a variety of benefits. FIG. 14 provides an exemplary embodiment of a Shared Window 1400 for descriptive purposes. As shown, a multi-pane Shared Window 1400 includes a Browser Pane 1402 that can be used to search the internet for Content, and to display internet Content at the Viewer's device display. The size of a Browser Pane 1402 can be adjustable within a Shared Window 1400 providing a Viewer with the ability to view more material in the Browser Pane 1402, or conversely, to minimize the Browser Pane 1402 to allow a Viewer to see more material in another of the panes of the Shared Window. Likewise, a Viewer can change the location of the Browser Pane 1402 within the Shared Window 1400 to suit individual preferences.

A Browser Pane 1402, in the embodiments such as that shown in FIG. 14, may also include a number of internet browser controls 1403. The controls 1403 may provide a Viewer with control of browser activities relative to only the Browser Pane 1402, independently from any other panes of the Shared Window 1400 or other windows presently active at the device display.

A Shared Window 1400, in embodiments, also includes a Presentation Pane 1404 in and/or with which the Viewer can share Content with n-Users. For example, a Viewer searches for Content using a Browser Pane 1402, and the Browser Pane 1402 presents to the Viewer some interesting Content found at a webpage, according to operation 1304 of FIG. 13. The Viewer wishes to get n-Users' opinion(s) on the Content, so the Viewer transfers the Content to the Presentation Pane 1404, and the Presentation Pane 1404 presents the Content to all Viewers involved in the Shared Window, according to 1306 of FIG. 13.

Figure 15:
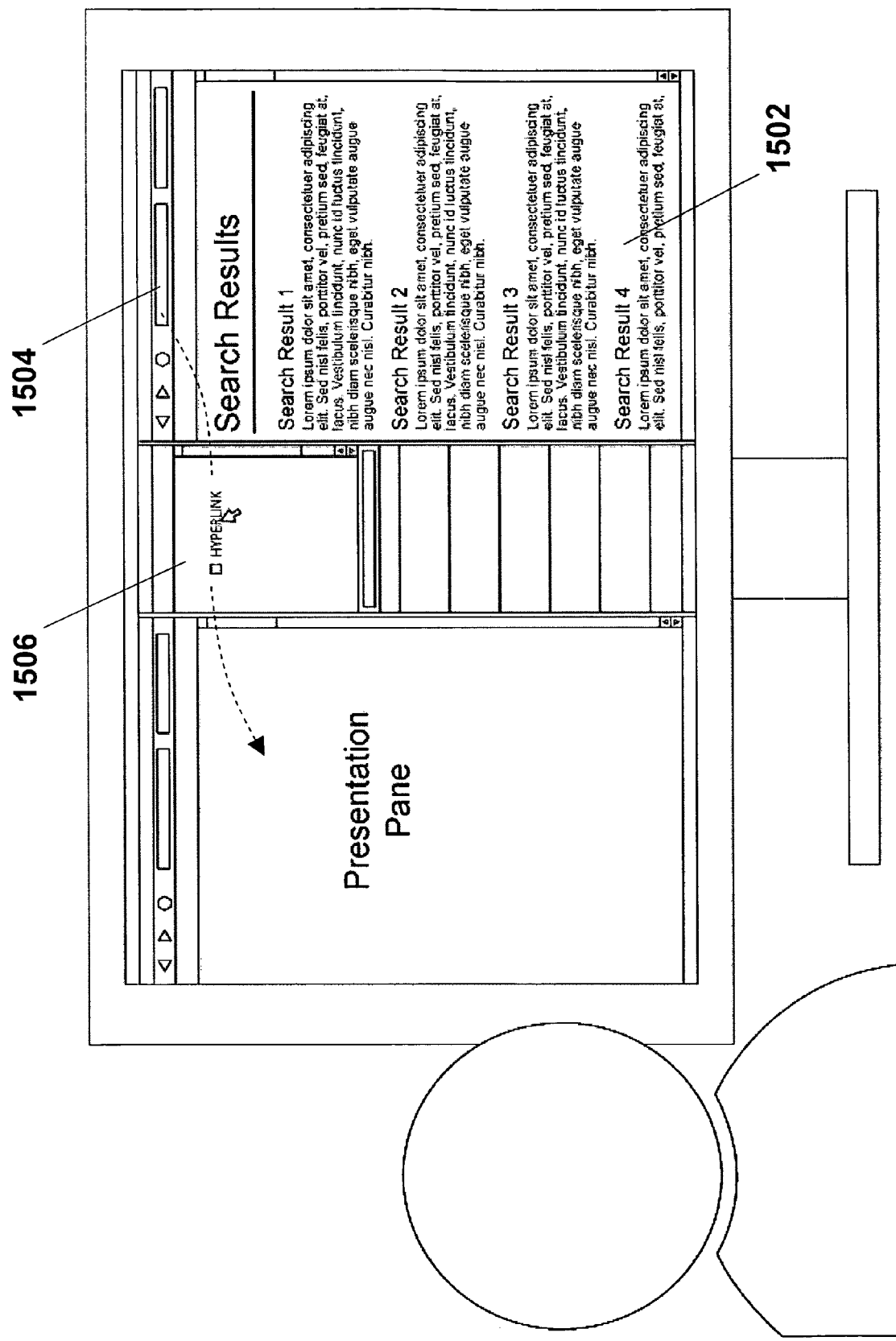
Figure 16:
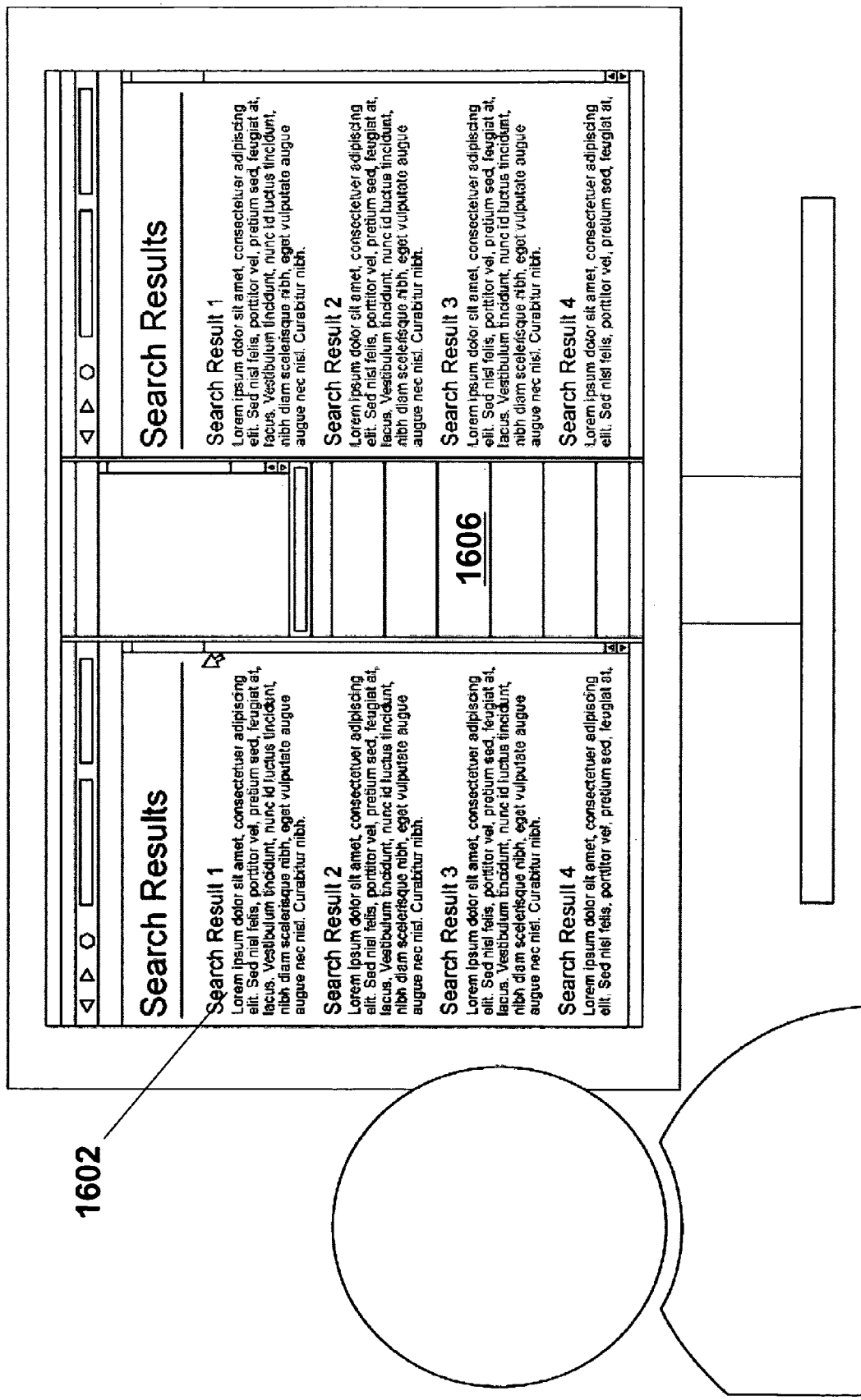

A Viewer can select any of numerous tools and/or methods to transfer Content from a Browser Pane 1402 to a Presentation Pane 1404. For example, with reference to FIG. 15, Content 1502 presented in the Browser Pane 1402 is uniquely associated with a URL of a webpage, and the URL appears in an address field 1504 of the Browser Pane 1402. Using a mouse or a device with a similar capability, or using another input device (e.g., keyboard, touch-screen, stylus, etc.), the Viewer can select and drag (or copy and paste, or directly type in, or otherwise duplicate and/or place) the webpage URL from the address field 1504 of the Browser Pane 1402 to the Presentation Pane 1404. In FIG. 16, the Presentation Pane 1404 recognizes the relevance of the webpage URL (that is, recognizes the URL as representing a specific internet location), navigates to that location, and presents to the Viewer, in the Presentation Pane 1404, a copy 1602 of all or some portion of the same Content 1502 that is also displayed in the Browser Pane 1402.

According to other embodiments, a Viewer can directly select the Content 1502 in the Browser Pane 1402, copy the Content 1502, and then paste the Content into the Presentation Pane 1402 so that it appears substantially as shown at 1602. Alternatively, the Shared Window 1400 can include a tool, for example, a toolbar 'button', which when selected, causes whatever Content 1502 is currently displayed in the Browser Pane 1402 to also be presented in the Presentation Pane 1404. Those having ordinary skill in the art will recognize that numerous other methods could be employed in alternative embodiments of the invention, for the purpose and effect of causing Content 1502 presented in the Browser Pane 1402 to also be presented in the Presentation Pane 1404. For example, commands in a Menu bar of a Window, shortcut commands, drop-down menus activated by an alternate command button of a mouse or similar pointing device, or others can also be used according to alternative embodiments. Once Content is placed into and visible at the Presentation Pane 1404, that Content generally is no longer dependent upon the Content in the Browser Pane 1402. That is, the Viewer can then view entirely difference Content in the Browser Pane 1402 without affecting the Content in the Presentation Pane 1404.

Further, Content other than internet Content can also be presented in at least one of a Presentation Pane 1404 and/or a Browser Pane 1402, such as Content obtained from computer readable media, Content present in or developed using various software applications, Content received from a remote sender (e.g., phone, facsimile, e-mail, instant messaging etc.), infra-red transmission, scanned Content, direct and/or live feed Content from an information capture device (e.g., video camera, still camera, metrological instrument, audio recorder, etc.), and/or virtually any other type of Content presentable by a device. Likewise, the presented Content can include transformed Content, wherein information received in one perceivable form is presented in a different perceivable form. One such example includes automated stenographic and/or audio signal analysis tools that receive audio input (e.g., spoken voice), then convert the audio information into a visual form (e.g., text, graphic display, waveform), and either concurrently or subsequently display a visual form of the converted audio information. The examples listed here, however, by no means constitute an exclusive or complete list of Content presentable in panes of a Shared Window 1400 according to the conceived and/or intended embodiments of the invention.

With reference to FIG. 16, once Content 1602 is transferred to and/or presented in a Presentation Pane 1404, additional Service tools can be automatically activated, or activated by command of a Viewer or another. As shown at 1308 of FIG. 13, Service tools will attempt to identify n-Users also concurrently viewing Content 1602 similar to that presented in the Presentation Pane of the Viewer's Shared Window, and to link all or some portion of the discovered n-Users into a live (e.g., concurrent) social network with the Viewer. Similarity of Content can be determined, as described, based upon the metadata of the Content, as well as, or alternatively by, using keywords that the Viewer associates with the Content to help define relevance and guide a search for similar Content.

Although one or more of the operations involved in searching for similar Content viewed by n-Users occurs in the background (e.g., electronically, outside of the Viewer's conscious perception), the Viewer can also, in embodiments, direct, guide, resubmit, redefine, and otherwise intervene to alter various parameters of a search for similar Content. Such intervention can narrow and/or broaden the scope of potential Content, as well as narrow and/or broaden the scope of n-Users searched, such as by including and/or excluding certain types or classes of Content and/or n-Users in the search scope (by the analysis of the metadata, form, structural elements and/or sequence, context, subject matter, or other discernable characteristics that are provided in the intervention).

Alternatively, rather than searching only for n-Users concurrently viewing similar Content, Service tools can also search for n-Users who have expressed an interest in Content of the same or similar nature to the Content presented by the Viewer's Shared Window 1400. For example, an n-User may have indicated Content of interest to the n-User by using a 'My Interests' tool 1106 of a Persistent Client Window 80, and the Service tools will recognize the n-User's selection(s). Therefore, the Service tools can return the n-User's identity as a result of the search, even though the n-User is not concurrently viewing similar Content. At least in part, this capability is enabled by the Service maintaining and updated Viewer and/or n-User preferences in a Service database, thus aiding linking even when such Viewers and/or n-Users are off-line. When subsequently online and reconnected with a Service, the Viewer and/or n-User can then be linked, live and concurrently with others sharing the same and/or similar Content interests and/or interactions.

Figure 17:
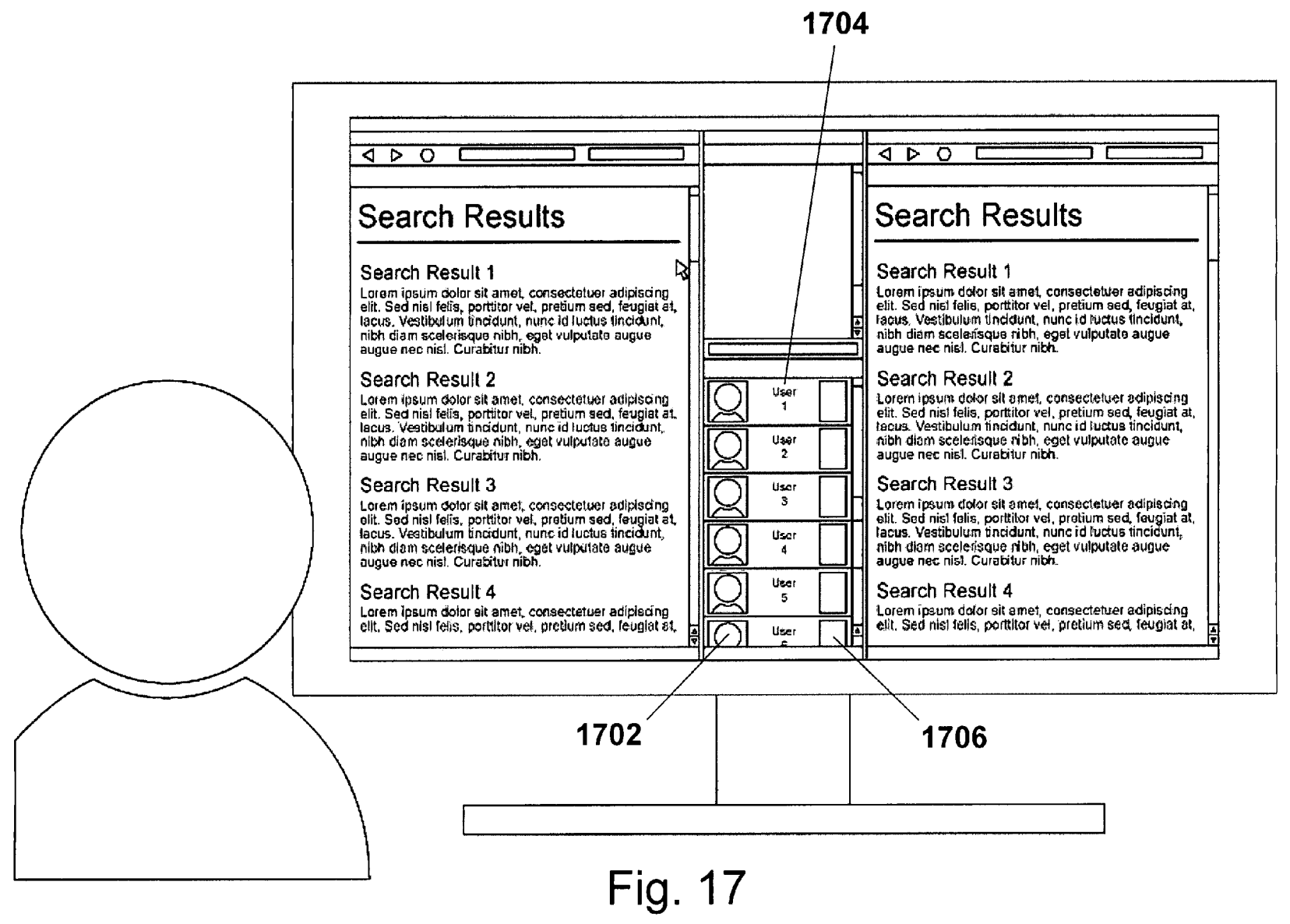

Once Service tools identify n-Users viewing or otherwise interested in the same or similar Content (based for example on an analysis of the metadata of the Content), as shown at 1310 of FIG. 13, a Shared Window 1400 will display representations of the n-Users in an n-User Pane 1606 of the Shared Window 1400. As FIG. 17 indicates, n-Users can be represented in an n-User Pane 1606 in a very similar manner as in an n-User identification section 31 of a Web Widget 30. That is, an n-User Pane 1606 of a Shared Window 1400 can include, according to embodiments, a graphic representation 1702 of an n-User and/or a textual identification 1704 of an n-User. As with a Web Widget 30, a textual identification 1704 need not actually identify the n-User, but can be a pseudonym, a slogan, web moniker, or even a relatively randomly generated label for the n-User (e.g., within the abilities of an electronic device or system to randomly generate), such as when an n-User wishes to specify an alternate identity or to remain anonymous. And as discussed relative to the n-User graphic representation 32 in a Web Widget 30, the graphic representation 1702 need not be a true image (e.g., photograph) of the n-User, but can be nearly any other image designated and/or provided by the n-User, Service, and/or Viewer. Small graphic representations, such as those shown at 32 and 1702 are also sometimes referred to as 'thumbnails'.

Additionally, an n-User Identification Pane 1606 of a Shared Window 1400 can also display near each n-User's graphic representation 1702 and/or textual identification 1704, a miniature image 1706 of or representing the related Content concurrently or recently displayed by each n-User's device. Using the miniature images 1706, a Viewer can quickly assess which n-Users' currently viewed Content is of interest to the Viewer, and the Viewer can then interact directly with that n-User, or can choose to interact with all or a defined subset of the n-Users displayed in the n-User Identification Pane 1606.

Figure 18:
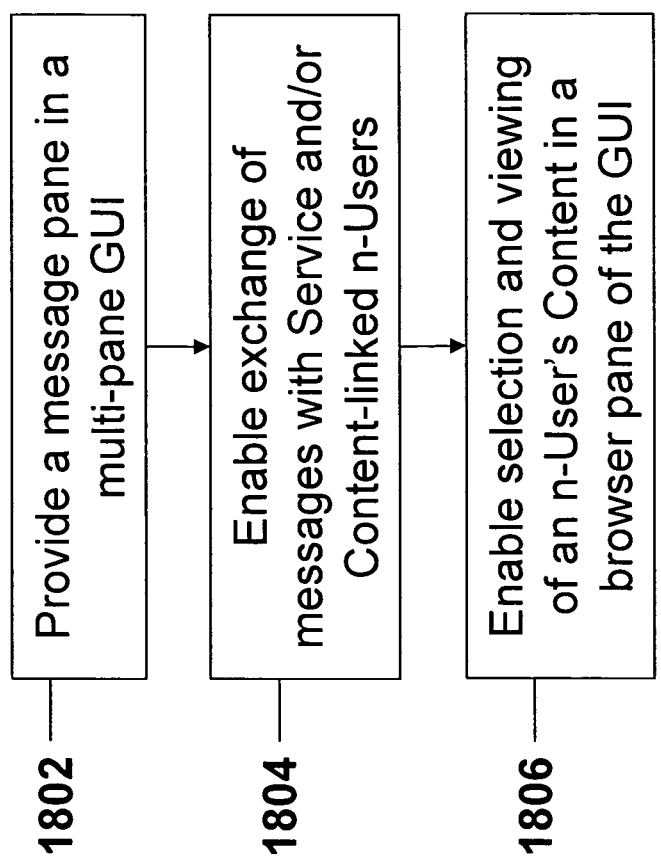
FIG. 18 depicts a method for enabling Content sharing and interaction in a Shared Window Experience according to an embodiment of the invention.
Figure 19:
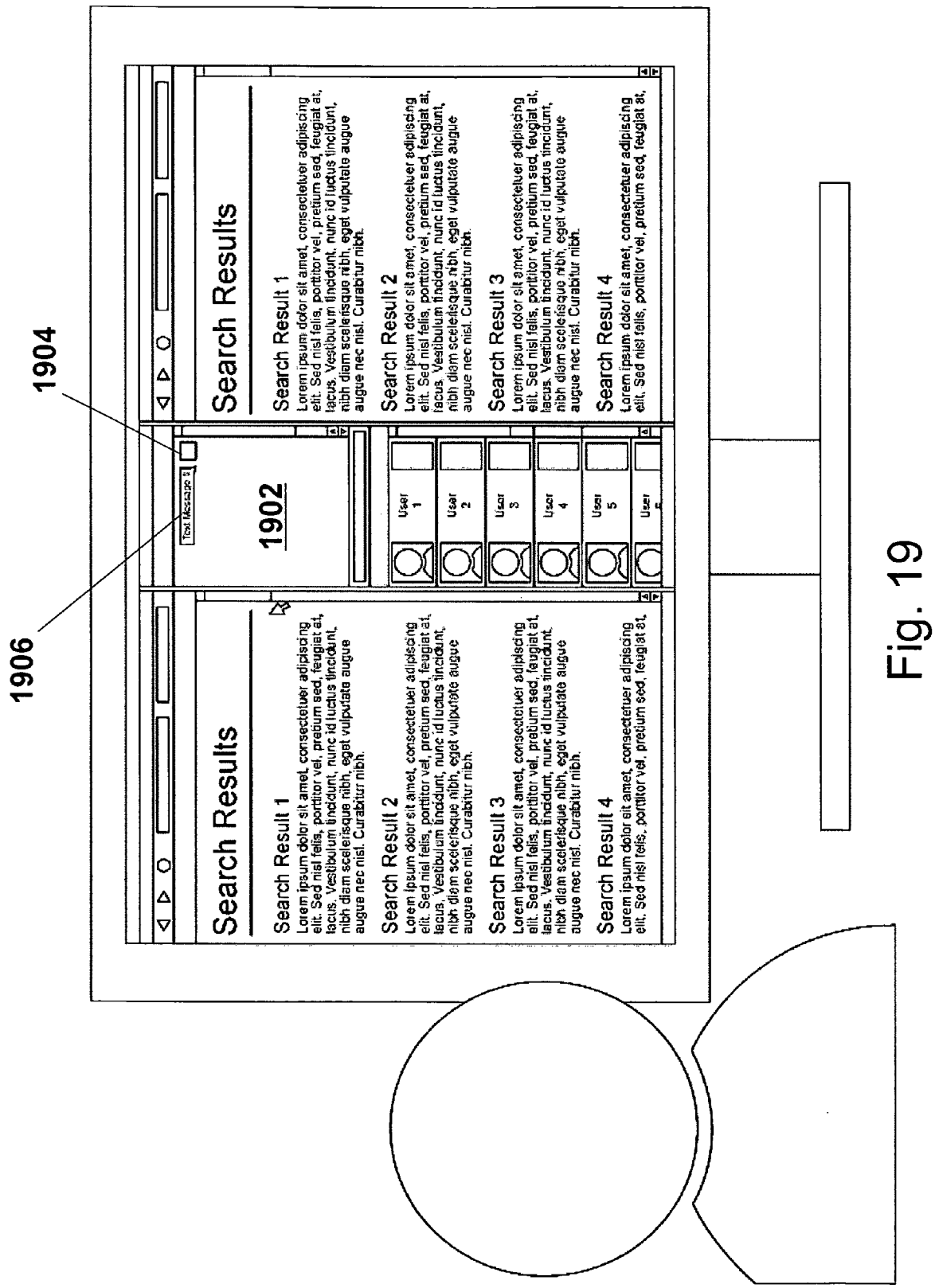
FIGS. 19-22 depict Content sharing and interaction in a Shared Window Experience according to an embodiment of the invention.

To this end, a Service provides an n-User interaction pane 1902, as shown in FIG. 19 and with reference to 1802 of FIG. 18, as part of a Shared Window 1400 GUI. Again, similarly to an n-User interaction section 35 of a Web Widget 30, the n-User interaction pane 1902 of a Shared Window 1400 may also include a graphical representation 1904 of an n-User that is or has interacted with the Viewer, and text 1906 of an interaction (e.g., message) between the Viewer and the n-User. Much of the description above regarding options available to a Viewer relative to a graphical representation 36 and/or a text 37 in a Web Widget 30 also apply to the graphical representation 1904 and/or text 1906 of a Shared Window 1400 n-User interaction pane 1902.

It should be noted that, as the name 'Shared Window' implies, the concurrent interaction between a Viewer and one or more n-Users is a Shared Window Experience. Therefore, at the same time that the Viewer sees Content and n-Users by using a Shared Window 1400, each n-User also views a Shared Window in which the Viewer appears as an n-User. That is, from the perspective of an n-User, the n-User is a Viewer, and all others (e.g., including the 'primary' Viewer) are n-Users. Further, when the Viewer searches for and the Service tools identify n-Users concurrently viewing similar Content, the identified n-Users may already be involved in an ongoing Content-based social interaction (Shared Window Experience) into which the Viewer enters as a late-corner. In this circumstance, the Viewer, upon joining the Shared Window Experience, will appear as a new n-User in the n-User Identification Pane 1606 of each n-User's Shared Window 1400.

Alternatively, the Viewer can be an initiator of a Shared Window Experience, rather than joining an already existing Shared Window Experience. In this situation, a Viewer can enter into an ad-hoc Shared Window Experience with one, some, or all identified n-Users by identifying an intended recipient, and/or designating a distribution list, from among the n-Users in the n-User Identification Pane 1606, and interacting with the designated n-Users. Alternatively, a Viewer can initiate a Shared Window Experience with n-Users by extending invitations to one, some, or all identified n-Users to join into a Shared Window Experience based at least in part on the commonly viewed Content. Tools for extending and/or accepting such invitations are provided as part of a Shared Window 1400 tool in embodiments.

As shown at 1804 of FIG. 18, a Service enables a Viewer to exchange messages with the Service and/or n-Users. Messages can be textual, as shown at 1906, or can be audio messages, or both. Messages can also be conveyed and/or presented in another form transmittable by a Viewer (e.g., audio-video communications such as videoconferencing), and receivable and/or perceivable by an n-User, or can also be conveyed in the converse direction in similar and/or equivalent form. Further, a Shared Window 1400 can include tools enabling a Viewer to block messages from all or from selected n-Users, providing a means for an n-User to avoid unwanted messages if, for example, an n-User uses offensive and/or abusive language, or in some other situation.

While engaged in a Shared Window Experience, a Viewer can choose to only see messages directed toward them (either individually or as part of a distribution list), or to see all messages conveyed between any other n-Users, or a subset of all the Users, in the Shared Window Experience. Therefore, the Viewer can benefit from all information exchanged, either passively or actively, or can filter out information not directly intended for and conveyed to the Viewer's attention by an n-User. Of course, a Viewer will also be able to switch back and forth between these modes, and/or any other more or less inclusive levels of interaction as the Viewer chooses. For example, a Viewer may have a preferred group of n-Users that the Viewer designates using Shared Window tools, and the Viewer can select to receive and/or view only messages from that preferred group, or from whatever members of the preferred group are represented among the n-Users in the n-User Identification Pane 1606.

Figure 20:
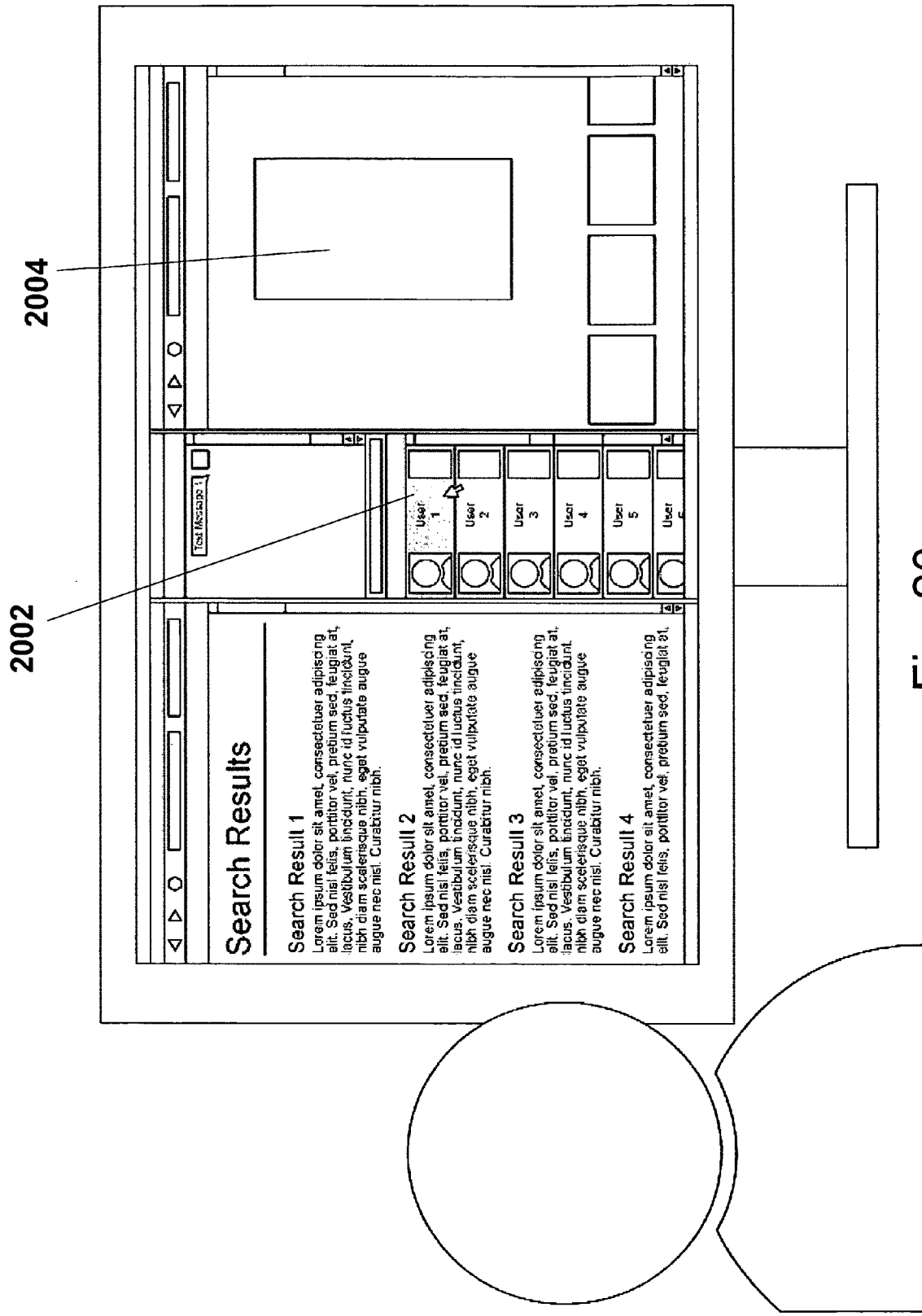

In addition to interacting with n-Users, a Service enables selection and viewing of an n-User's Content in a browser pane of the GUI, as at 1806 in FIG. 18. By using a Shared Window, Viewers gain the ability and opportunity to share Content with n-Users, and/or to view Content shared with the Viewer by n-Users. Content sharing can be initiated through various approaches. In general, as mentioned previously, whatever Content is displayed in a Presentation Pane 1404 of an n-User's Shared Window is also viewable as a small image (e.g., thumbnail image) in the n-User Identification Pane 1606. To view an n-User's Content, a Viewer can indicate, at 2002 of FIG. 20, and select the n-User's miniature Content image 1706 (or, in embodiments, the n-User's graphic representation 1702 or textual identification 1704) in the n-User Identification Pane 1606 by any of the several selection methods previously described and/or usable by the Viewer according their preference and/or capabilities (e.g., mouse click, drag and drop, menu selection, shortcut keyboard keys, sip and puff device, eye-gaze tracking systems, voice control, thought control via an instrumental response to detected brain-originated signals, etc.).

Upon selecting the n-User's Content for viewing, the n-User's Content will become viewable (or otherwise visually represented) in the Viewer's Browser pane 1402. The n-Users Content will either replace the Viewer's previously viewed Content in the Browser Pane 1402, or in alternative embodiments, will simply overlay the Viewer's previously viewed Content as a new 'tab' or 'sub-Window' of the Shared Window 1400. Thereafter, the n-User's Content can either remain relatively unchanging in the Viewer's Browser Pane 1402 even while the n-User changes the Content within their own Presentation Pane 1404, or, alternatively, the Content in the Viewer's Browser Pane 1402 can change in response to, and generally to match changing Content in the n-User's Presentation Pane 1404. Further, when an n-User's Content displayed in a Viewer's Browser Pane 1402 is, for example, video Content, the Viewer will, in embodiments, also have the ability to control the video (and/or audio) playback of the Content, independently from how the n-User may concurrently control playback of the same Content as displayed in the n-User's Presentation Pane 1404. Alternatively, either the n-User or the Viewer can Control video playback of the Content in both the Viewer's and the User's Shared Window panes displaying the shared Content.

Figure 21:
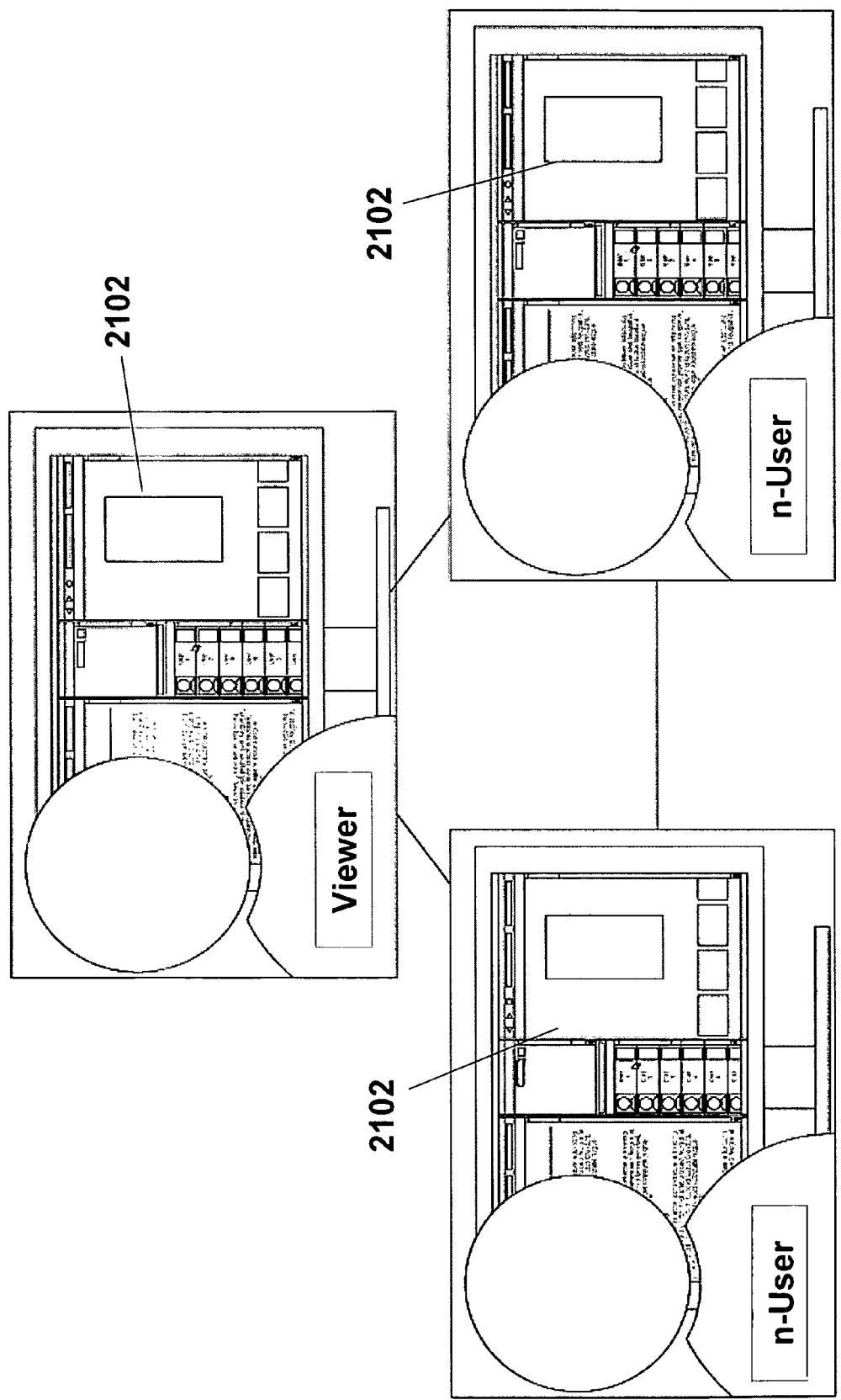

In another embodiment, as substantially depicted in FIG. 21, all or a subset of all the Viewers and n-Users partaking in a Shared Window Experience can concurrently View the Content 2102 in either their Browser Pane(s) 1402 (e.g., n-Users) or Presentation Pane 1404 (e.g., Viewer). This can be accomplished either by the Viewer as an option selected when setting up a Shared Window Experience prior to inviting n-Users to participate, or by n-Users opting to allow the Viewer to control the Content displayed in the n-User's Browser Panes 1402 during the course of a Shared Window Experience. In either case, throughout the course of a Shared Window Experience, the Browser Pane 1402 display settings can either be locked (so that the Viewer's Content remains in n-Users' Browser Panes 1402), or can remain variable. This means an n-User can independently choose to stop viewing the Viewer's Content in his Browser Pane 1402 and view other Content instead, or that an n-User can choose to stop viewing the Viewer's Content, and instead view another n-User's Content. An example of when it might be useful to lock the Content in an n-User's Browser, according to an embodiment, is during a training session delivered from a distant Viewer/Instructor, so that all n-Viewers will concurrently view the Content indicated and described by the Viewer/Instructor.

While in a Shared Window Experience, a Viewer can lock the Shared Window Experience so that no additional n-Users can enter, and/or view the Content displayed in Browser Panes 1402 or Presentation Panes 1404 of the Shared Window Experience participants. This capability allows sharing of confidential Content within the confines of a secure Shared Window Experience. Additionally, when a Viewer initiates a Shared Window Experience, or when by a third party arranges or otherwise instigates a Shared Window Experience, the Viewer will, in embodiments, have Shared Window Experience control tools available to him that all or a subset of the n-Users in the Shared Window Experience will not have available to them. Shared Window Experience control tools can either be part of the Shared Window tool obtained from the Service, or could be retained by the Service, and accessed and run directly from the Service server during a Shared Window Experience.

Figure 22:
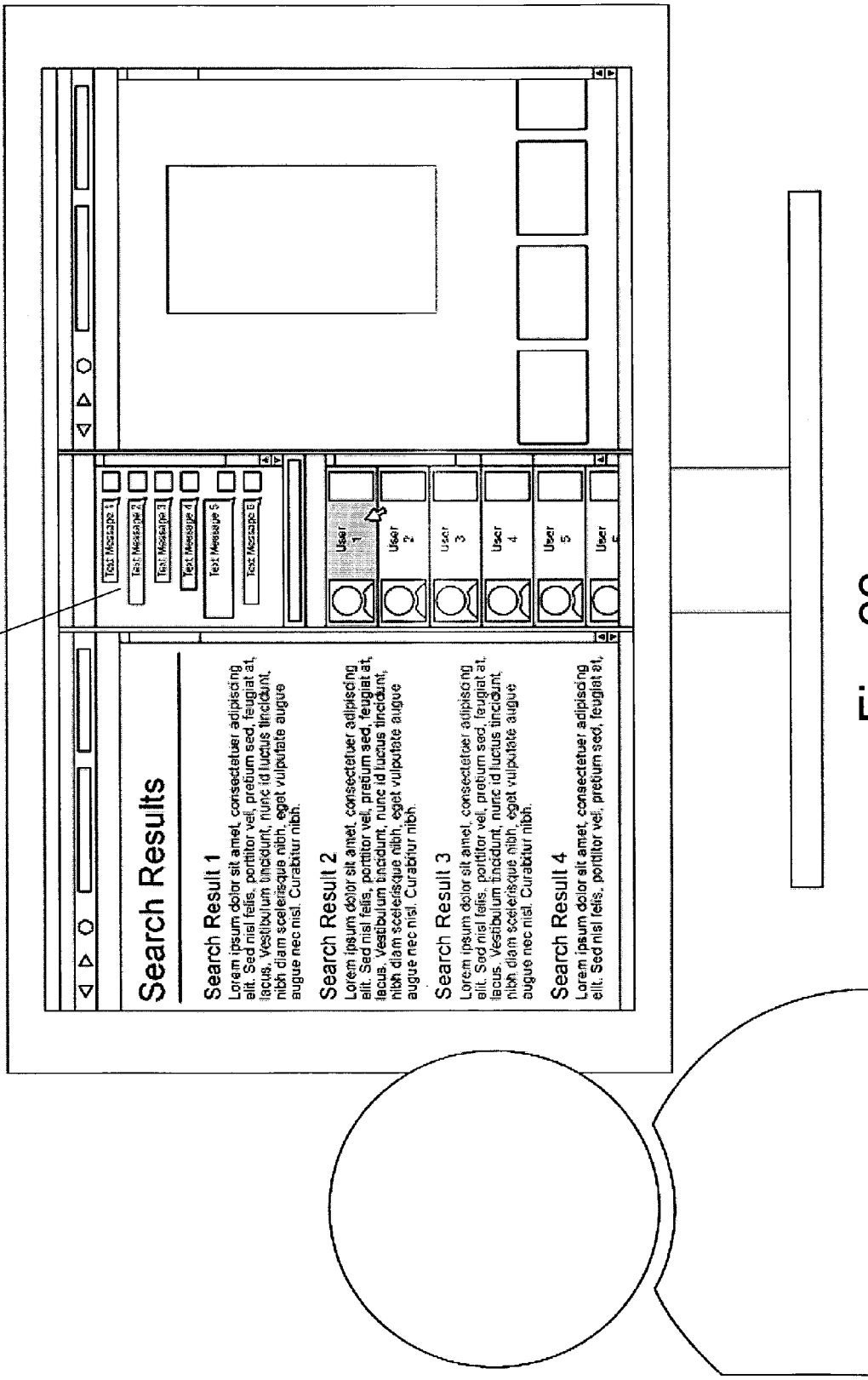

As described, a Viewer can invite others in a Shared Window Experience to share the Viewer's Content. Likewise, while sharing and viewing Content, the Viewer and n-Users can interact with each other using the n-User Interaction Pane 1902. As shown in FIG. 22, the Viewer and/or n-Users can exchange text messages 2202 discussing commonly viewed Content, to express opinions, ask questions, recommend other Content, or otherwise request and/or share information. However, sending text messages is only one method of interacting in a Shared Window Experience. Viewers and n-Users can also communicate via voice (e.g., as audio files or streams), videoconferencing, thought analysis, by using a separate communication output device (e.g., Braille printer), or in other ways according to alternative embodiments.

When a Viewer wishes to conclude a Shared Window Experience, the Viewer can simply close the Shared Window. Alternatively, if the Viewer expects to use the Shared Window again or otherwise wishes to keep the Shared Window active, the Viewer can choose to either passively ignore the Shared Window, can shrink (e.g. minimize) the Shared Window on the device display, can select a control configured to drop the User from that SWE, can open another window over the top of the Shared Window, or can otherwise move the Shared Window out of the Viewer's immediate device display working area. In another embodiment, the Viewer has the option to make himself invisible to n-Users so that they cannot see the Viewer's Content, or even that the Viewer is concurrently online and/or using a Shared Window. By this last embodiment, a Viewer can avoid the situation where an n-User, seeing that a Viewer is on-line, sends a message or otherwise attempts to interact with the Viewer, and perceives the Viewer as being rude after receiving no response from the Viewer. Therefore, the Viewer, while leaving a Shared Window open and viewable on a device display, can concurrently maintain a sociable, receptive image within an interactive, live social network.

Figure 23:
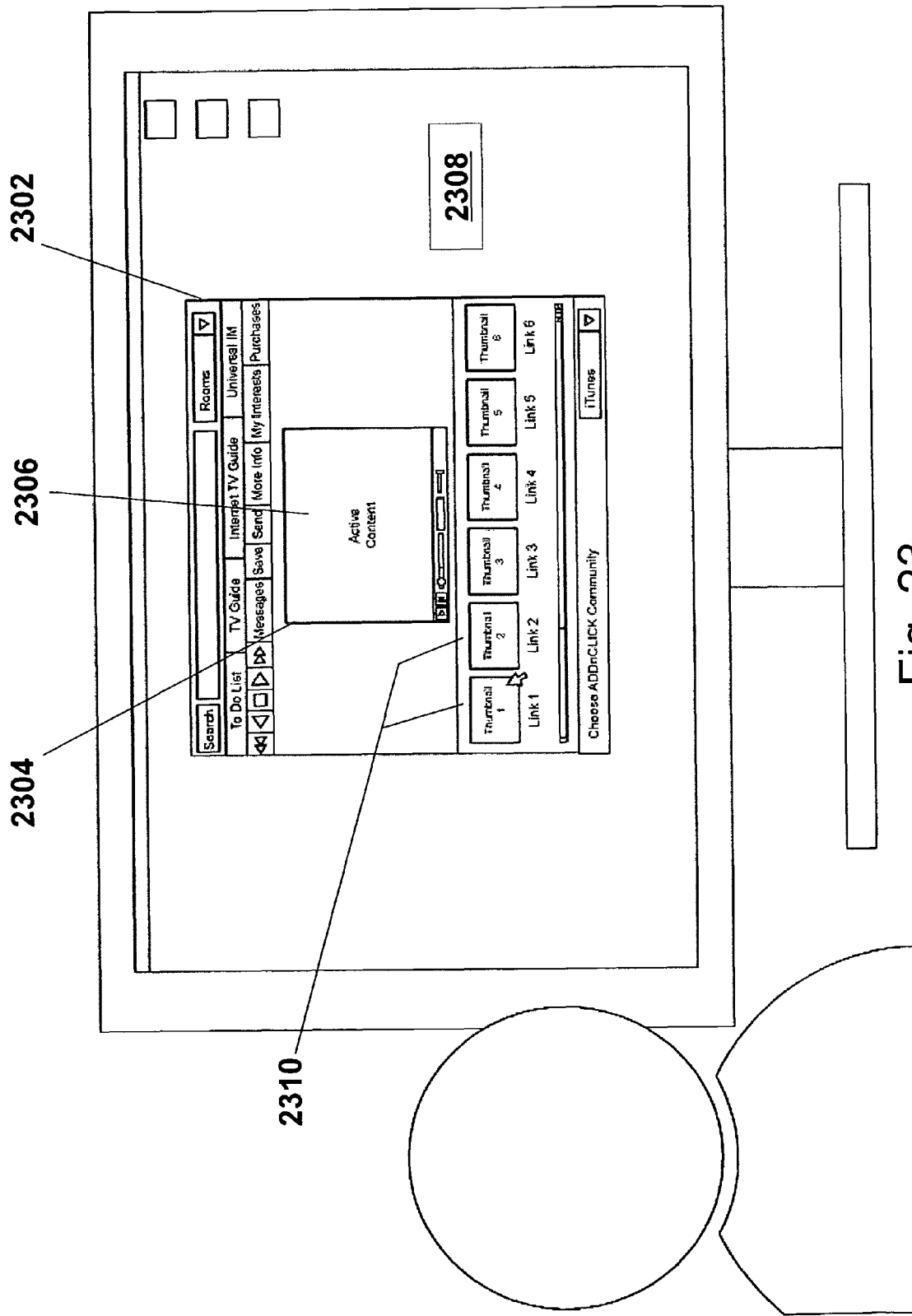
FIG. 23 depicts a Persistent Client Window displaying Content, following a Shared Window Experience according to an embodiment of the invention.

With reference to FIG. 23, after leaving a social network and/or closing a Shared Window, a Viewer's Persistent Client Window 2302 can remain open and viewable on the Viewer's device display 2308, or can be resized, closed, or otherwise made to disappear altogether. Further, the Content 2306 last presented in one of the Shared Window's Browser Pane and/or Presentation Pane may continue to be displayed in the integral graphic display 2304 of a Persistent Client Window 2302 in embodiments. Additionally, graphic images 2310 of Content related to the Content 2306 displayed in the integral graphic display 2304, may be displayed in the Community selection portion of the Persistent Client Window 2302. The graphic images 2310 could be of Content that the Viewer viewed in a Browser Pane and/or Presentation Pane of the Shared Window, or Content viewed by n-Users during a Shared Window Experience, or Content located at a Viewer's 'favorite' Community and related to the Content in the integral graphic display, although the embodiments are not so limited.

Figure 24:
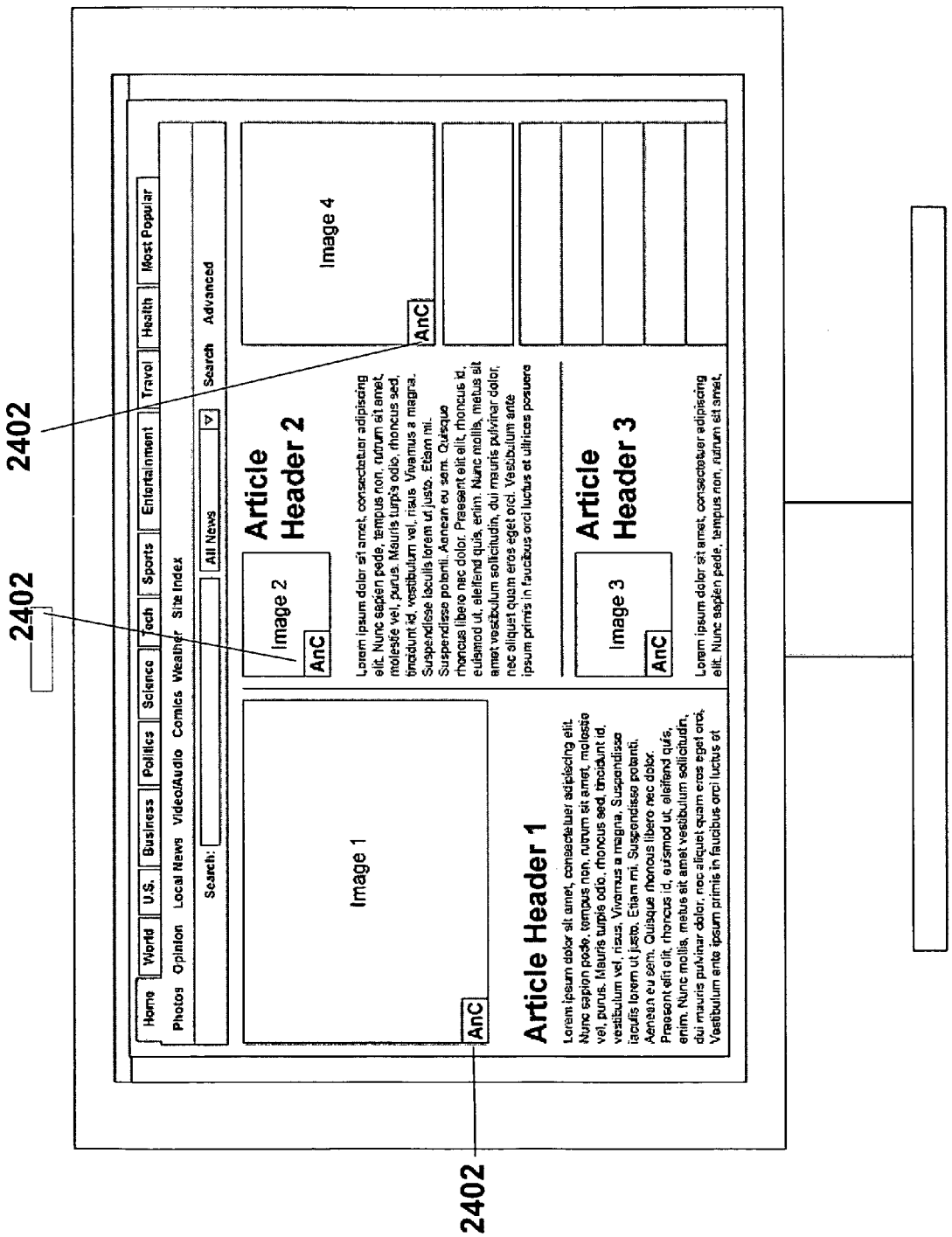
FIG. 24 depicts Service-branded links associated with Content according to embodiments of the invention.

Referring to FIG. 24, Content viewable by a Viewer can include Service-branded links 2402, either as part of a webpage, or displayable at or via another source or Content type. As described above, if a Viewer selects a Service-branded link 2402 and is not already registered with a Service and/or does not have Service tools available on or by their device, the Service (or a Host, or third party) will recognize the selection and may navigate the Viewer to a registration page for the Service. However, if the Viewer already has Service tools available and/or is already registered with a Service, or if the Service provides such tools at that time, selecting a Service-branded link will instead, in embodiments, cause a Shared Window to open upon the display of the Viewer's device.

Figure 25:
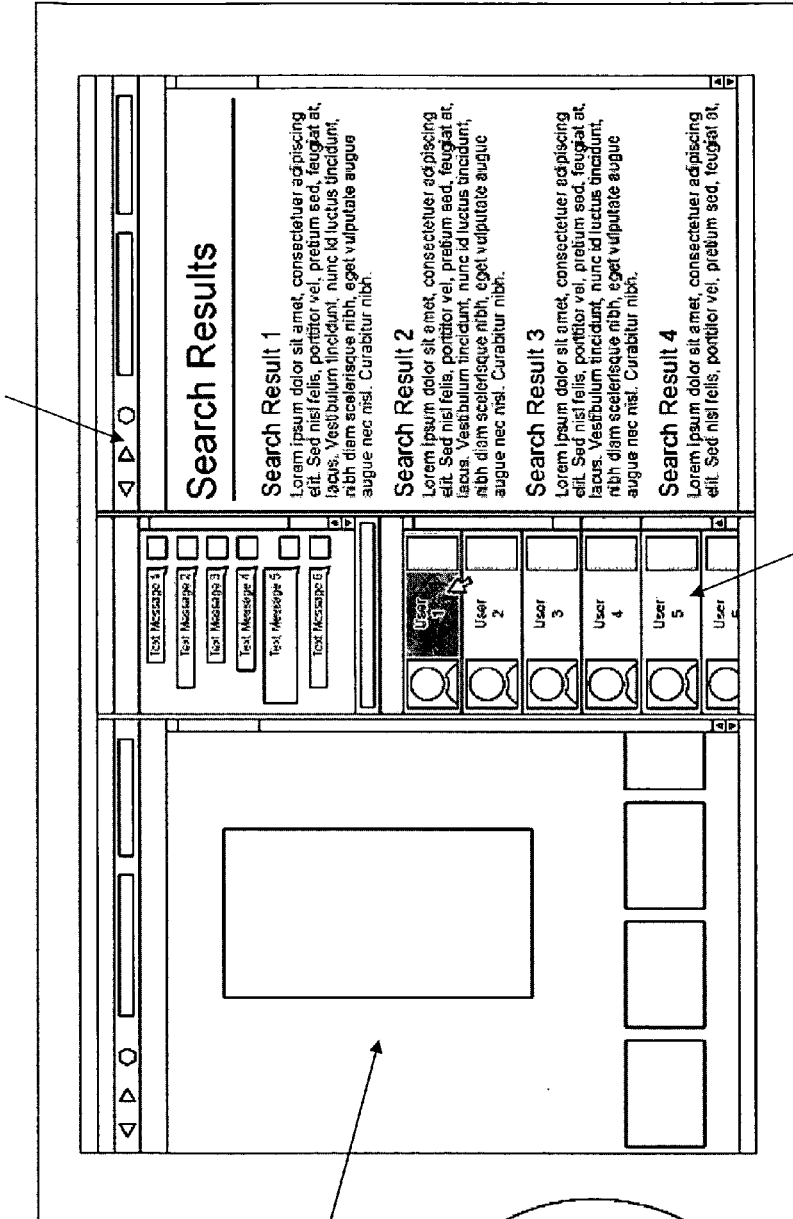
FIG. 25 depicts a Shared Window according to an embodiment of the invention.

With regard to FIG. 25, the Shared Window, upon opening, will display in the Presentation Pane 1404 the Content 2502 with which the selected Service-branded link was associated. Additionally, Service tools will search for n-Users concurrently viewing the same or similar Content (e.g., as determined by an analysis of the metadata, form, structural elements and/or sequence, context, subject matter, or other characteristics of the Content), and will subsequently display any identified n-Users 2504 in the n-User Identification Pane of the Shared Window. The Browser Pane 2506 remains available for either displaying n-User's shared Content, or for the Viewer to continue to search for additional Content, browse the internet, or carry on other activities, without disturbing the Content available for sharing with n-Users in the Presentation Pane.

It should be noted that, in embodiments, when a Viewer transfers Content from the Browser Pane to the Presentation Pane, therefore replacing Content previously displayed in the Presentation Pane, the Service tools can search for n-Users concurrently viewing Content related to the new Content in the Presentation Pane either automatically or when directed by some means by the n-User. When such 'new' n-Users are identified, they can either replace the n-Users previously displayed in the n-User Identification Pane, or, alternatively, can be added to those already present. In the former situation, the Viewer will, in embodiments, cease to participate in the first Shared Window Experience (or social network), and instead will join or initiate a second Shared Window Experience. In the latter situation, the Viewer will continue to participate in the first Shared Window Experience, and the number of n-Users in that Shared Window Experience are increased.

There is, however, the potential for the number of n-Users in a Shared Window Experience to increase nearly exponentially as each n-User places Content in their Presentation Pane for sharing with others, thus causing additional n-Users to be added to the Shared Window Experience. Therefore, the Shared Window tools can provide options allowing a Viewer to control the number of n-Users in the Viewer's Shared Window Experience at any particular time. For example, the Viewer can set a maximum number of n-Users, and when that maximum number is reached, any additional n-Users are not added, or new n-Users are added but other n-Users are 'bumped' out of the Shared Window Experience, or be bumped into a separate 'layer' of a plurality of layers of a Shared Window, for example.

Alternatively, the Viewer can select specific n-Users and/or lists of n-Users that will persist in the Viewer's Shared Window Experience, while any other n-Users are subject to being added or bumped out as described. In another embodiment, the n-User can individually select n-Users for removal from the Viewer's Shared Window Experience, with all other n-Users persisting in the Shared Window Experience. According to still another embodiment, a Viewer can opt to allow only those n-Users identified relative to the Content in the Viewer's Presentation Pane into the Viewer's Shared Window Experience, while n-Users identified relative to Content in n-Users Presentation Panes will not be added to the Viewer's Shared Window Experience.

Of course, although these and other embodiments for controlling the proliferation of n-Users concurrently in a Viewer's Shared Window Experience exist, a Viewer can opt to allow the number of n-Users in a Shared Window Experience to continue to increase or decrease freely. Although a Shared Window can accommodate any number of n-Users, different 'layers' of a Shared Window can also be defined and established according to either Viewer-selected parameters, pre-defined parameters (e.g., built into the code of the Shared Window tool), parameters selected and/or defined by a service (e.g., corresponding to a Viewer's subscription level) or by some other method or combination of methods. Different Shared Window layers can reflect different degrees of similarity between a Viewer's Content and that of n-Users, for example, or can be established based on an chronological basis related to when each n-User joins a Shared Window, or based upon virtually any distinguishable characteristic related to an n-User's participation in a Shared Window. In general, different layer of a Shared Window serve as an organizing structure within a Shared Window. Thus, layers can correspond to a presented range of results of a search (e.g., Results 1-10, or Results $n^1$-$n^2$, etc.), and a Viewer can selected from among one or more layers to interact with n-Users organized and/or presented therein.

According to embodiments, n-Users can also transition between layers of a Shared Window by altering one or more of such characteristics. For example, an n-User can change the nature of the Content they're viewing, and transition to a different Shared Window layer based upon a higher or lower degree of Content-relevance. Alternatively, an n-User can transition to a different layer based not upon their own actions, but upon the actions of other n-Users. In a chronologically-based example as described above, an n-User may transition to a different layer due to one or more n-Users in 'higher' layers existing the Shared Window, elevating the n-User's chronological ranking (e.g., from the $100^{th}$ n-User to join the Shared Window to the $50^{th}$, based upon 50 more highly-ranked n-Users exiting the Shared Window).

In alternative embodiments, the Viewer can adjust the ranking of one or more n-Users for layer placement, either spontaneously or as part of a pre-set definition (e.g., favorite n-Users, friends, group members, etc.). It is also conceived that n-Users may experience different capabilities and/or differentially perceive the Shared Window based at least in part upon their existence within a particular layer of a Shared Window, such as the ability or inability to perceive and/or interact with n-Users in other layers of the Shared Window, for example. Therefore, from the descriptions provided herein regarding characteristics, capabilities, and effects of a Shared Window according to embodiments, one having ordinary skill in the art will understand that the scope of the invention extends to numerous embodiments not specifically described here. For example, different organizational schemes, arrangements of elements, methods for specifying parameters and/or characteristics, etc, are anticipated by this description and considered within the expansive scope thereof.

Content Control in and by Use of Service Tools

Both a Persistent Client Window and a Shared Window represent tools and methods by which a Viewer can receive and view Content (e.g., perceived visually, aurally, tactually, and/or otherwise) conveyed to the Viewer from and/or through sources otherwise outside of the Viewer's control. A large amount of Content available and conveyable to a Viewer can include Content that the Viewer would subjectively find objectionable, as well as Content that would be considered objectively objectionable to a reasonable person in the community of the Viewer (e.g., such as from designated sources). Therefore, embodiments of the invention include tools and methods (objectionable content obstructing means) for altering the presentation of objectionable Content, subject to the individual control of a Viewer, so that the Viewer need not view (or hear, or read, or otherwise perceive) objectionable Content that might otherwise be brought within the Viewer's perception.

Numerous tools and methods exist for altering and/or eliminating objectionable material from conveyed and/or conveyable Content. Some examples are described in U.S. Pat. No. 6,553,566, entitled VIEWER CONTROLLED MULTI-FUNCTION SYSTEM FOR PROCESSING TELEVISION SIGNALS, filed on 27 Aug. 1999 and granted on 22 Apr. 2003, the disclosures of which are incorporated herein in their entirety by this reference. Other examples are described in U.S. Provisional Patent Application entitled INSERTING/OVERLAYING OBJECTS RELATIVE TO VIEWABLE CONTENT AND INCREASING THE INFORMATIONAL, SOCIAL, COMMERCIAL, COMMUNICATIONS AND/OR OTHER VALUE DERIVABLE FROM THE CONTENT, filed on 28 Dec. 2006, and U.S. patent application Ser. Nos. 12/004,392 and 12/004,622 filed thereupon on 19 Dec. 2007 and 20 Dec. 2007, respectively, the disclosures of which are incorporated herein in their entirety by this reference. U.S. Pat. No. 6,553,566 discloses (a) scrambling selected frames of video content prior to display on the screen of a target device (e.g. television monitor), which are deemed to contain objectionable materials, (b) converts speech and mutes spoken words, word combinations and phrases which are deemed to be objectionable, (c) deletes words, word combinations and phrases contained in a closed-captioned text strip accompanying video programming, and (d) stores compressed video packets for display in 'Picture-in-picture' windows on the screen of a targeted device or to be stored for later retrieval and display and/or processing.

The present invention substantially extends and improves upon the capabilities disclosed in U.S. Pat. No. 6,553,566. For instance, the present invention increases the scope of devices with which a Viewer can control the presentation of objectionable material to include any device which can convey objectionable material to a Viewer in nearly any perceivable form, received from nearly any source. This includes computer devices (e.g., desktop, portable, server), handheld computing and/or communications devices (e.g., personal digital assistants (PDA), mobile phones), entertainment media devices (e.g., video game systems, DVD and CD recorders and/or players, digital video recorder/players, video cassette recorder/players), and audio and/or video remote broadcast receivers (e.g., such as for satellite, cable, 'terrestrial' television, internet protocol television, and/or fiber optic transmission).

More generally, the present invention includes all devices which can present Content to a Viewer, either directly or through another device (e.g., visual display, audio speaker, printing device). Nearly any device related to presenting video, audio, thought, and/or tactile Content to a Viewer can be a device for, or be connected with a device which can, access and/or execute Service tools for controlling the presentation of objectionable Content, and is included in embodiments of the invention.

Further, embodiments of the invention include Content conveyed by wire, or wirelessly (e.g., by a carrier wave, etc.), or by optical transmission, by computer readable media (e.g., magnetic media, optical media, physical media, solid state memory devices), thought, or by any combination of these methods, including the results of an analysis of thoughts, figures, graphs, audio/video/photo/film, etc. Examples of physical media can include etchings, impressions, dimples, holes, patterns of ink or other color contrasting materials, or other features readable by a device. Solid state media can include either or both of read only and random access memory devices (e.g., EPROM, DRAM, SRAM, 'flash' memory devices), and others. Magnetic media can include both entertainment and data tapes (including VHS, Beta, 'reel-to-reel' formats and others), hard disk drives, 'floppy' disks, and other magnetic storage media. Optical media includes digital video disks, compact disks, and other optically written and/or optically readable media.

Embodiments of the current invention extend control of objectionable material to both compressed and/or uncompressed audio, video, textual, and/or instructional data. A Service and/or Service-provided tools can provide control of objectionable Content either prior to conveying Content to a Viewer, when a Viewer accesses Content for viewing, during viewing of Content, while and/or prior to storing Content to a computer readable medium (or a medium readable by any device described, referred to, or reasonably implied herein), or during another operation related to providing Content to a Viewer and/or a Viewer accessing, viewing, or storing Content.

Control of objectionable material can include scrambling, blocking, deleting, overlaying, replacing, skipping over, and/or reducing the volume and/or resolution of the objectionable Content. With regard to replacing objectionable Content, a Viewer's control can include excising objectionable portions of the Content and replacing each portion with Content that is more acceptable to the Viewer. In a general sense, controlling objectionable material includes any and/or all methods for altering objectionable material from its original form and/or nature. Control can be achieved using a digital signal processor, as described in U.S. Pat. No. 6,553,566, or using other electronic circuitry and/or software. Objectionable material can also be controlled when being sent by a Viewer to an n-User, or shared with an n-User, such as via a Persistent Client Window and/or Shared Window.

With regard to U.S. Provisional Patent Application Ser. No. 60/877,891, entitled INSERTING/OVERLAYING OBJECTS RELATIVE TO VIEWABLE CONTENT AND INCREASING THE INFORMATIONAL, SOCIAL, COMMERCIAL, COMMUNICATIONS AND/OR OTHER VALUE DERIVABLE FROM THE CONTENT (hereinafter 'INSERTING/OVERLAYING'), and U.S. patent application Ser. Nos. 12/004,392 and 12/004,622 filed thereupon (on 19 Dec. 2007 and 20 Dec. 2007, respectively), embodiments of the invention allow control, by a Viewer, of objectionable material associated with Markers (e.g., Objects) and/or Data Packets associated with Content. Likewise, a Viewer can control objectionable material included within the Content underlying the Objects and/or Packets. Generally, the Viewer controls all objectionable Content arriving within his or her range of perception, prior to actually perceiving the objectionable material or at a later point once the objectionable material is detected.

Viewer control of objectionable material, according to embodiments of the invention, can augment, supersede, and/or co-operate with other tools having Content monitoring and/or editing capabilities, for example, the objectionable material control tools in the related U.S. Provisional Patent Application Ser. No. 60/877,891 and U.S. patent application Ser. Nos. 12/004,392 and 12/004,622.

Objectionable material can be recognized in Content by numerous methods. For example, a tool can include pattern recognition capabilities with regard to visible Content, and can alter objectionable material at least until the Content is no longer detected as objectionable by the pattern recognition capabilities, or further. A tool could recognize objectionable spoken works in audio Content, or text strings related to objectionable material in written Content. A tool could recognize that data represents or will represent objectionable material when interpreted into a perceivable form according to the data format and/or instructions contained in the data, even before the data is read out into a form perceivable to a Viewer. Embodiments of the invention can control objectionable Content even in Content having Digital Rights Management or anti-copying/anti-piracy software codes (such as 'Broadcast Flags') to prevent the audio, video, or other Content from being 'pirated'.

Objectionable material can include any of the materials listed in U.S. Provisional Patent Application Ser. No. 60/877,891, as well as other material that an individual Viewer deems objectionable based on individual, subjective preferences. As will be inherently understood from Provisional Patent Application Ser. Nos. 60/877,891 and 60/918,984, and U.S. patent application Ser. Nos. 12/004,392 and 12/004,622, copyrighted Content can be marked with uniquely identifiable Markers, Objects, and/or data packets. To prevent copyrighted Content from being improperly copied, distributed, saved, etc., embodiments of the invention described herein can recognize copyrighted Content so marked as a form of objectionable material, blocking unauthorized uses of such Content according to data carried by the Markers, Objects, etc., according to User-defined parameters, and/or according to Service-defined parameters. Therefore, uses of copyrighted Content can be controlled through embodiments described herein by any or all of a Content creator (e.g., User, copyright holder), a Viewer, a Service, and/or others, providing multilayered protection for copyright holders.

Content can also be controlled by or through Service tools and/or capabilities in other ways as well. For example, a Service, or a Content provider (User, Promoter, or other) can designate certain Content to be associated with and/or provided to only Viewers and/or n-Users whose profile information or other demographic information meets parameters specified by the Content provider. For example, profile information specified by a Content provider could include age, geographic location, security clearance level, password awareness, prior purchase information, or virtually any other information parameter that can be recognized by a Service.

When so specified, any search for n-Users interested in or concurrently viewing similar Content will only identify and allow entry into a Shared Window Experience of those n-Users whose information parameters match those specified (e.g., at least an appropriate age, etc.). This allows, for instance, an advertiser to initiate a Shared Window Experience with only a targeted demographic, excluding all others. Likewise, an information service organization can initiate a Shared Window Experience with only those n-Users who have been provided with a password after paying for services, and/or for whom authorization has been communicated to a Service. As implied by the descriptions herein, a Service can maintain databases including information parameters related to registered Viewer/n-Users, to Content, and to Content providers, as well as related to other entities and/or characteristics.

System for Creating Distributing, Hosting and/or Viewing Marked Content

Figure 26:
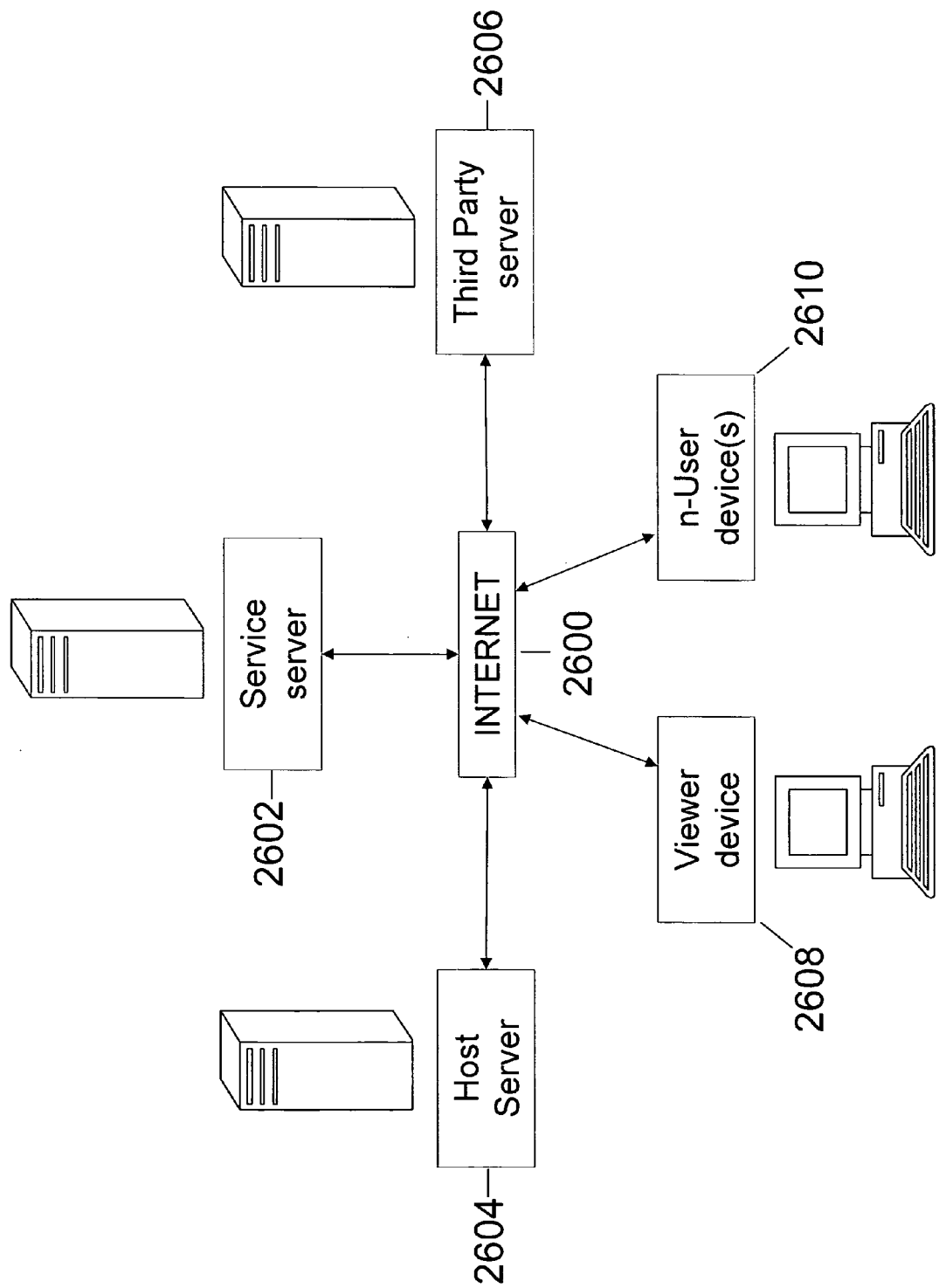
FIG. 26 depicts a system for sharing Content using Service-provided tools according to an embodiment of the invention.

With reference to FIG. 26, a system is described herein by which Content can be shared by a Viewer with n-Users, within a Content-based, live, interactive social network. Embodiments of a system need not include all features or elements depicted according to FIG. 26, and can include other features or elements as would be understood to those having ordinary skill in the art.

An embodiment of a system can include between one and 'n' servers, where 'n' can represent either a fixed or variable number of servers in a system. A Service server 2602 can retain Viewer registration data, as well as other data useful to facilitate Content sharing and social interaction. For example, the Service server could store the internet address of the user's personal website/webpage or URL/URI (Uniform Resource Locator/Uniform Resource Identifier) (even from another social network such as MYSPACE), or the User's personal content broadcast service (e.g., an Internet Protocol Television or podcast or vodcast broadcast) that would appear next to the user's ID once that user is in the Shared Window, and could be shared with others in the Shared Window by the means described herein. Additionally, a User could drag and drop or by some other means or method cause another User's broadcast channels in the Shared Window to be brought into the User's Persistent Client Window, to add to the other User's Content for viewing the combined Content in the User's Persistent Client Window. At least one Host server 2604 is typically present in embodiments to provide access to Content. An example of a host server would be a server maintained by a website provider (e.g., YOUTUBE™, GOOGLE™ Images, KODAK™ Photo Gallery). A third party server 2606 may also be present, and may provide data retention, transfer, processing or other functions or services on behalf of a Host, Service, n-User, or Viewer.

Any and/or all servers in a system according to embodiments will generally, but not necessarily, be connected in some form to the internet 2600. Connection to the internet 2600 may be provided through a third party internet service provider (ISP), or through a proprietary internet service provided and/or controlled at least in part by a Host, Service, n-User, and/or Viewer. Connections may be wired or wireless, and may utilize any of the numerous wireless technologies (e.g., 802.11a, 802.11g, WiFi, WAN, etc.) and/or wired technologies (e.g., high speed electrically conductive cable, telephone modem, fiber optic cable, LAN, etc.) currently available and/or known to those having skill in the art. Various routers, repeaters, modems, relays, switch boxes, and other devices may also be utilized to facilitate and/or enable data communication between servers (and/or devices) and the internet 2600, and with other servers (and/or devices) through the internet 2600, as are known in the art.

In addition to servers, a system according to various embodiments also includes devices for creating, storing, viewing, editing, transmitting, receiving, and/or utilizing Content, although the use of devices is not so limited. A Viewer device 2608 and/or an n-User device 2610 can be used for viewing, editing, and/or storing Content, among other uses and activities. A Viewer device 2608 can also provide for communicating with an n-User device 2610, for example via e-mail, text messaging, instant messaging, voice messaging, VoIP, videoconferencing, thought analysis, or other communications technologies and/or methods currently in use or known to those having ordinary skill in the art.

Viewer devices 2608 may transfer data with and/or via the internet by any of the devices, technologies and/or methods listed above regarding servers, as well as by any other technologies and/or methods currently in use (such as peer-to-peer networking) or known to those having ordinary skill in the art. However, viewer devices 2608 may also operate temporarily or for extended periods of time without having an active connection with the internet, either wired or wireless. Thereafter, such devices can be connected with the internet, and data can be transferred with and/or via the internet.

It should be clear therefore, that any device and/or server listed or implied to exist in the embodiments described herein may be connected, directly or indirectly, with any other device and/or server listed or implied to exist herein via permanent, lasting, temporary, and/or intermittent or occasional connection with and/or through the internet.

Viewer and/or n-User devices, 2608 and 2610 respectively, may be any electronic device capable of and/or aiding in viewing, processing, storing, editing, manipulating (e.g., altering frame rate, image contrast, tone quality), transferring, or otherwise using Content. Examples include, but are not limited to, computers (e.g., desktop, mobile, palmtop, server), personal data assistants (PDA), electronic game systems (e.g., PLAYSTATION™ III, X-BOX™ 360™, NINTENDO™ WII™), mobile telephones, televisions, digital video recorders (DVR), thought analyzers, satellite enabled devices (e.g., navigation, radio, communication) and other devices or instruments. This includes such devices and/or instruments whether they are generally considered consumer, commercial, enterprise, military, scientific or industrial in nature. As earlier described, the term 'viewing' as used herein, can collectively or alternatively include perceiving Content other than visually, such as a 'Viewer' aurally, tactually, or otherwise perceiving Content (such as through thought control or analysis), and/or alternate/substitute perception devices designed to compensate for functional impairment of other senses.

Devices and/or servers according to embodiments of a system described herein also generally include peripheral input and/or output devices. Examples of such I/O devices may include a keyboard, mouse, display ('monitor'), wireless card, antenna, printer, facsimile, scanner, enabling device (such as a may be used to aid visually, physically, and/or hearing impaired Viewers), thought analyzer, port replicator, and docking station (e.g., for media players including IPOD, mobile phones, mobile personal computer), although the embodiments are not so limited.

Likewise, devices and/or systems described herein may be capable of operation utilizing various operating systems, including but not limited to those provided by or based upon MICROSOFT™, APPLE™, NOVELL™, LINUX, UNIX, NINTENDO™, SONY™, or other commercial, open source, and/or proprietary technologies, and whether 32-bit, 64-bit, or some other architecture currently available or known to those having ordinary skill in the art.

Further, a substantial amount of research is dedicated to, and has achieved demonstrable progress in, directly interpreting human thoughts as electrical impulses capable of causing responses in electrical and mechanical systems. Systems so designed and/or adapted could reasonably be applied according to embodiments to enable Content sharing and interaction. For example, a Viewer with Amyotrophic Lateral Sclerosis (i.e., ALS, or 'Lou Gehrig's Disease) who has lost speech and motor function, can use a thought-controlled device according to an embodiment. Thereby, the Viewer could communicate his needs or perceptions to others, and other various monitoring systems for the Viewer's vital functions (e.g., heart rate, oxygen saturation, blood pressure) could be shared as Content with medical professionals.

Therefore, as described herein, the embodiments of a system for creating, distributing, sharing, hosting, and/or viewing Content, among other activities and/or operations described herein, may be quite broad and inclusive.

Determining Content 'Sameness or Similarity'

References to "same and/or similar Content" appear throughout this description. Sameness and/or similarity is determined in an embodiment through the use of a content analysis means. In an exemplary but non-exclusive embodiment, a content analysis means is embodied at least partially in device executable code using, for example, HTML Matching Language (HML). The HML may be written in Javascript and/or C++, although the embodiments are not so limited. The HML may be included within a 'plug-in' provided by the service provider as part of the content analysis means, and either specially configured for a particular Content source or source type, or may be configured more generally, providing utility across a plurality of different content sources, content types, and/or source types.

A portion of the content analysis means includes a simple HML framework for matching elements of Content obtained from a Content source, for example, a webpage or web presence (e.g., FACEBOOK™, YAHOO™, etc.) that also includes Content. A portion of the HML framework may include a small script identifying where information related to Content presented by that web presence can be located. In part, such information can identify important parts of a webpage so that a service icon, for example, is not inadvertently placed (as described above regarding FIG. 4, etc.) over important portions of the Content (e.g., fully or partially obscuring perception of important parts of the Content). Additionally, however, a script can also indicate a location of metadata, keywords, and other information useful for assessing the sameness and/or similarity of Content. Such information may be incorporated within the Content (for example, in a data packet according to a listed related patent application), in an associated file, or elsewhere (e.g., located in a directory, database, remote server, etc.).

Providing HML scripts obviates the need to write complicated code in Javascript or C++ for each and every webpage (for example) for which you wish to compare Content characteristics, saving time and effort, and improving flexibility. For example, relatively simple scripts can be edited and/or added to a database at a Service provider, providing new content analysis means capabilities without requiring a formal revision and release of an entirely new plug-in.

A content source can also elect to be a 'supported' content source, and either provide plug-ins for accessing information about provided content (e.g., such as where information is located and accessible to the service provider), by granting a service provider access to such information, or by attaching the information to provided Content in a form and/or manner which facilitates access to the information by the service provider. In general, a 'supported' Content source provides a service provider with access to information in one form or another, facilitating analysis of the data (and therefore, of the related Content) by the content analysis means. Further, once an HML script for a supported Content source is added to a content analysis means, it is possible in embodiments for all or substantially all subscribers (e.g., Viewer, n-Users, etc.) to access and enjoy the Content-based linking enabled by the new script.

A Content source may also be 'unsupported', yet a script similar to the sample described above can be written to instruct a content analysis means where to obtain information relevant to the Content. As with supported Content sources, each Content source may require an individualized scrip including instructions particular to that Content source, or a general script may work for two or more unsupported Content sources. Of course, if some or all information is rendered unavailable to a service provider, or if no such information exists or can be derived, the Content may not be available for analysis by the content analysis means. In such cases, the Content may likewise be unavailable for establishing linking between Users. However, according to another embodiment, a content analysis means includes capabilities to analyze Content and extract information from the Content itself, even if extrinsic information or metadata are not available.

For example, a content analysis means can be configured to determine key words in textual Content, or configured to recognize shapes, symbols, or other indicia in visual Content (e.g., still or video images), or to analyze musical Content elements such as tone, rhythm, etc. One tool providing capability for analyzing video images of a human subject performing American sign language and extracting linguistic data, is known by the trade name SIGNSTREAM™, developed as part of the American Sign Language Linguistic Research Project. SIGNSTREAM™ is just one example of a content analysis means which can be included in an embodiment of the invention. A tool known by the trade name CATPAC II™ (from the GALILEO™ Company) is configured to read text and summarize its main ideas, proving a basis for Content matching and linking based on textual Content. Likewise, CONCORDANCE™ (from the CONCORDANCE SOFTWARE COMPANY) can analyze text and produce therefrom indexes, word lists, and other indicia of the textual Content. GRACENOTE™, Inc. provides a service and software enabling identification of musical works, and can either be incorporated within, or accessed by an embodiment of the invention, providing a content analysis means directed toward audio Content and/or files containing audio Content (e.g., MP3 files, etc.). These examples of tools and services do not, however, constitute an exclusive or exhaustive list of capabilities or elements of a content analysis means according to the contemplated embodiments.

Figure 27:
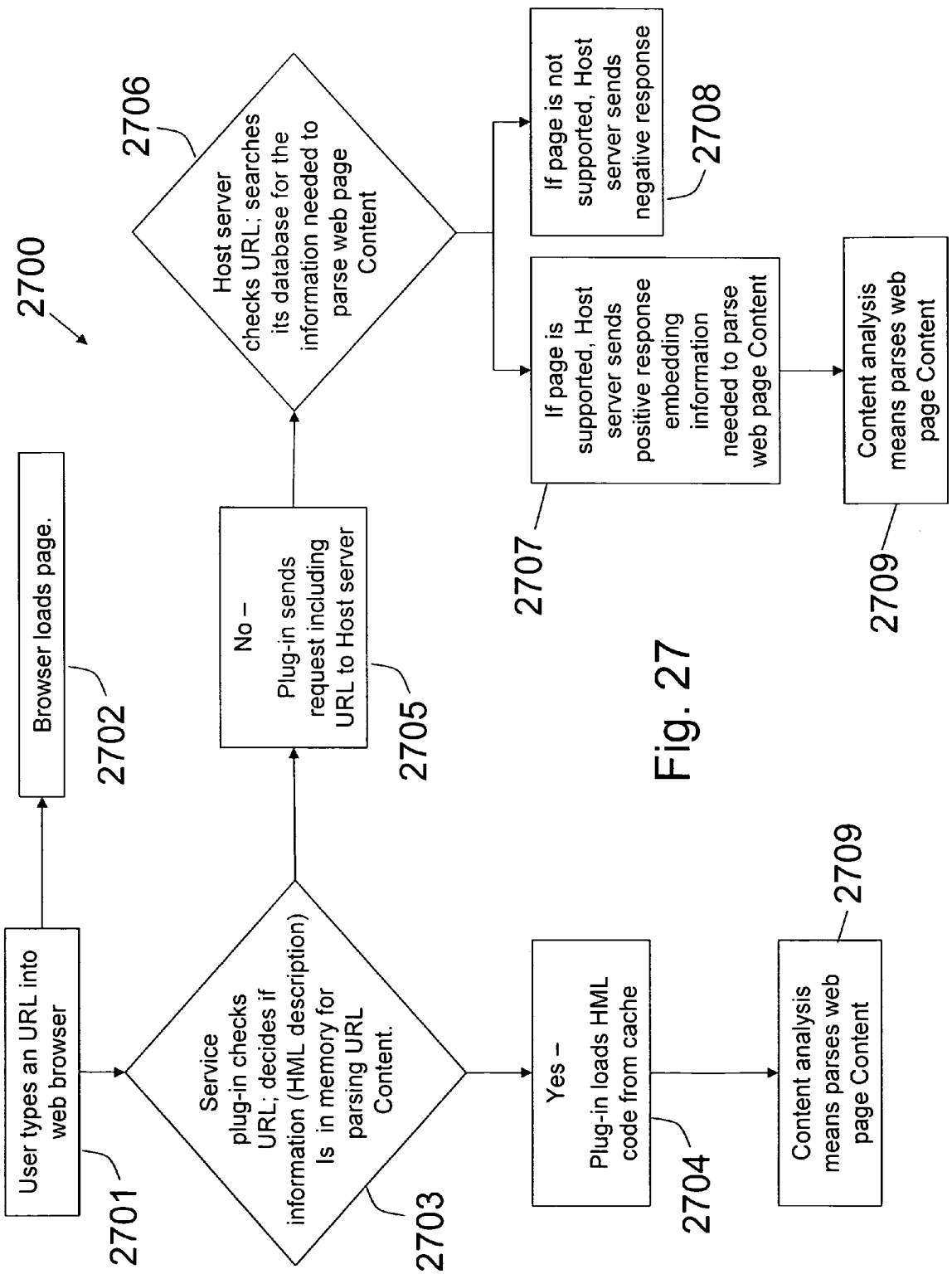
FIG. 27 depicts processing a Content analysis event via a content analysis means according to an embodiment of the invention

However, in a typical embodiment wherein information about Content is available, an example of the structure and function of a content analysis means may perhaps further illustrated by utilizing a sample event 2700, substantially depicted in FIG. 27.

At 2701, a Viewer types a webpage or other Content locator (e.g., URL, etc.) into a navigational feature of web browser application, and the browser loads the page onto the Viewer's device at 2702. At 2703, the service plug-in checks the URL and decides whether or not a HML description/script is available in cache memory for parsing the content. If the HML description/script is present, the plug-in will load the HML code from cache, at 2704. However, if the HML description/script is not present in cache, as at 2705, the plug-in will send a request to the webpage content host server, the request including the URL.

At 2706, the server checks the URL and searches its database for the information (HML description) needed to parse the web page Content. If the webpage (e.g., the Content source) is supported, the server will send a positive response, at 2707, including embedded information needed for parsing the page Content. At 2708, if the page is not supported, the server will send a negative response, or may send no response at all. At 2709, the content analysis means utilizes the available information, and parses and analyzes the Content of the web page (or other Content source) to identify characteristics of the Content.

At this point, the plug-in typically has sufficient information needed to determine whether the Content can be used for matching and linking or not. Inasmuch as the described activities take place across an entire network each time a subscriber's web browser loads a webpage, the content analysis means also has sufficient information to match the Content concurrently engaged in by a plurality of subscribers at any given moment, and link the subscribers based on the sameness and/or similarity of the Content.

As described above, a content analysis means similarly functions when any of a large number of activities take place relative to Content, not only upon the loading of a webpage. When a subscriber loads service tools onto a device, those tools include Content analysis means also configured to recognize those other activities (e.g., storing, searching, playing, clicking on content, etc.), and to analyze the Content toward which said activities are directed.

The potential for a large number of service subscribers each performing a plurality of Content related activities means that the events described above can occur a large number of times substantially concurrently. Further, with information being collected and rendered useable by a service and/or by service-provided tools relative to each activity by each subscriber (e.g., Viewer and/or n-User), the content analysis means described herein enable formation of one or more Content-based live social networks. Once two or more subscribers are identified with commonalities identified in their Content, the content analysis means can either establish a link, or can propose linking the two or more subscribers, who can then choose to accept or reject the linkage (e.g., choose to interact with others in a live social network, or choose to not interact, etc.).

It should be clear from the examples and descriptions provided above that a content analysis means can constitute a software program complete within itself, or can include software tools which also access and utilize external tools or services (e.g., GRACENOTE™, SIGNSTREAM™, etc.) as part of an integrated content analysis function. In embodiments, a Viewer can specify which type of Content they are engaged in, activating an appropriate portion of the content analysis means, while in other embodiments, the content analysis means can identify the form of Content relatively or completely automatically. In still another embodiment, the content analysis means can utilize multiple analysis tools, services, or approaches, in parallel or serial, until one or more of them yield usable information about the Content to enable linking based thereupon.

According to an embodiment, once a content analysis means has identified characteristics from two or more instances of Content, the content analysis means is further configured to compare such characteristics to identify commonalities. If commonalities are detected, a content analysis means can designate the two or more instances of Content as being the same or similar, one with another. Additionally, as earlier indicated and as is known in the art (e.g., as in a search result from an internet search engine), an assessment of a degree of similarity may also result in the content analysis means providing a numerical, graphical, or other representation of an assessed degree (e.g., level) of similarity, which might be useful to a Viewer when selecting n-Users with whom to interact, of for other purposes. For example, if two subscribers concurrently access instances of identical Content, all or nearly all identified characteristics will match therebetween. Thus, the content analysis means will identify the two instances of Content as being the same. However, if the n-Users access what would otherwise be the same Content, but one of them accesses a newer revision of the Content including one or more changes, the content analysis means will identify that one or more characteristics of the Content vary one from the other, and the content analysis means will identify the two instances as being very similar, but not the same.

The above embodiments are for illustrative purposes, and do not constitute an exclusive listing of the features, capabilities, configurations, or purposes of a content analysis means. Rather, a content analysis means can vary in any embodiment specifically mentioned, contemplated, or reasonably understood from the descriptions provided herein. Likewise, although embodiments above are described relative to webpage Content, the invented concepts apply to other forms of Content described herein, or described in a listed related patent, and/or reasonably understood therefrom.

Exemplary and Alternative Embodiments of the Invention

Embodiments of the invention lend themselves to a great number of beneficial applications. For example, a Viewer using the auction website eBay can be connected (e.g., live and concurrently) to n-Users (on eBay or another auction site or any other web application or web community) that are online and interested in the same and/or similar Content that the Viewer is viewing on eBay (e.g., as determined by an analysis of the metadata, subject matter, context, or other discernable characteristics of the Content). The Viewer and n-Users can exchange information and increase traffic to the auction items being viewed, which could help to support greater sales at the eBay auction website.

In another exemplary embodiment, a MYSPACE™ member could be viewing Content and could be linked to n-Users (from anywhere in the world) who are also concurrently perceiving the same and/or similar Content (e.g., based on a Service's analysis of their Content's metadata, form, structural elements and/or sequence, context, etc.). Therefore, links are created allowing a Viewer to meet others who have the same or similar interests, and to interact within a live social network. Further, when MYSPACE™ members meet other n-Users through a Service Shared Window, they can invite others and expand the membership of MYSPACE™ to others in any and/or all countries concurrently. Service tools can link n-Users of one social network to n-Users in any other social network (e.g., LINKEDIN™, FACEBOOK™, or others).

Likewise, just as it is common and expected to have salespersons present when visiting a store to shop for items, real salespersons or representatives of e-commerce items can be online and actively linked with a Viewer and/or n-Users in a live Shared Window Experience. Through such interaction, salespersons and/or e-commerce representatives can assist and influence Viewers and/or n-Users when making sales decisions.

In an embodiment where a Viewer is playing a videogame, Service tools recognize the videogame by scenes or other aspects of the game Content (determined for example by an analysis of the metadata of the Viewer's Content), and links the Viewer to n-Users also playing or interested in the same or similar games or who are concurrently engaged in the same or similar scenes. Therefore, the Viewer and the n-User(s) can then play the game together, or n-Users and the Viewer can offer each other tips to help the Viewer play the game successfully. N-Users can be a virtual audience cheering on the Viewer during game play, turning an otherwise solitary activity into an interactive, social event. N-Users can also recommend similar games, offer reviews of games or features of a game to the Viewer, and otherwise provide the Viewer with an enhanced knowledge and access to information related to the Viewer's preferred entertainment activity. The same is true with regard to other forms of entertainment media, such as movies, books, television shows and others, whereby n-Users and Viewers who are linked together by the Service can make recommendations and guide each other to preferred and enjoyable Content.

A Persistent Client Window (that may or may not always stay open, visible, and active on a Viewer's device display) can serve as a 'set-top box' and 'entertainment area' (like a TV set) on the Viewer's desktop. Films, videos and other Content can be pushed (as in the case of IPTV Channel distribution) to a Viewer through a Persistent Client Window. Web communities, such as YOUTUBE™, DAVE.TV™, AOL™ Video, and others, or Content distributors, such as SKYPETV™ (JOOST™), NETFLIX™, or BLOCKBUSTER™ Videos, could also target and deliver Content to Viewers through the Persistent Client Window (also known as a 'Unified Media Center'). As a 'Unified Media Center', a Persistent Client Window can remain broadcasting visual Content on a Viewer's desktop. A Viewer could tune into channels providing different Content, or can specify a particular genre of Content (e.g., comedy, politics). When the Viewer sees some interesting Content displayed by the Persistent Client Window (Unified Media Center), the Viewer could convert the Persistent Client Window to a 'full screen view', could record the Content for later playback, or could direct the Content into a Service Shared Window to share the Content with n-Users.

As suggested above, a Shared Window Experience provides a particularly effective, useful, and rich method for delivering training to Viewers located at a distance from the trainer(s), for linking business people together in live meetings, for sharing Content with widely dispersed family members, and numerous other uses. In embodiments, a Viewer can share Content with n-Users (who are linked together based on concurrently perceiving Content determined to have the same or similar metadata, subject matter, context, etc.), the n-Users can affect changes in the Content, and share the changed Content back with the Viewer. This could be useful, for example, to deliver testing to n-Users, to solicit and receive job applications, or to survey n-Users on some topic. Further, by using objectionable material filtering tools as described above, and in the referenced patents and/or provisional patent applications, parents can allow children more independence when using the internet, without the worry that children will be exposed to material the parent(s) deem objectionable.

In alternate embodiments, a Viewer need not have Service tools downloaded to and/or resident on a device in order to use and benefit from said tools and/or capabilities. For example, a Viewer may use an internet connected device on which the Viewer has no authorization or ability to install Service tools, in a library, and internet café, at a school, or in some other setting or situation. Likewise, a Viewer may use a device on which, for some reason, Service tools are unable to properly operate, such as may be due to software incompatibilities, memory limitations, or some other reason. Nonetheless, as long as the device can connect to the internet and access the Service, the Viewer can utilize and benefit from Service tools and capabilities.

This is true in some embodiments, because Service tools and capabilities can be run directly at and/or from the Service servers, with the User's device serving only as a visual, aural, tactual or other interface. A Viewer can access Content through a Service-resident browser or other means, can input relevant information through a device-enabled means (e.g., keyboard, microphone, mouse), and otherwise enjoy all or most of the same capabilities and perceptual experiences as if the device did have Service tools directly installed on it.

Alternatively, a Service can provide each Viewer with a personalized webpage, at and/or from which the Viewer can access all of the Service tools and/or capabilities that the Viewer is authorized to use, based on the Viewer's subscription level, security clearance, or other level of access. Additionally, a Viewer can access other Viewer specific information, such as previously saved bookmarks to Content, prior search or Content-viewer information, communication links, IM contacts, and other information.

In such embodiments, the Service can recognize registered Viewers by, for example, a Service-provided Viewer identification number or code word, or by providing answers which match those previously provided to specified queries, and can provide Viewer access to the Service from virtually any internet-connected or connectable device.

In still another embodiment, rather than separately accessing Service tools and/or capabilities, such as a Persistent Client Window or a Shared Window, the Viewer can obtain and use a device which has as its sole and/or primary purpose, execution of Service-related capabilities. Therefore, the device can include all the capabilities described relative to a Persistent Client Window, a Shared Window, or other Service tools, and can link to and share Content with n-Users' devices through a communication conveyance means (e.g. electrically conductive wire or cable, wireless carrier wave, optical signal conveying medium) wherein the n-Users have been linked together by embodiments of the invention into a live social network based on the sameness and/or similarity of Content in which the n-Users are concurrently engaged. A Viewer, upon specifying a Content type, or metadata words and/or phrases, or by clicking onto or using the cursor to roll-over Content, is connected with other Users concurrently viewing similar Content, or who have specified the same or similar metadata. Further, such a device can also include a means for acquiring Content for sharing, such as a digital camera, a handheld scanner, a business card reader, a barcode reader, an audio recorder, or other such Content capture devices. Devices could include separate channels, so that Viewers can switch between different groups of n-Users on different networks, or select 'all users' and/or 'all networks'.

One application for an embodiment as described above could include 'blind date' gatherings, where each of a large number of Viewers seeking to meet and/or date eligible n-Users are each issued a device. The Viewers and n-Users can enter specified Content (e.g., photographs), metadata, or other information (e.g., personal characteristics, hobbies, interests, pets) into the devices, and can then be linked to n-Users at the gathering with whom they share common information characteristics based on having a commonality of the same or similar metadata, subject matter, context, and/or other characteristics as describe(s) the Content that is provided. So linked, they can then communicate with each other, share Content, and ultimately find each other in a large crowd for a face-to-face meeting.

In the same way, vendors and purchasers could share Content and information at a commercial convention, and fans could share Content and interact across and amid the noise and confusion of a stadium during an athletic event. Viewers could also receive an alert or an invitation by some visual, audio, or other indication by a device, indicating that an n-User is viewing Content (e.g., in a Service community, room, website) in which the Viewer has previously indicated an interest, or has visited and/or viewed recently that have the same or similar metadata in the Content that the n-users are engaged in.

In embodiments, a search for n-Users viewing or expressing an interest in the same or similar Content as a Viewer is not limited to Service-registered n-Users, but can include Users, n-Users, and Viewers elsewhere viewing Content while connected to the internet. Tools and capabilities can mine the internet, such as by querying non-service servers and monitoring activity passing though Service servers, to identify others viewing or having an expressed or implied interest in the same or similar Content having the same or similar metadata. A Viewer using such a broad search can substantially narrow the search by providing further information or metadata to the Service to narrow the scope of the search, and to increase the relevance of search results.

One exemplary use of a system and/or method of a Persistent Client Window and Shared Window can include obtaining viewing/listening information from Viewers/n-Users for market research services (e.g., Nielsen Ratings, etc.), based on analysis of Content similar to that used to link Viewers and/or n-Users into Social Networks, etc.

Unless otherwise expressly stated herein, embodiments of the invention may be used in association with, and/or fully integrate with the features and capabilities described in each of the related applications listed above. Of particular note, live/concurrent social networks described herein can occur within or via Virtual Environments and/or Virtual Worlds (collectively herein, Virtual Environments). A Viewer can join n-Users in a Virtual Environment via embodiments of the invention, can invite n-Users into a Virtual Environment, or can reside within a Virtual Environment and interact in a live social network with others who are not concurrently 'within' the same Virtual Environment.

Similarly, a Viewer can define and select one or more 'targeted' n-Users, and share Content directly with those selected either while or without sharing the Content with others currently linked in a Shared Window. The selected n-User can be one of those within the Shared Window, but according to an embodiment, the Viewer can also 'reach out' of the Shared Window to share the Content presented in a Shared Window with one or more n-Users not presently participating in the Shared Window. The Viewer could invite the 'targeted' n-User(s) to join into the Shared Window, and could enable them to do so. In such embodiments, rather than a Shared Window formed based upon analysis of Content similarity between the Viewer and the targeted n-User(s), the Viewer can alternatively initiate an 'ad-hoc' Shared Window and social interaction, and therein share Content with the external n-User(s). Such 'ad-hoc' Shared Windows can include any one of or combination of the capabilities and/or features of a Shared Window as described herein, limited only by, for example, a Viewer's preferences or subscription level through a provider Service.

Likewise, the recipient n-User(s) can elect to accept the shared Content, to join the 'ad hoc' Shared Window, and/or to enter into a live social interaction with the sharing Viewer, but can likewise decline any or all of the above. Such declination can be determined by the n-User at that time, or can be determined by the n-User according to a preset parameter (such as a parameter configured to block sharing by a particular Viewer, or of a particular type of Content, etc.). However, if the n-User(s) accept the sharing offered by the Viewer, the n-User(s) will be able to concurrently view the Content presented in the Viewer's Shared Window in a live, interactive social network. This duality of function, between Shared Windows based on Content similarity analysis, and those based on ad-hoc initiation by a Viewer, extend the functionality of the described embodiments considerably.

Alternatively, rather than establishing an 'ad-hoc' Shared Window, the Viewer could stream Content presented in a Shared Window to one or more targeted n-Users who are not within the same Shared Window as the Viewer. The streamed Content could be the same as that presented in the Shared Window, providing a live and relatively concurrent viewing experience to the n-User(s). Any of a number of existing Content streaming technologies (e.g., SLINGBOX™ QUICK TIME™, etc.) or protocols (e.g., Real-time Streaming Protocol (RTSP), Real-time Transport Protocol (RTP), Real-time Transport Control Protocol (RTCP), etc.) could be utilized according to embodiments. Whether in an ad-hoc Shared Window with the viewer or simply receiving streamed Content, the n-User's could receive and perceive the Content on any of a multitude of network-connected and/or connectable devices (e.g., mobile phone, PDA, gaming system, etc.).

Additionally, although engaged in a live, Shared Window-enabled social network, a Viewer could receive and respond to e-mail, text messages, IM messages, etc. from others who are not likewise engaged in the same Shared Window social network.

The examples listed above by no means constitute an exhaustive, complete, exclusive list of the potential and/or contemplated uses according to alternative embodiments. One of ordinary skill in the art will recognize additional beneficial uses based on the description and figures provided herein.

Generating and Distributing Revenue Gained Through Service Tools Such as a Persistent Client Window, Web Widget, and/or Shared Window There are numerous ways by which a Service can generate revenue through the embodiments described and/or reasonably contemplated herein. For example, a Service can charge registration/subscription fees for Viewers and others to establish and/or join public Rooms (described in part above). Private Rooms may be established and/or joined for a fee, and hosting fees could also be charged for public Rooms.

A Service could also collect referral fees from sales of products and/or services to Viewers and/or n-Users, for example when a Viewer uses the 'Products' feature of a Persistent Client Window to make a purchase. A referral fee can be collected by the Service from the e-commerce website benefiting from the Viewer's purchase, including from e-commerce transactions taking place within a Room of a Service Community. A Service can sell 'virtual objects' for Viewers and/or n-Users to place or use in virtual Rooms where Viewers interact with n-Users.

With reference to U.S. Provisional Patent Application entitled INSERTING/OVERLAYING OBJECTS RELATIVE TO VIEWABLE CONTENT AND INCREASING THE INFORMATIONAL, SOCIAL, COMMERCIAL, COMMUNICATIONS AND/OR OTHER VALUE DERIVABLE FROM THE CONTENT, filed on 28 Dec. 2006, and U.S. patent application Ser. Nos. 12/004,392 and 12/004,622 filed thereupon (on 19 Dec. 2007 and 20 Dec. 2007, respectively), a User registered with a Service can make Content 'clickable' using Markers or "hotspots". Promoters of products, Content, or otherwise, can then place Objects or links at those Markers. When a purchase results from a Viewer or n-User clicking on Objects or links in Content, both the User and the Service can receive a referral fee. Further, additional Service tools enable the sharing of 'clickable' Content through, for example a Shared Window Experience, making the Content traceable for Service recognition of any resulting sale.

For example, when used for local sales, an embodiment of the invention could enable a network of users to take videos and turn them into their own hot-spotted Content containing e-commerce links to the content that is documented/noted in the videos. In so doing, a user could create her own shopping channel wherein that user could hotspot (i.e., attach links to) the specific items of interest in the video and then post that Content in such a way that it is delivered through a Persistent Client Window or through a Shared Window to other people who have expressed an interest in having access to goods in their locality via the hotspots. Other users could be linked (via analysis of the Content) together into this social network to add their contributions to the hot-spotted Content, or benefit from the use of it and socialize among other users around that Content.

Linked goods that are focused on in these hotspots in the Content could link together users into a live social network to engage in sales or co-browse sites such as eBay, web catalogs, and other e-commerce sites. The Service may then be able to keep track of hotspot social links and register any sales based on this feature of the Service.

Additionally, with regard to the above described 'ad-hoc' Shared Window interactions with n-Users not already in a live social network, perhaps not possessing a same service subscription level as an sharing Viewer, or perhaps not even possessing a service subscription and/or tools, a Viewer could be billed a nominal fee for each such 'ad-hoc' Shared Window activity initiated by the Viewer. Likewise, a Viewer could receive a credit, refund, discount, or other incentive for each non-subscriber the Viewer is able to convert into a service subscriber as a result of an ad-hoc Shared Window activity.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention. This can include altering the sequence of operations depicted in the figures according to various embodiments, as well as the sequence of various figures should not be interpreted as limiting the scope, character, operability or utility of alternative embodiments of the invention.

From the foregoing, those of skill in the art will appreciate that several advantages of the present invention include the following:

Embodiments of the present invention enable rapid acquisition and/or sharing of information related to Content, including linking Viewers with otherwise unrelated and anonymous n-Users for live, Content-based social interaction. Using Service tools, Viewers can readily expand (and/or disseminate) their knowledge resources within Content-based social networks, which can spring into being virtually instantaneously based upon an analysis of Content in which Viewers and/or n-Users are engaged revealing a level of similarity and/or sameness therebetween, for example.

Embodiments of the present invention allow Viewers to filter out or otherwise block objectionable material, and provide numerous methods to define objectionable material and to accomplish blocking (e.g., deletion, overlay, image alteration, substitution, etc.). Filtering is defined by the Viewer, not by the government or a ratings board. Therefore, the Viewer can view Content in substantial its entirety, minus only objectionable material, whereas technology such as a 'V-chip' might have blocked the entire Content due only to a small amount of objectionable material therein.

Embodiments of the present invention provide Content Viewers with ready access to highly relevant, interesting, fresh, and helpful information, and keep Content interesting. In essence, information sharing becomes a Content-based social experience, and Service tools provide an access point to generate interactive Content-based Communities and/or Rooms populated by others sharing similar interests.

In addition to providing tools to spontaneously create live Content-based social networks among users engaged in the same and/or similar Content, a Service also provides numerous methods for a Viewer and n-Users to communicate with each other within a social network into which they have been linked, and to concurrently view shared Content.

Embodiments of the present invention also provide a system and a method for enabling the above-mentioned advantages, including a Service (e.g., ADDnCLICK™) that provides the enabling tools and services. Thus, the Service provides the ability to reshape the way people interact with each other, with providers of goods, services, and information, and with the Content that so strongly influences social culture.

The advantages listed here do not constitute an exclusive list, nor should they be interpreted, either individually or collectively, as a statement of the complete intents, scope, and/or purposes of the present invention.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention. It is further intended that any other embodiments of the present invention that result from any changes in application or method of use or operation, method of manufacture, shape, size, or material which are not specified within the detailed written description or illustrations contained herein, yet are considered apparent or obvious to one skilled in the art, are within the scope of the present invention.

Finally, those of skill in the art will appreciate that portions of the invented method, system and tools described and illustrated herein may generally be implemented in software, firmware or hardware, or any suitable combination thereof. Preferably, the method, system and tools are implemented in a combination of the three, for purposes of low cost and flexibility. Thus, those of skill in the art will appreciate that the method, system and tools of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A network-enabled content sharing and social networking system, comprising:
    device-executable code stored at a non-transitory data storage medium and configured, when executed by a processor, to cause a viewer device to viewably display a content-based social networking shared window graphical user interface (GUI) comprising each of a first content display portion, a second content display portion, and a linked-user portion, wherein:
        the second content display portion is configured with network browsing capabilities configured to access content via a data transfer network and to display the accessed content to a viewer,
        the first content display portion is configured to display an item of content concurrently with the second content display portion, and
        the linked-user portion is configured to display an identification of each linked user and a miniature image of content with which each linked-user is engaged; and
    a content analysis means operably coupled with the first content display portion and comprising device-executable code stored at a non-transitory data storage medium and configured, when executed by a processor, to cause the processor to identify characteristics of the content displayed to the viewer at the first content display portion, and to establish a live social network construct with a remote user, wherein:
        characteristics of content engaged in by the remote user via a computing device are determined by the content analysis means to be similar to the characteristics of the content presented at the first content display portion of the viewer device,
        the viewer device and the remote user computing device are linked via the live social network construct based at least in part upon the characteristics of content engaged in by the remote user and characteristics of content presented at the first content display portion being determined to be similar, and viewer-perceivable content in the first content display portion is shared with and rendered concurrently perceivable by the remote user at the computing device of the remote user.

2. The system of claim 1, further comprising:
a persistent client window comprising device-executable code stored at a non-transitory data storage medium and configured, when executed by a processor, to cause a viewer device to viewably display a GUI including an integral content display portion and one or more selection means configured as viewer-selectable icons, wherein the one or more selection means each activate a respective one or more content-based social networking controls selected from the group consisting of:
content search, selection, and/or playback controls, message sending, receiving, and/or viewing controls, community and/or room selection controls, and task management controls.

3. The system of claim 1, further comprising:
a web widget comprising device-executable code stored at a non-transitory data storage medium and configured, when executed by a processor, to cause a viewer device to viewably display a viewer-perceivable GUI within, overlying, or proximate viewer-perceivable content presented to the viewer at the viewer device, and further configured with a remote-user identification portion, a remote-user interaction portion, and a shared window GUI accessing means.

4. The system of claim 2, further comprising:
a web widget comprising device-executable code stored at a non-transitory data storage medium and configured, when executed, as a viewer-perceivable GUI within, overlying, or proximate viewer-perceivable content presented to the viewer at the viewer device, and further configured with a remote-user identification portion, a remote-user interaction portion, and a shared window GUI accessing means.

5. The system of claim 3, wherein either or both of the linked-user portion of the shared window GUI and the remote-user identification portion of the web widget are configured, when executed and linked with one or more remote users in a live social network construct, with one or more of:
any one of or combination of a textual remote user identifier, a graphical remote user representation, and a graphical representation of content concurrently perceived by the remote user;
any one of or combination of a graphical representation of a remote user from whom a message is received, and a viewer-perceivable representation of the received message presented in any one of or combination of a textual, visual, auditory, tactile, machine-readable, and/or another viewer-perceivable form; and
a message entry means configured to receive from the viewer, and to send to the remote user, a message composed by the viewer in any one of or combination of a textual, visual, audible, tactile, and/or another form.

6. The system of claim 1, further comprising:
an objectionable content-obstructing means operably coupled with the content-analysis means, and configured as a selective content filter to prevent unobstructed presentation of objectionable viewer-perceivable content at either or both of the viewer device and the remote user device.

7. The system of claim 1, wherein viewer-perceivable content presented at the second content display portion of the viewer device is not concurrently shared with the remote user.

8. The system of claim 1, wherein both of the first and second content display portions of the shared window GUI are configured with instructions enabling them, when executed by the user device, to operate as a network browser application.

9. The system of claim 4, wherein all of or any portion of the device-executable code is executed by a service-provider device coupled in communication with each of the viewer device and the remote user device via the data transfer network, and wherein the result of such execution is presented to either or both of the viewer and the remote user at their respective devices.

10. The system of claim 1, wherein the viewer can, either prior to the establishment of or at any time during a live social network, selectively include or exclude one or more remote users from either or both of participating in the social network and from perceiving content shared by the viewer with remote users within the social network.

11. The system of claim 1, wherein characteristics of content include one or more of metadata, form, structural elements, sequence of structural elements, context, and subject matter of the content, and either alternatively or additionally including one or more of an object, marker, data packet, and visual representation of code, either inserted or overlaid relative to the presented content.

12. The system of claim 4, wherein access by a viewer or a remote user to all or any portion of the device-executable code is conditioned upon the presence of a valid registration record, for that viewer or remote user, stored at a data storage means of or otherwise accessible by a service provider device coupled in communication with each of the viewer device and the remote user device via the data transfer network.

13. The system of claim 1, wherein the content includes video content, still image content, textual content, audio content, tactile content, or any combination thereof, whether accessed via a data transfer network or from a non-transitory memory storage medium operably coupled with the viewer device.

14. The system of claim 1, wherein selection of either of a miniature content image or a linked-user identification displayed in the linked-user portion causes the second content display portion to display the content with which the linked user is engaged.

15. A content similarity-based social network establishment method, comprising:
providing a content analysis means configured as device-executable code stored at a non-transitory data storage medium;
providing to two or more validly-registered entities a social networking graphical user interface (GUI) as device-executable code stored at a non-transitory data storage medium and configured, when executed by data processing circuitry, to cause a display device operably coupled with a viewer's network-coupled device to display a shared window including a first content display portion, a second content display portion, and a linked-user portion, wherein:
the first content display portion is operably coupled with the content analysis means;
the first content display portion is configured to display content to a viewer concurrently with and in the same manner as does the second content display portion, and
the linked-user portion is configured to display an identification of each linked-user and a miniature image of content with which each linked-user is engaged;

detecting an engagement with first viewer-perceivable content at a network-coupled device by a first validly-registered entity of the two or more validly-registered entities;

analyzing the first viewer-perceivable content by the content analysis means;

identifying one or more characteristics of the first viewer-perceivable content;

analyzing, by the content analysis means, second viewer-perceivable content concurrently engaged in at a remote network-coupled device of a remote second validly-registered entity of the two or more validly-registered entities;

identifying one or more characteristics of the second viewer-perceivable content which are either the same as or similar to the one or more characteristics of the first viewer-perceivable content;

linking the first validly-registered entity into a live, interactive social networking construct with the second validly-registered entity; and rendering the first viewer-perceivable content concurrently perceivable at the first content display portion of the social networking GUI of the network-coupled device and at one of the second content display portion and the linked-user portion of the social networking GUI of the remote network-coupled device.

16. The method of claim 15, wherein each of the first content display portion, the second content display portion, and the linked-user portion is configured with content-based social networking capabilities.

17. The method of claim 15, wherein providing the GUI further comprises providing either or both of:
a persistent client window comprising device-executable code stored at a non-transitory data storage medium and configured, when executed by a processor, to cause the display device operably coupled with a viewer's network-coupled device to viewably display an integral content display portion and one or more selection means configured as viewer-selectable icons, wherein the one or more selection means each activate a respective one or more content-based social networking controls selected from the group consisting of:
content search, selection, and/or playback controls,
message sending, receiving, and/or viewing controls,
community and/or room selection controls, and
task management controls; and
a web widget comprising device-executable code stored at a non-transitory data storage medium and configured, when executed by a processor, to cause the display device operably coupled with the viewer's network-coupled device to viewably display the web widget within, overlying, or proximate perceivable content presented to the viewer at the display device, and further configured with a registered remote-entity identification portion, a remote-entity interaction portion, and a shared window GUI accessing means.

18. The method of claim 17, wherein the GUI further comprises device-executable code configured, when executed by a processor, to cause the display device operably coupled with the viewer's network-coupled device to viewably display a shared window including a first content display portion, a second content display portion, and a linked-user portion, and wherein each of said first content display portion, second content display, and linked-user portion is configured with content-based social networking capabilities.

19. The method of claim 15, further comprising:
providing an objectionable content-obstructing means operably coupled with the content analysis means, and configured as a selective content filter to prevent unobstructed presentation of objectionable viewer-perceivable content at the display device operably coupled with the viewer's network-coupled device.

20. The method of claim 15, wherein either all of or any portion of the device-executable code is executed by a service-provider device, and wherein the result of such execution is presented to either or both of the first validly-registered entity and the second validly-registered entity at a display device operably coupled with their respective network-coupled devices.

21. The method of claim 15, wherein the content includes video content, still image content, textual content, audio content, tactile content, or any combination thereof, whether accessed via a data transfer network or from a memory storage means operably coupled with either or both of the first validly-registered entity's network-coupled device or the second validly-registered entity's network-coupled device.

22. The method of claim 15, wherein the content characteristics include one or more of metadata, form, structural elements, sequence of structural elements, context, and subject matter of the content, and either alternatively or additionally including one or more of an object, marker, data packet, and visual representation of code, either inserted or overlaid relative to the presented content.

23. The method of claim 15, wherein the first validly-registered entity can, either prior to the establishment of or at any time during a live social network, selectively either include or exclude one or more other validly-registered remote entities from either or both of participating in the social network and from perceiving content shared by the first validly-registered entity with the second validly-registered entity within the social network.

24. The method of claim 15, wherein the first validly registered entity can, while engaged in the live, interactive social network construct, invite a non-validly registered remote entity to participate in the social network construct by either or both of sharing content with and exchanging communication with the non-validly registered remote entity.

25. The method of claim 15, wherein analyzing remote user-perceivable content comprises searching for content concurrently accessed by one or more validly-registered remote entities and having one or more characteristics which are either the same as or similar to the one or more characteristics of the viewer-perceivable content, and wherein the configuration of the content analysis means enables the first validly-registered entity to initiate, terminate, direct, guide, resubmit, redefine, narrow, broaden, or intervene in a search, or any combination thereof, to selectively affect a result of said search.

* * * * *